United States Patent
Yu et al.

(10) Patent No.: US 8,331,504 B2
(45) Date of Patent: Dec. 11, 2012

(54) METHOD AND SYSTEM FOR MULTI-USER INTERFERENCE CANCELLATION

(75) Inventors: Yingqun Yu, San Diego, CA (US); Farrokh Abrishamkar, San Diego, CA (US); Divaydeep Sikri, Woking (GB); Michael McCloud, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 891 days.

(21) Appl. No.: 12/435,076

(22) Filed: May 4, 2009

(65) Prior Publication Data

US 2010/0278218 A1 Nov. 4, 2010

(51) Int. Cl.
*H03D 1/04* (2006.01)
(52) U.S. Cl. ........................................................ 375/346
(58) Field of Classification Search .................. 375/144, 375/148, 346
See application file for complete search history.

(56) References Cited

U.S. PATENT DOCUMENTS

| 7,426,680 B2 * | 9/2008 | Hwang et al. ................. 714/790 |
| 2004/0246927 A1 | 12/2004 | Wei et al. |
| 2006/0045170 A1 * | 3/2006 | van Rensburg et al. ...... 375/148 |

FOREIGN PATENT DOCUMENTS

WO WO2007058770 5/2007

OTHER PUBLICATIONS

International Search Report and Written Opinion—PCT/US2010/033265, International Search Authority—European Patent Office—Oct. 1, 2010.

* cited by examiner

*Primary Examiner* — Kevin Kim
(74) *Attorney, Agent, or Firm* — Kenneth Vu; Sayed Hossain Beladi

(57) ABSTRACT

Systems and methods for multi-user interference cancellation are provided. In one aspect of the disclosure, an apparatus is provided. The apparatus comprises a processing unit configured to process received chips into received symbols for a plurality of users and a detection unit configured to detect user symbols from the received symbols. The apparatus also comprises an interference cancellation unit configured to compute multi-user interference using the detected user symbols and to remove the computed multi-user interference from the received symbols. The apparatus further comprises a redetection unit configured to redetect user symbols from the received symbols with the computed multi-user interference removed.

45 Claims, 46 Drawing Sheets

METHOD AND SYSTEM FOR MULTI-USER INTERFERENCE CANCELLATION

FIELD

The present application relates generally to wireless communication systems, and particularly to methods and systems for multi-user interference cancellation.

BACKGROUND

In wireless communication systems, many users communicate over a wireless channel. For example, code division multiple access (CDMA) modulation technique is one of several techniques for facilitating communications in which a large number of system users are present. Other multiple access communication system techniques, such as time division multiple access (TDMA) and frequency division multiple access (FDMA) may be used as well.

Because of the presence of multiple data transmissions for multiple users in a wireless communication system, it is desirable to mitigate multi-user interference (MUI) and inter-symbol interference, for example, along with other noise. Traditionally, interference cancellation is performed at the chip level in a receiver, where the complexity directly rises with the number of users as well as the number of iterations involved. Chip-level interference cancellation is complex and may involve high-level algorithms and implementation tweaks. This complexity causes the receiver to be susceptible to error propagation. Therefore, systems and methods that provide accurate multi-user interference and inter-symbol interference cancellation while overcoming disadvantages of chip-level interference cancellation are desirable.

SUMMARY

In one aspect of the disclosure, a method of multi-user interference cancellation in a wireless communication system is provided. The method comprises processing received chips into received symbols for a plurality of users and detecting user symbols from the received symbols. The method also comprises computing multi-user interference using the detected user symbols and removing the computed multi-user interference from the received symbols. The method further comprises redetecting user symbols from the received symbols with the computed multi-user interference removed.

In yet another aspect of the disclosure, an apparatus is provided. The apparatus comprises a processing unit configured to process received chips into received symbols for a plurality of users and a detection unit configured to detect user symbols from the received symbols. The apparatus also comprises an interference cancellation unit configured to compute multi-user interference using the detected user symbols and to remove the computed multi-user interference from the received symbols. The apparatus further comprises a redetection unit configured to redetect user symbols from the received symbols with the computed multi-user interference removed.

In yet a further aspect of the disclosure, an apparatus is provided. The apparatus comprises means for processing received chips into received symbols for a plurality of users and means for detecting user symbols from the received symbols. The apparatus also comprises means for computing multi-user interference using the detected user symbols and means for removing the computed multi-user interference from the received symbols. The apparatus further comprises means for redetecting user symbols from the received symbols with the computed multi-user interference removed.

In yet a further aspect of the disclosure, a machine-readable medium having instructions stored thereon in provided. The instructions are executable by one or more processors and comprise code for processing received chips into received symbols for a plurality of users and detecting user symbols from the received symbols. The instructions also comprise code for computing multi-user interference using the detected user symbols and removing the computed multi-user interference from the received symbols. The instructions further comprise code for redetecting user symbols from the received symbols with the computed multi-user interference removed.

In yet a further aspect of the disclosure, an apparatus is provided. The apparatus comprises at least one processor configured to process received chips into received symbols for a plurality of users, to detect user symbols from the received symbols, to compute multi-user interference using the detected user symbols, to remove the computed multi-user interference from the received symbols, and to redetect user symbols from the received symbols with the computed multi-user interference removed.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
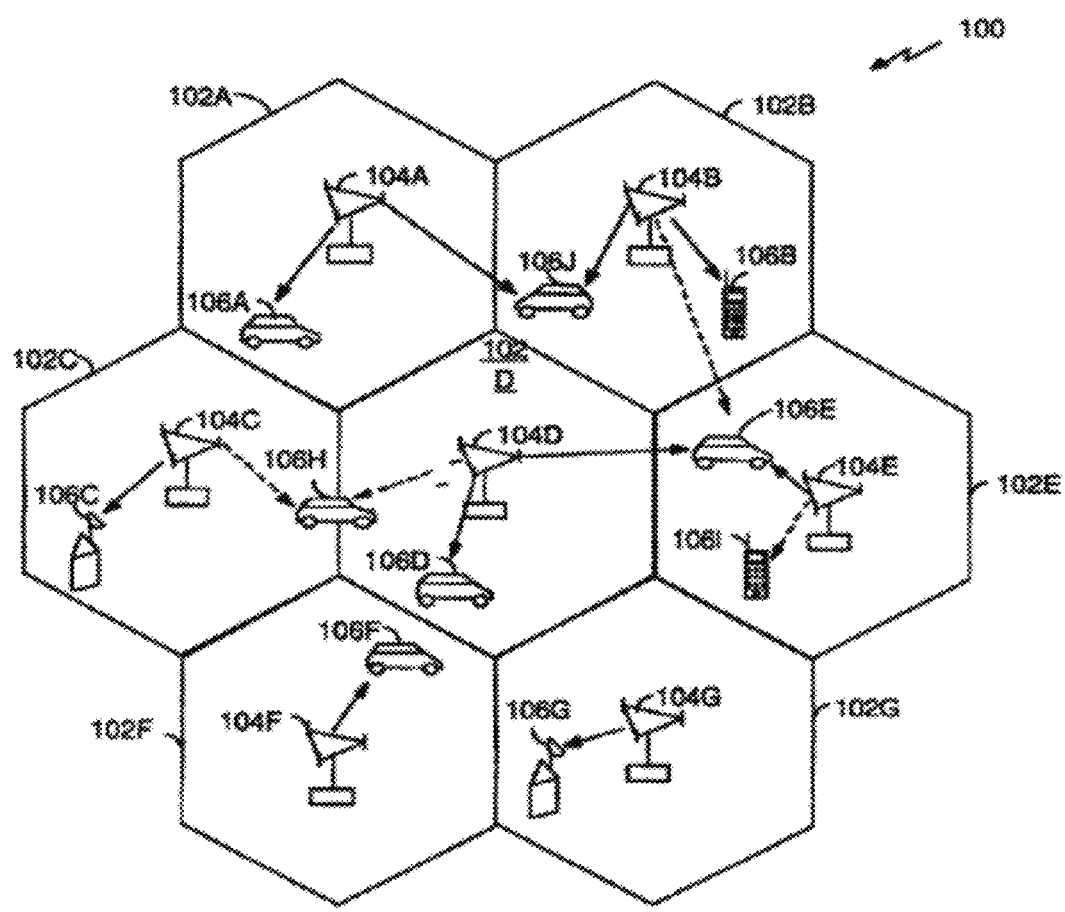
FIG. 1 is a diagram of a wireless communication system with multiple users, according to certain aspects of the present disclosure.

In the following detailed description, numerous specific details are set forth to provide a full understanding of the subject technology. It will be obvious, however, to one ordinarily skilled in the art that the subject technology may be practiced without some of these specific details. In other instances, well-known structures and techniques have not been shown in detail so as not to obscure the subject technology.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

FIG. 1 is a diagram of a wireless communication system supporting multiple users, according to certain aspects of the present disclosure. Communication system 100 provides communication for a number of cells 102A-102G (referred to as cells 102), each of which is serviced by a corresponding base station 104A-104G (referred to as base stations 104). Of course, any number of cells 102 and base stations 104 may be included in the communication system 100. In the exemplary communication system 100, some of the base stations 104 have multiple receive antennas and others have only one receive antenna. Similarly, some of the base stations 104 have multiple transmit antennas and others have a single transmit antenna.

Mobile stations 106A-106H (referred to as mobile stations 106) may refer to, for example, cellular phones, PDAs or the like, and may also be called mobile devices, user equipment (UE), wireless communication devices, terminals, stations, mobile equipment (ME) or some other terminology. As shown in FIG. 1, various mobile stations 106 may be dispersed throughout the communication system 100, and each mobile station 106 communicates with at least one base station 104 on a downlink and uplink at any given moment.

Different technologies may be used for various multiple access communication systems such as (1) a CDMA system that transmits data for different users using different orthogonal code sequences, (2) an FDMA system that transmits data for different users on different frequency subbands, (3) a TDMA system that transmits data for different users in different time slots, (4) a spatial division multiple access (SDMA) system that transmits data for different users on different spatial channels, (5) an orthogonal frequency division multiples access (OFDMA) system that transmits data for different users on different frequency subbands, and so on.

Figure 2:
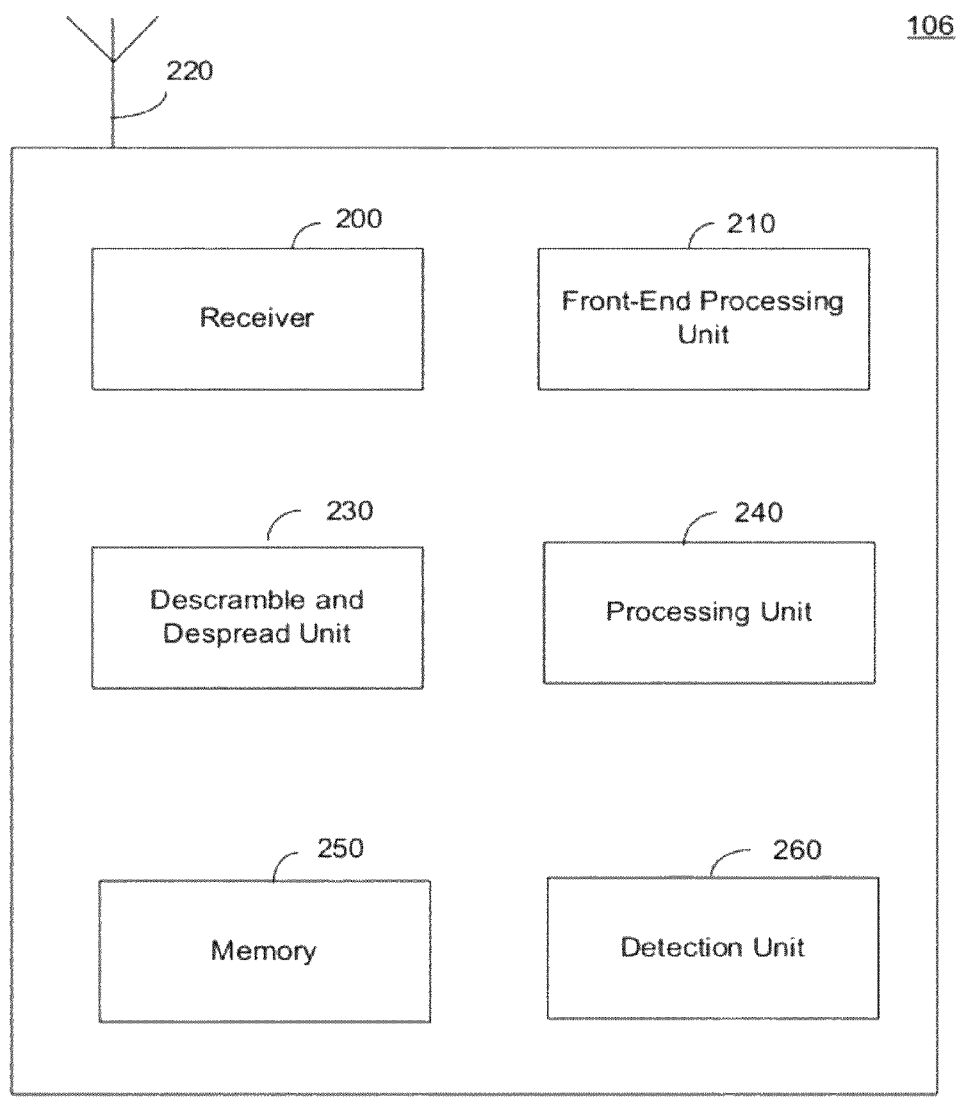
FIG. 2 is a block diagram of a mobile station used in a wireless communication system, according to certain aspects of the present disclosure.

FIG. 2 is a block diagram of a mobile station 106 used in a wireless communication system 100, according to certain aspects of the present disclosure. Mobile station 106 may include a receiver 200 that is configured to receive a transmitted signal using antenna 220. The receiver 200 is communicatively coupled to a front-end processing unit 210, which may be used for filtering of the received signal using, for example, a channel-matched filter and/or an equalizer. The mobile station 106 may include a descramble and despread unit 230, which descrambles and despreads the output of the front-end processing unit 210. Mobile station 106 may further include a processing unit 240, a communicatively coupled memory 250 and a communicatively coupled detection unit 260, which is used for multi-user detection and described in further detail below. The mobile station 106 is not limited to any particular configuration, and various combinations of components, as well as other components, may be included in the mobile station 106.

Figure 3:
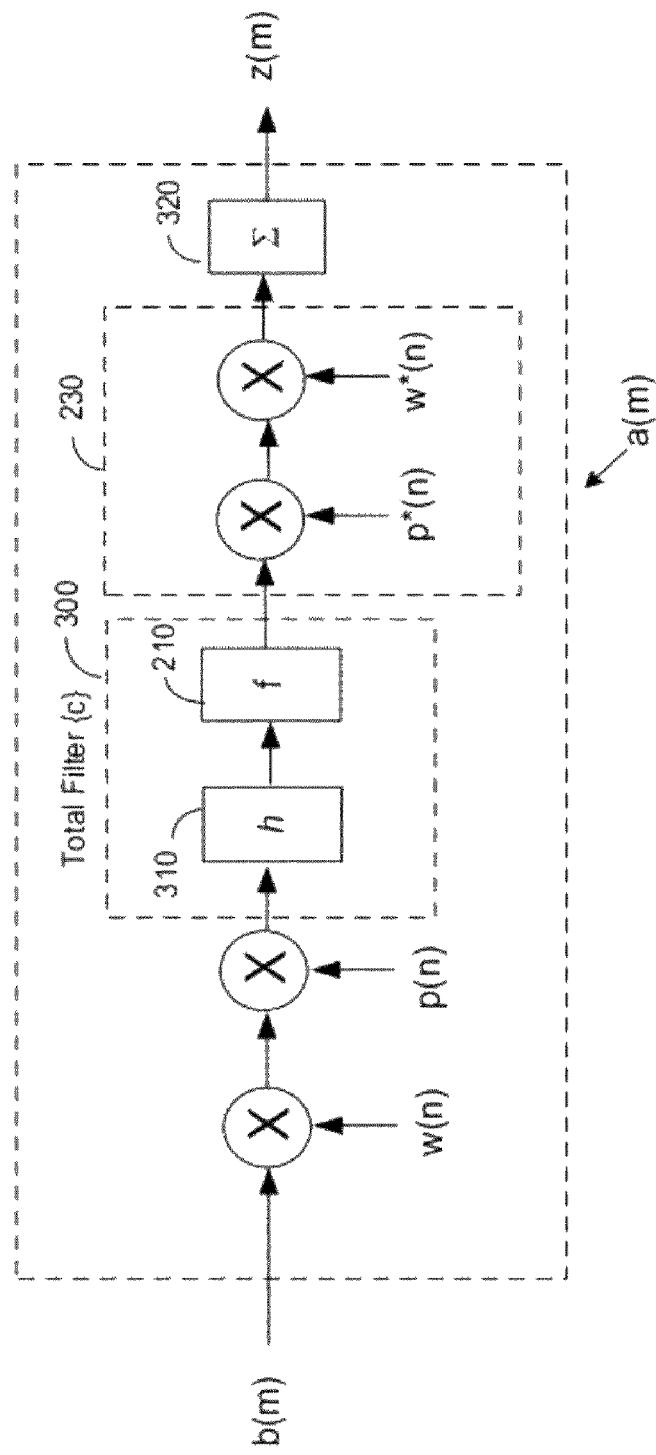
FIG. 3 is a diagram of a single user channel model, according to certain aspects of the present disclosure.

FIG. 3 is a diagram of a single user channel model, according to certain aspects of the present disclosure. As shown in FIG. 3, a user symbol b(m) is transmitted from a transmitter (not shown), which may be within a base station 104, for example. The user symbol may also be referred to as a data symbol for the user and may be obtained by mapping one or more data bits to a data symbol using Binary Phase Shift Keying (BPSK) modulation, Quadrature Phase Shift Keying (QPSK) modulation, Quadrature Amplitude Modulation (QAM), or other scheme. It is noted that m refers to the symbol period of user symbol b(m). It follows that a previous user symbol would be labeled as b(m−1) and a subsequent user symbol would be labeled as b(m+1). The user symbol b(m) is spread, using a Walsh code w(n), for example, and scrambled using code p(n). The Walsh code may have a spreading factor of N, in which the Walsh code w(n) comprises a sequence of N chips spanning one symbol period. The result of the spreading and scrambling is transmitted over channel h at block 310.

Mobile station 106 receives chips at receiver 200 using antenna 220, which are then filtered at front-end processing unit 210, and descrambled using descrambling code p*(n) and despread using despreading code w*(n) at the descramble and despread unit 230, before being summed at summation block 320. The resulting received symbol at the mobile station 106 is labeled as z(m). The summation block 320 sums the despreaded signal over one symbol period to obtain each received symbol z(m).

Total filter 300 "{c}" refers to a total filter, which is a convolution of the channel 310$h$ and the filter 210$f$. The channel 310$h$ may be estimated using pilot-based channel estimation and/or data-aided channel estimation, which are discussed in further detail below. For an example of a channel-matched filter, the filter f may be based on a time-inverse conjugate h*(−n) of a channel estimate h. When the length of the total filter 300 is less than 2N+1 (where N is the spreading factor), the received symbols z(m) for symbol period m may be expressed by Eq. (1) below:

$$z(m) = a_{-1}(m)b(m-1) + a_0(m)b(m) + a_1(m)b(m+1) \quad (1)$$

In terms of c(l), w(n) and p(n), matrices $a_{-1}(m)$, $a_0(m)$ and $a_1(m)$ may be expressed as shown in Eqs. (2)-(4).

$$a_0(m) = \sum_{d=0}^{N-1} c(d) \sum_{n=(m-1)N}^{mN-1-d} w*[n+d]p*[n+d]w[n]p[n] + \quad (2)$$

$$\sum_{d=1}^{N-1} c(d-N) \sum_{n=mN-d}^{mN-1} w*[n+d-N]p*[n+d-N]w[n]p[n]$$

$$a_1(m) = \sum_{d=0}^{N-1} c(d-N) \sum_{n=mN}^{(m+1)N-1-d} w*[n+d-N]p*[n+d-N]w[n]p[n] \quad (3)$$

$$a_{-1}(m) = \sum_{d=1}^{N} c(d) \sum_{n=(m-1)N-d}^{(m-1)N-1} w*[n+d]p*[n+d]w[n]p[n] \quad (4)$$

Figure 4A:
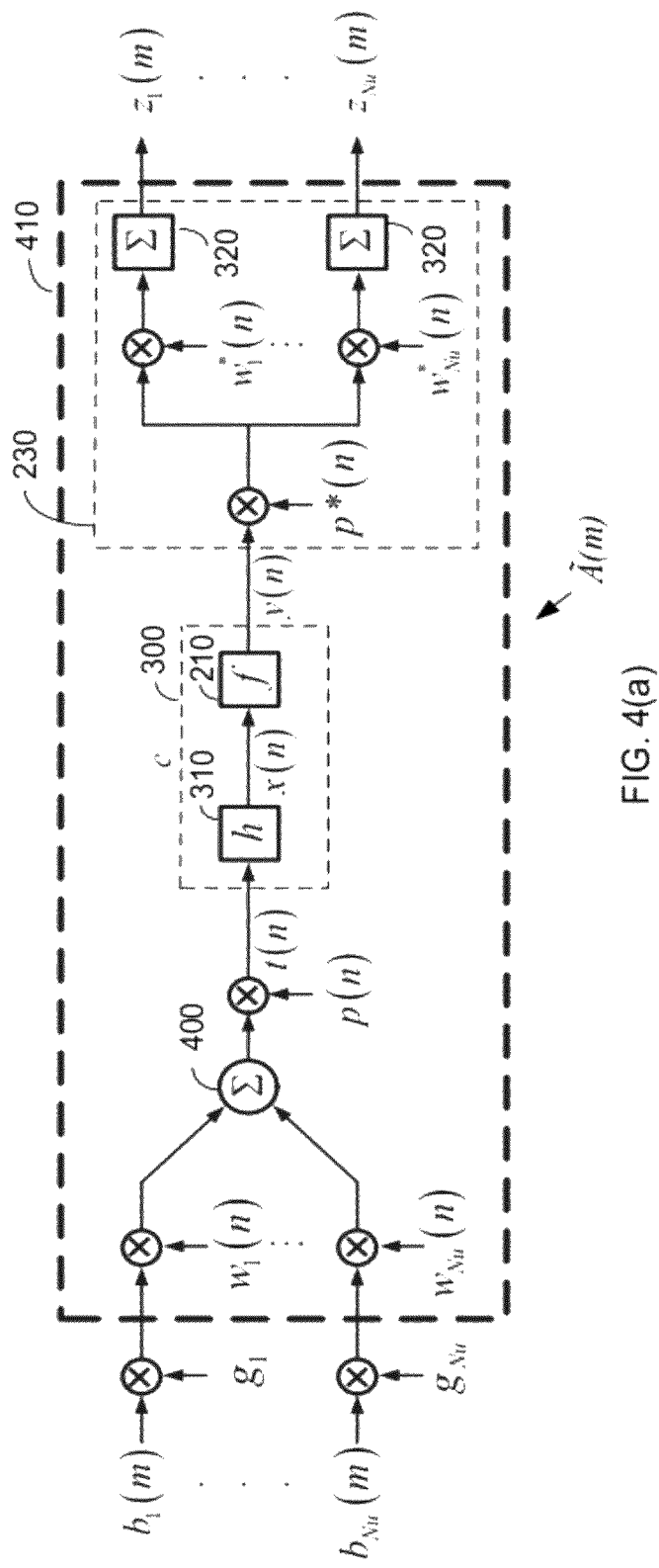
FIG. 4(a) is a diagram of a multi-user channel model, according to certain aspects of the present disclosure.

FIG. 4(a) is a diagram of a multi-user channel model, according to certain aspects of the present disclosure. Instead of transmitting a user symbol b(m), as described in FIG. 3, FIG. 4(a) shows the transmission of a user symbol set $\{b_k(m)\}$. That is, symbols $b_1(m)$ to $b_{Nu}(m)$ may be transmitted to multiple users 1 to Nu. The symbols $b_1(m)$ to $b_{Nu}(m)$ may be represented in vector form as b(m). It follows, therefore, that respective spreading codes (e.g., Walsh codes) $w_1(n)$ to $w_{Nu}(n)$ may be applied to each user symbol $b_1(m)$ to $b_{Nu}(m)$. Of course, the use of Walsh codes is merely exemplary, and other spreading techniques may be used without departing from the scope of the present disclosure. Furthermore, respective gains $g_1$ to $g_{Nu}$ may be applied to respective user symbols $b_1(m)$ to $b_{Nu}(m)$. It is noted that distinct or similar spreading codes or gains may be applied to respective user symbols $b_1(m)$ to $b_{Nu}(m)$ without departing from the scope of the present disclosure. The spread signals for the different users may be combined at combiner 400 before scrambling code p(n) is applied. The resulting combined signal is transmitted via channel 310h.

Mobile station 106 receives chips at receiver 200, using antenna 220, which are then filtered at front-end processing unit 210. Various front-end filtering techniques may be implemented (e.g., front-end channel-matched filter and/or equalization). The filtered chips are then descrambled using descrambling code p*(n) and despread using despreading codes $w^*_1(n)$ to $w^*_{Nu}(n)$ at the descramble and despread unit 230. The descrambling code p*(n) and despreading codes $w^*_1(n)$ to $w^*_{Nu}(n)$ may be conjugates of the scrambling p(n) and spreading codes $w_1(n)$ to $w_{Nu}(n)$, respectively. Each despreaded signal is summed over one symbol period by the respective summation block 320 to obtain a received symbol $z_1(m)$ to $z_{Nu}(m)$. The resulting received symbols $z_1(m)$ to $z_{Nu}(m)$ represent the symbols received at a mobile station 106.

Figure 4B:
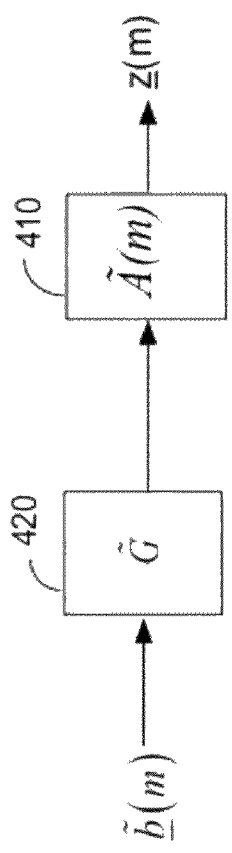
FIG. 4(b) is a diagram of a simplified multi-user channel model, according to certain aspects of the present disclosure.
Figure 4C:
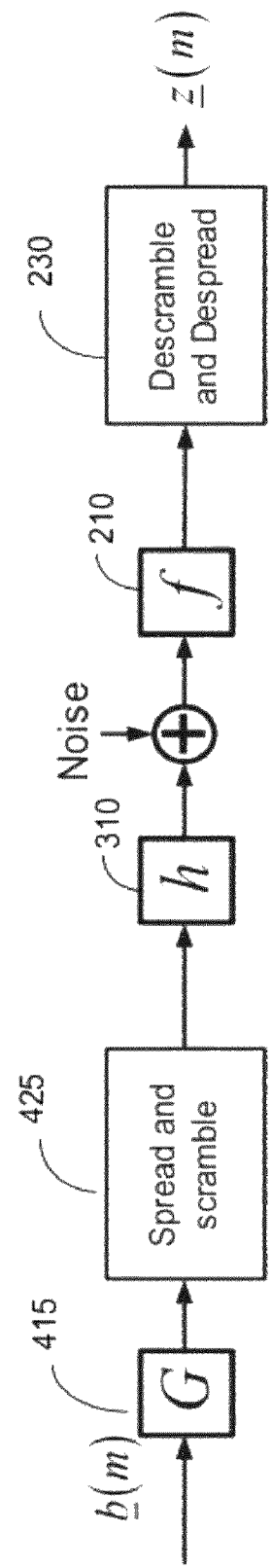
FIG. 4(c) is a diagram of a simplified multi-user channel model including noise, according to certain aspects of the present disclosure.

The resulting received symbols $z_1(m)$ to $z_{Nu}(m)$ may be expressed as a vector $\underline{z}(m)$, shown in Eq. (5) below:

$$\underline{z}(m) = A_{-1}(m)G\underline{b}(m-1) + A_0(m)G\underline{b}(m) + A_1(m)G\underline{b}(m+1) \quad (5)$$
$$= \tilde{A}(m)\tilde{G}\underline{\tilde{b}}(m)$$

where G is a gain matrix 415 (see FIG. 4(c)) and $\tilde{G}$ is a stacked gain matrix 420 (see FIG. 4(b)), which can be expressed as shown in Eq. (6):

$$G = \begin{bmatrix} g_1 & & 0 \\ & \ddots & \\ 0 & & g_{Nu} \end{bmatrix} \quad (6)$$

$$\tilde{G} = \begin{bmatrix} G & & \\ & G & \\ & & G \end{bmatrix}$$

$\underline{b}(m)$ is a vector of user symbols $b_1(m)$ to $b_{Nu}(m)$ and can be expressed as shown in Eq. (7):

$$\underline{b}(m) = \begin{bmatrix} b_1(m) \\ \vdots \\ b_{Nu}(m) \end{bmatrix}, \underline{\tilde{b}}(m) = \begin{bmatrix} \underline{b}(m-1) \\ \underline{b}(m) \\ \underline{b}(m+1) \end{bmatrix} \quad (7)$$

$\tilde{A}(m)$ may be referred to as a multi-user interference matrix 410, and is expressed as shown in Eq. (8):

$$\tilde{A}(m) = [A_{-1}(m) A_0(m) A_1(m)] \quad (8)$$

According to certain embodiments, $A_{-1}(m)$, $A_0(m)$ and $A_1(m)$ are Nu by Nu multi-user interference (MAI) and shoulder matrices, where Nu is the number of code channels in a serving cell 102. The determination of matrices $A_{-1}(m)$, $A_0(m)$ and $A_1(m)$ will be discussed in greater detail below with reference to FIG. 5.

The resulting expression in Eq. (5) may be rewritten as in Eq. (9) below:

$$\underline{z}(m) = \sum_{l=-1}^{1} A_l(m)G\underline{b}(m+l) \quad (9)$$

As a result of the foregoing equations, a simplified model of the transmission of user symbols $b_1(m)$ to $b_{Nu}(m)$ and the received symbols $z_1(m)$ to $z_{Nu}(m)$ may be expressed as shown in FIG. 4(b). In FIG. 4(b), the stacked gain matrix $\tilde{G}$ is labeled as 420 and multi-user interference matrix $\tilde{A}(m)$ is labeled as 410 (as delineated by the dotted line in FIG. 4(a)).

FIG. 4(c) is a diagram of a simplified multi-user channel model including noise, according to certain aspects of the present disclosure. As shown in FIG. 4(c), user symbols $\underline{b}(m)$ are gain scaled at block 415, and are spread and scrambled at block 425. The resulting signal is transmitted via channel 310h, and may be subjected to noise during transmission. The signal received at the receiver is filtered at front-end processing unit 210 and descrambled and despread at descramble and despread unit 230. The resulting received symbols $\underline{z}(m)$ can be expressed by Eq. (10), where the noise is represented by $\underline{v}(m)$.

$$\underline{z}(m) = \tilde{A}(m)\tilde{G}\underline{\tilde{b}}(m) + \underline{v}(m) \quad (10)$$

It follows, therefore, that the resulting received symbols $\underline{z}(m)$ (e.g., a despread CDMA signal) may be shown by a single expression, which represents multi-user inter-symbol interference (ISI), multi-user interference (MUI) as well as other unaccounted for noise $\underline{v}(m)$. The single expression represents a symbol-level, time-varying, multi-user model of the despread signal, as shown in Eq. (11).

$$\underline{z}(m) = A_{-1}(m)G\underline{b}(m-1) + A_0(m)G\underline{b}(m) +$$
$$A_{+1}(m)G\underline{b}(m+1) + \underline{v}(m) \quad (11)$$

As an alternative, Eq. (11) may be written as Eq. (12):

$$\underline{z}(m) = \sum_{l=-1}^{1} A_l(m)G\underline{b}(m+l) + \underline{v}(m) \quad (12)$$

Figure 5:
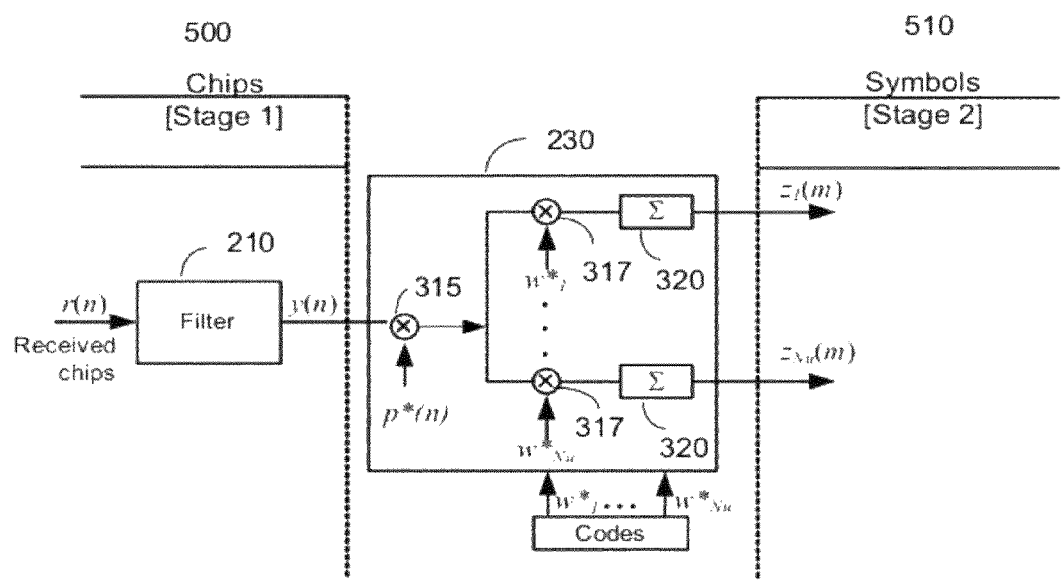
FIG. 5 is a schematic of a multi-user detection system using two-stage processing in a wireless communication system, according to certain aspects of the present disclosure.

FIG. 5 is a schematic of a multi-user detection system using two-stage processing at a receiver in a wireless communication system, according to certain aspects of the present disclosure. Stage 1 500 refers to the chip level, when the chips r(n) are received at receiver 200 (shown in FIG. 2). The received chips r(n) are subjected to front-end processing at filter 210 (e.g., channel matched filter and/or equalizer). The output of the filter 210, y(n), is input to the descramble and despread unit 230, where the output y(n) is descrambled using descrambling code p*(n) and despread using despreading codes $w^*_1(n)$ to $w^*_{Nu}(n)$, for example, which are previously stored in memory 250. The descramble and despread unit 230 outputs the received symbols $z_1(m)$ to $z_{Nu}(m)$.

In one aspect, the descramble and despread unit 230 comprises a descrambling mixer 315 to mix the filtered chips y(n) with the descrambling code p*(n) and despreading mixers 317 to mix the descrambled chips with the despreading codes $w^*_1(n)$ to $w^*_{Nu}(n)$. The descramble and despread unit 230 also comprises summation blocks 320 for summing the despread signals over one symbol period to obtain the received symbols $z_1(m)$ to $z_{Nu}(m)$.

It is to be understood that the filtering, descrambling and despreading operations of the multi-user detection system may be arranged in a different order than shown in the example in FIG. 5 to obtain the received symbols $z_1(m)$ to $z_{Nu}(m)$. For example, the descrambling and despreading operations may be performed before filtering. Therefore, the multi-user detection system is not limited to a particular order of filtering, descrambling and despreading operations.

As noted above, total filter 300c refers to the convolution of channel 310h and filter 210f. Thus, c(l) is equal to h(l) convolved with f(l), where h(l) and f(l) may be computed and stored in the memory 250. In terms of c(l), w(n) and p(n), matrices $A_{-1}(m)$, $A_0(m)$ and $A_1(m)$ may be expressed as shown in Eqs. (13)-(15).

$$[A_0(m)]_{ij} = \sum_{d=0}^{N-1} c(d) \sum_{n=(m-1)N}^{mN-1-d} w_i^*[n+d]p^*[n+d]w_j[n]p[n] + \quad (13)$$

$$\sum_{d=1}^{N-1} c(d-N) \sum_{n=mN-d}^{mN-1} w_i^*[n+d-N]p^*[n+d-N]w_j[n]p[n]$$

$$[A_1(m)]_{ij} = \quad (14)$$

$$\sum_{d=0}^{N-1} c(d-N) \sum_{n=mN}^{(m+1)N-1-d} w_i^*[n+d-N]p^*[n+d-N]w_j[n]p[n]$$

$$[A_{-1}(m)]_{ij} = \sum_{d=1}^{N} c(d) \sum_{n=(m-1)N-d}^{(m-1)N-1} w_i^*[n+d]p^*[n+d]w_j[n]p[n] \quad (15)$$

Stage 2 510 refers to the symbol level, where the output of the descramble and despread unit 230 is obtained (i.e., resulting received symbols $z_1(m)$ to $z_{Nu}(m)$). Eq. (11) above provides a symbol-level, time-varying, multi-user model that relates the received symbols $z_1(m)$ to $z_{Nu}(m)$ to the desired user symbols $b_1(m)$ to $b_{Nu}(m)$. Using Eq. (11) and the computed matrices $A_{-1}(m)$, $A_0(m)$ and $A_1(m)$, the gain matrix, and the received symbols, one can solve for the desired user symbols $b_1(m)$ to $b_{Nu}(m)$.

According to certain embodiments, the shoulder matrices $A_{-1}$ and $A_1$ may be small, so that they may be absorbed with noise v(m), resulting in total interference $\eta(m)$. As a result, $\underline{z}(m)$ may be expressed as shown in Eq. (16).

$$\underline{z}(m) = A_0(m)G\underline{b}(m) + \underline{\eta}'(m) \quad (16)$$

Figure 6:
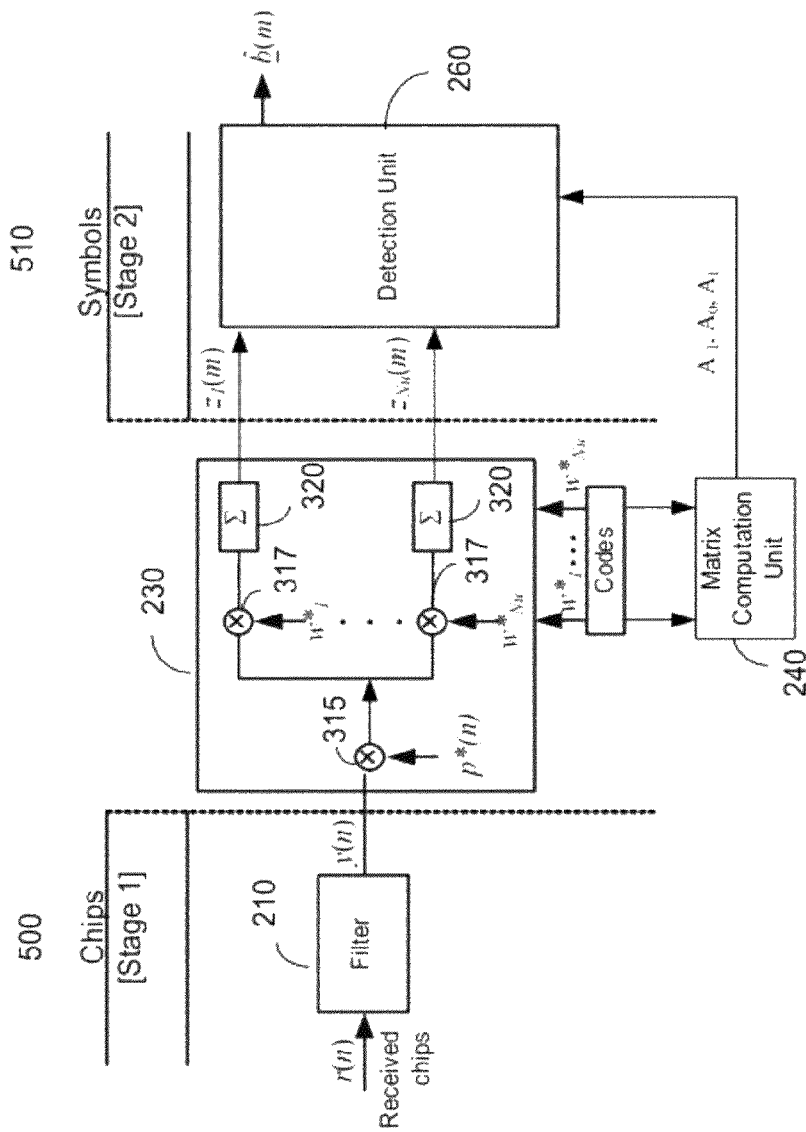
FIG. 6 is a schematic of a multi-user detection system using two-stage processing and a multi-user interference matrix, according to certain aspects of the present disclosure.

FIG. 6 is a schematic of a multi-user detection system using two-stage processing and a multi-user interference matrix in a wireless communication system, according to certain aspects of the present disclosure. FIG. 6 is similar to FIG. 5, but includes a matrix computation unit 240 and detection unit 260. The same Stage 1 500 and Stage 2 510 processing occurs, as described above with reference to FIG. 5. However, according to certain aspects, matrix computation unit 240 may compute the multi-user interference matrix $A_0(m)$, for example, and communicate the matrix to detection unit 260. Given the value of multi-user interference matrix $A_0(m)$ and the received symbols $\underline{z}(m)$, the detection unit 260 detects desired user symbols $\hat{\underline{b}}(m)$ by solving for the desired symbols $\underline{b}(m)$ in Eq. (16), for example. The hat superscript denotes the detected user symbols, which provide estimates of the user symbols at the transmitter side (e.g., base station 104). It is noted that the received symbols $\underline{z}(m)$ are previously determined by descrambling and despreading the received chips and G is previously known or can be estimated. Examples of methods for estimating the gains for different users are discussed below. Based on Eq. (16), various detection and estimation techniques may be employed by detection unit 260 to determine the desired user symbols, such as minimum mean square error estimation (MMSE), maximum likelihood detection (MLD) or sphere decoding (SD), maximum a posteriori detection (MAPD), and slicing. Other techniques known in the art may also be used. Although the matrix computation matrix 240 and detection unit 260 are shown separately in FIG. 6 for ease of illustration, their operations may be performed by the same processor or multiple processors.

In one aspect, the multi-user interference matrix $A_0(m)$ is a Nu by Nu matrix that relates each received symbol $z_1(m)$ to $z_{Nu}(m)$ to a corresponding user symbol and to the other user symbols. For example, for received symbol $z_1(m)$, coefficient $[A_0(m)]_{1,1}$ of the multi-user interference matrix $A_0(m)$ relates the received symbol $z_1(m)$ to the corresponding user symbol $b_1(m)$. In addition, the other coefficients $[A_0(m)]_{1,2}$ to $[A_0(m)]_{1,Nu}$ in the first row of the multi-user interference matrix $A_0(m)$ relate the received symbol $z_1(m)$ to the other user symbols $b_2(m)$ to $b_{Nu}(m)$, respectively, which contribute to the multi-user interference for received symbol $z_1(m)$. The same can apply to the other received symbols.

Therefore, the multi-user interference matrix $A_0(m)$ in this aspect accounts for multi-user interference when solving for the user symbols $b_1(m)$ to $b_{Nu}(m)$ in Eq. (16). Thus, the multi-user interference matrix $A_0(m)$ provides multi-user user symbol detection at the symbol level which accounts for multi-user interference without having to perform complex chip-level multi-user interference cancellation. As a result, a desired symbol may be accurately detected with the use of a broad-range of powerful and advanced receivers at the symbol level.

Figure 7:
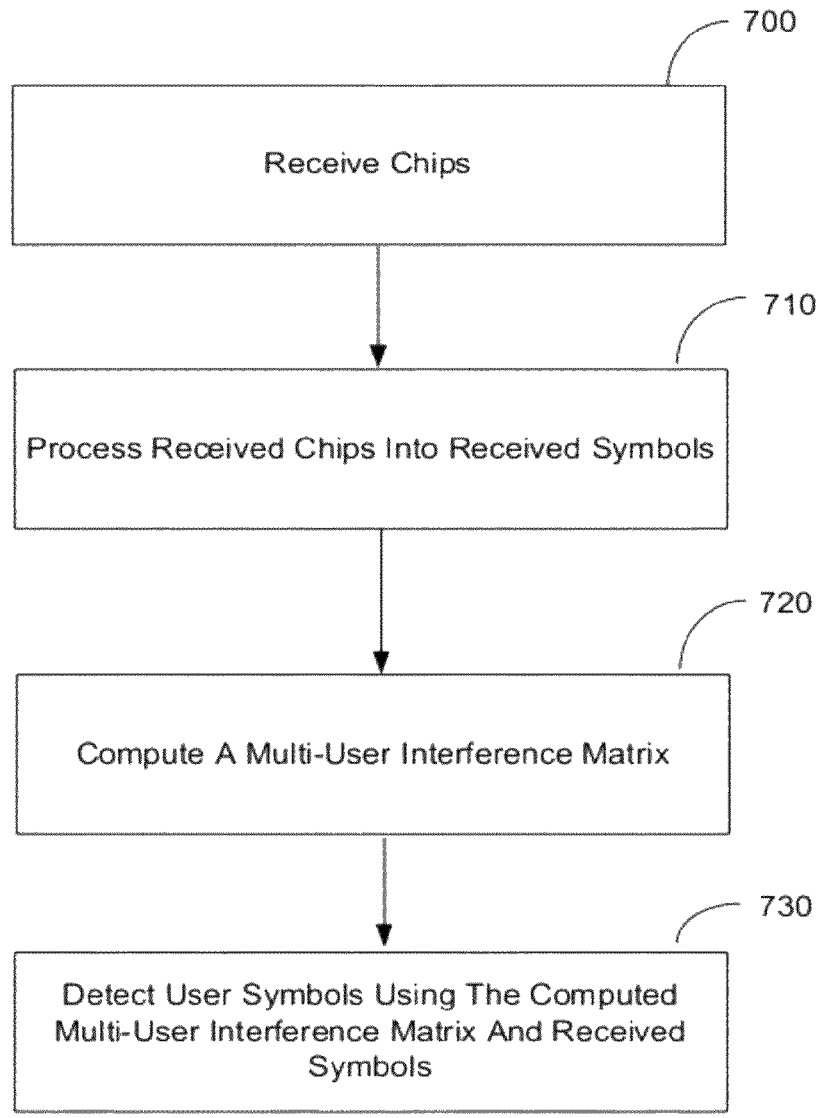
FIG. 7 is a flow diagram illustrating a method of multi-user detection using two-stage processing, according to certain aspects of the present disclosure.

FIG. 7 is a flow diagram illustrating a method of multi-user detection using two-stage processing in a wireless communication system, according to certain aspects of the present disclosure. At operation 700, chips are received at a receiver 200 as part of a mobile station 106. From operation 700, the process continues to operation 710, where the chips are processed into one or more received symbols z(m) for a plurality of users. For example, the received chips may be filtered and then descrambled and despreaded into received symbols.

From operation 710, the process continues to operation 720 where a multi-user interference matrix $A_0(m)$ is computed from the known codes, filter coefficients and a channel estimate (e.g., based on Eq. (13)). The channel may be estimated, for example, using pilot-based channel estimation or data-aided channel estimation, which is described below.

From operation 720, the process continues to operation 730 where the computed matrix $A_0(m)$ and received symbols are used to detect the desired user symbols based on a symbol-level model relating the desired user symbols b(m) to the received symbols z(m). For example, the symbol-level, time-varying, multi-user model may be expressed by Eq. (16). In this example, the user symbols $\hat{b}(m)$ may be detected by solving for the user symbols $\underline{b}(m)$ in Eq. (16), using various techniques including MMSE, MLD, SD, MAPD and slicing. The matrix $A_0(m)$ relates the received symbol for each user not only to the desired user symbols for the respective user, but also user symbols for the other users. Thus, the matrix $A_0(m)$ accounts for multi-user interference.

To account for multi-user inter-symbol interference, the shoulder matrices $A_1(m)$ and $A_{-1}(m)$ may also be computed in operation 720. The user symbols $\hat{b}(m)$ may then be detected in operation 730 using the received symbols $\underline{z}(m)$ and the matrices $A_1(m)$, $A_0(m)$, $A_{-1}(m)$, for example, by solving for the user symbols $\underline{b}(m)$ in Eq. (12). One of the shoulder matrices $A_1(m)$ and $A_{-1}(m)$ may be used to detect the user symbols $\underline{b}(m)$ instead of using both shoulder matrices. In this case, the term in Eq. (12) corresponding to the shoulder matrix not being used is omitted when solving for the user symbols $\underline{b}(m)$ in Eq. (12).

Figure 8:
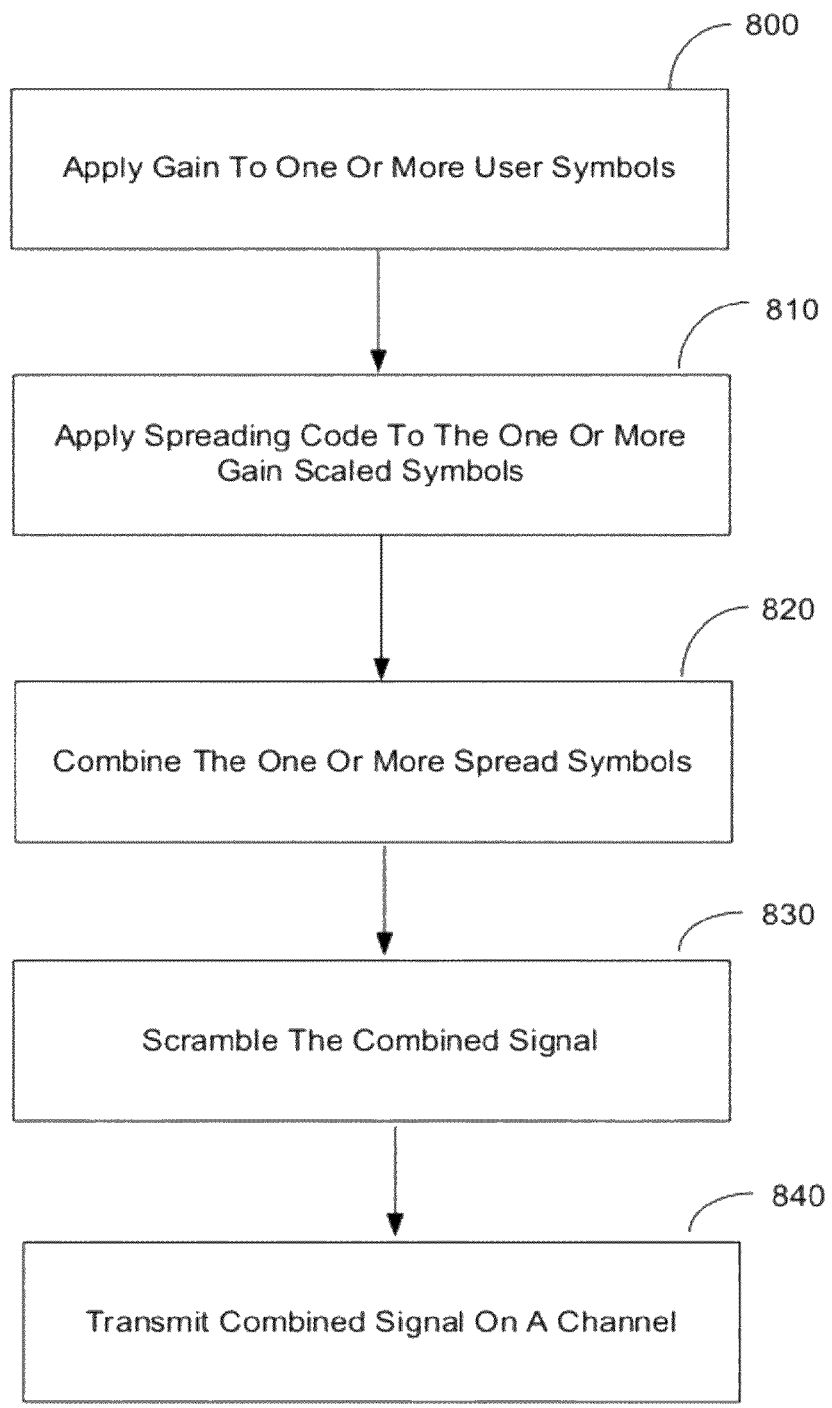
FIG. 8 is a flow diagram illustrating a method of transmitting chips to a receiver, according to certain aspects of the present disclosure.

FIG. 8 is a flow diagram illustrating a process of transmitting chips, according to certain aspects of the present disclosure. This process may be performed, for example, at a base station 104 or other transmitter to transmit chips to a mobile station 106 or other receiving device.

At operation 800, a respective gain is applied to one or more user symbols to be transmitted. Any conventional means for applying a gain may be used, and the respective gains may be the same or distinct from each other. For example, a base station may adjust the gain applied to user symbols using a power adaption scheme based on feedback from mobile stations.

From operation 800, the process continues to operation 810 where spreading codes are applied to the one or more gain scaled symbols, respectively. Traditional CDMA spreading techniques, such as applying a Walsh code, may be implemented. The user symbols may be spread, for example, to separate user symbols for different users. The one or more spread symbols are combined, using a combiner 400, at operation 820.

From operation 820, the process continues to operation 830 where the combined signal is scrambled. The combined signal may be scrambled, for example, to separate the combined signal from signals from other cells (e.g., served by other base stations 104). Thereafter, at operation 840, the combined signal is transmitted on a channel 310h (see FIG. 3).

Figure 9:
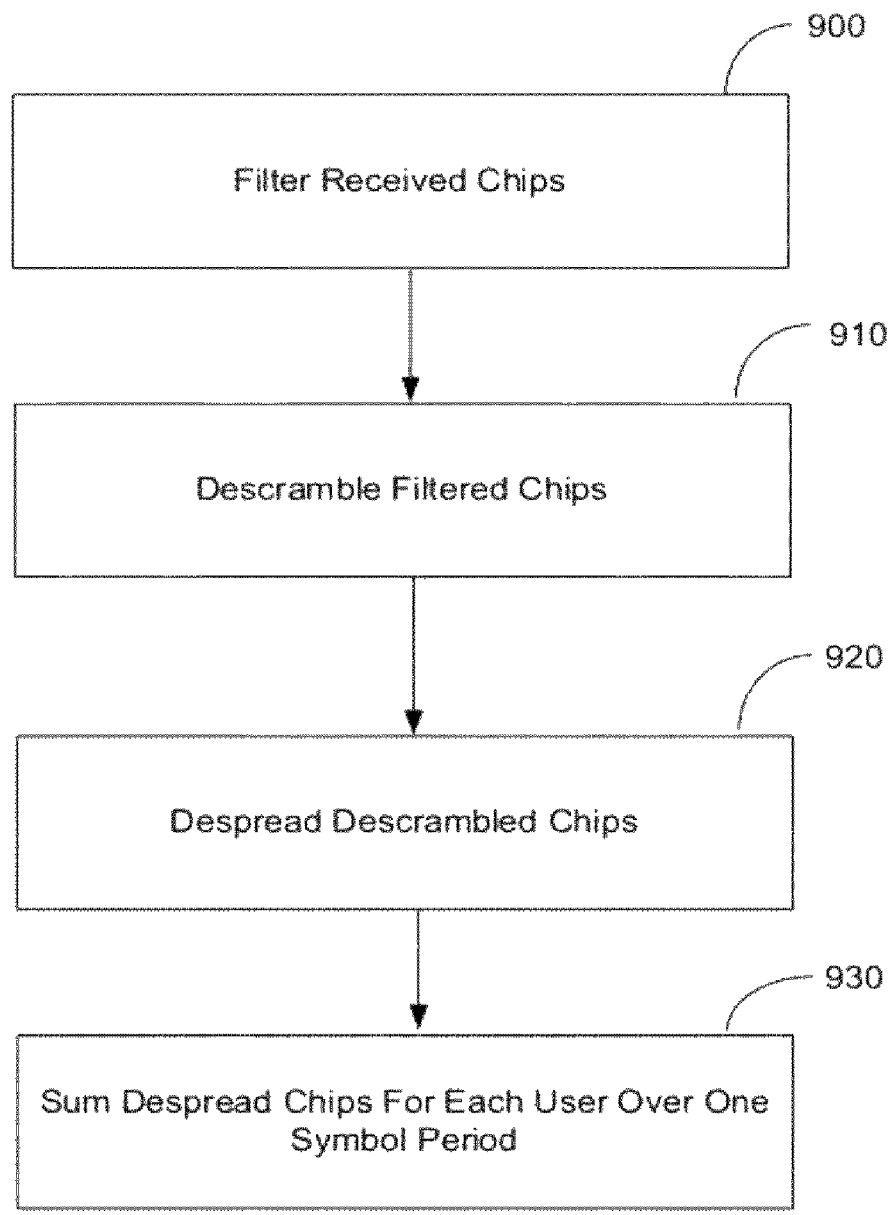
FIG. 9 is a flow diagram illustrating a method of processing chips into one or more received symbols for a plurality of users, according to certain aspects of the present disclosure.

FIG. 9 is a flow diagram illustrating a method of processing chips into one or more received symbols for a plurality of users, according to certain aspects of the present disclosure. This process may be performed at a mobile station 106 or other receiving device.

At operation 900, the received chips are filtered by filter 210f by front-end processing unit 210. As noted herein, the front-end processing may be performed using a channel matched filter and/or an equalizer, for example. However, other filtering techniques may be implemented without departing from the scope of the present invention.

From operation 900, the process continues to operation 910, where the filtered chips are descrambled using descrambling code p*(n), based on a conjugate of the scrambling code p(n) previously used to scramble the signal at the transmission side. Thereafter, the descrambled chips are despread at operation 920 using despreading codes based on conjugates of the Walsh codes, for example, previously used to spread the signal at the transmitter side. Each despreading code may correspond to a different user or code channel. The despreading and descrambling may be performed by the despreading and descrambling unit 230. The descrambling and despreading codes may be pre-programmed into memory 250, which is communicatively coupled to the descramble and despread unit 230.

From operation 920, the process continues to operation 930 where the despread chips for each user are summed over one symbol period to obtain the received symbol for the respective user. The summation may be performed by the respective summation block 320. The operations in FIG. 9 may also be performed in a different order to obtain the received symbols.

Figure 10:
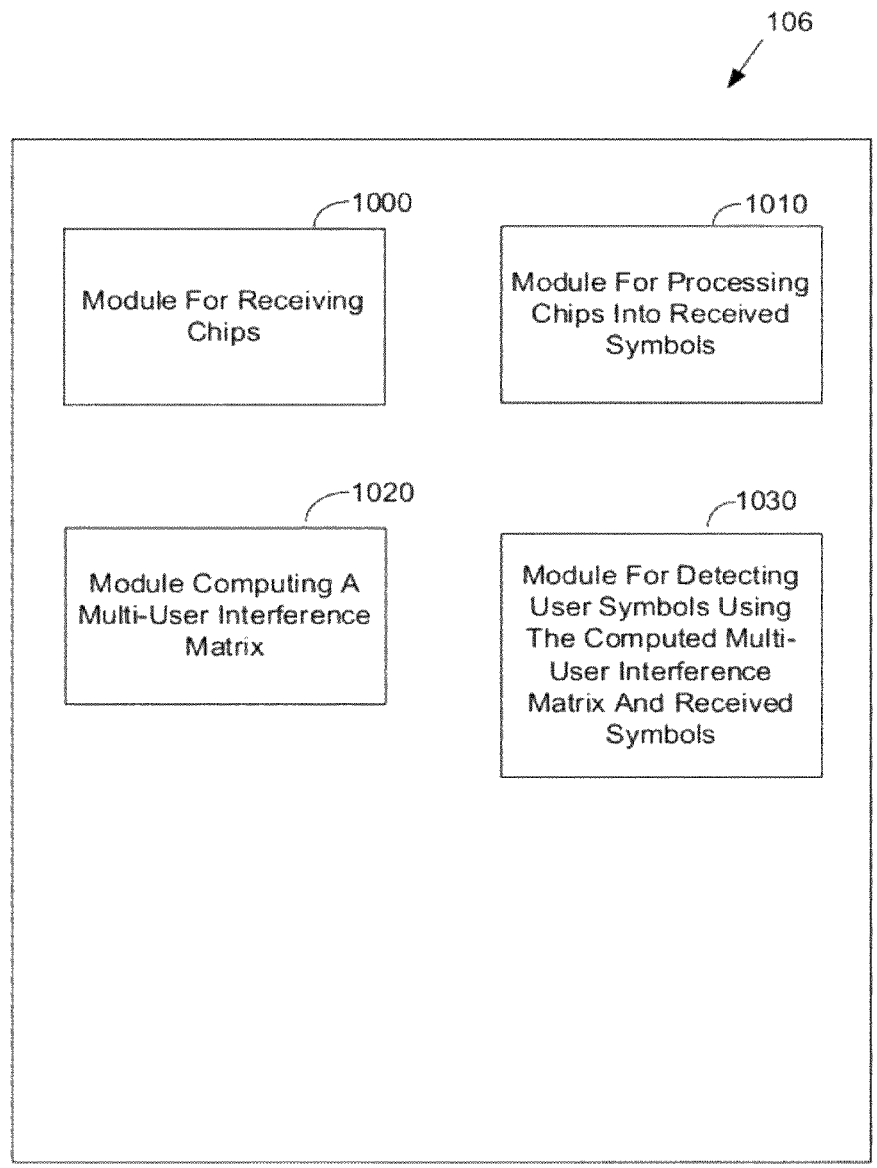
FIG. 10 is a block diagram of a mobile station used in a wireless communication system, according to certain aspects of the present disclosure.

FIG. 10 is a block diagram of a mobile station 106 used in a wireless communication system 100, according to certain aspects of the present disclosure. Mobile station 106 of FIG. 10 includes a module 1000 for receiving chips. The mobile station 106 also includes a module 1010 for processing chips into one or more received symbols for a plurality of users, where the chips are filtered through front-end processing unit and then descrambled and despreaded and output as symbols $\underline{z}(m)$.

The mobile station 106 further includes a module 1020 for calculating a multi-user interference matrix. As described above, a multi-user interference matrix $A_0(m)$, for example, may be calculated the known codes, filter coefficients and channel estimate.

The mobile station 106 further includes a module 1030 for detecting the user symbols $\hat{\underline{b}}(m)$ using the computed matrix $A_0(m)$ and the received symbols $\underline{z}(m)$ based on a symbol-level, time-varying, multi-user model relating the desired user symbols $\underline{b}(m)$ to the received symbols $\underline{z}(m)$. For example, the symbol-level, time-varying, multi-user model may be expressed by Eq. (16). In this example, the user symbols $\hat{\underline{b}}(m)$ may be detected by solving for the user symbols $\underline{b}(m)$ in Eq. (16), using various techniques including MMSE, MLD, SD, MAPD and slicing.

Efficient Computation of Multi-User Interference and Shoulder Matrices

Efficient methods and systems for computing multi-user interference and shoulder matrices are provided, according to certain aspects of the present disclosure. In one aspect, when the user symbols are spread by Walsh codes, the multi-user interference and shoulder matrices can be efficiently computed using Fast Hadamard Transforms (FHTs), as discussed in further detail below.

Figure 11:
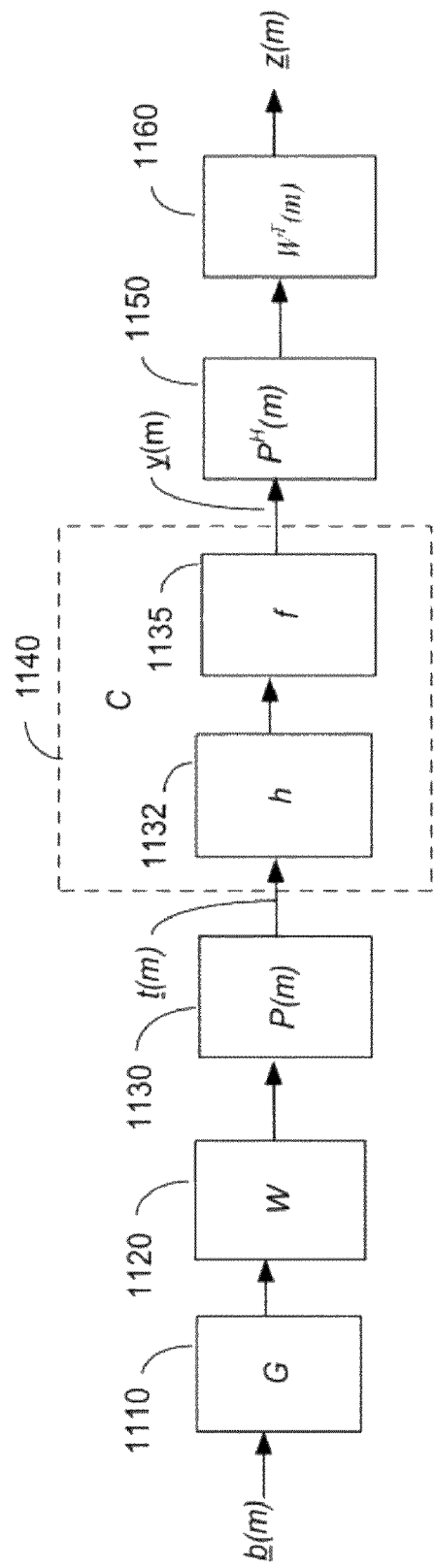
FIG. 11 is a diagram of a multi-channel model, according to certain aspects of the present disclosure.

FIG. 11 is a diagram of a multi-channel model according to one aspect. In FIG. 11, the user symbols $b_1(m)$ to $b_{Nu}(m)$ for symbol period m are represented in column vector form as $\underline{b}(m)$, where Nu is a number of users or code channels. A gain matrix G (block 1110) is applied to the user symbols $\underline{b}(m)$. The gain matrix G is a Nu×Nu diagonal matrix that applies gains $g_1$ to $g_{Nu}$ to the respective user symbols $b_1(m)$ to $b_{Nu}(m)$ and may be given as follows:

$$G = \begin{bmatrix} g^1 & & 0 \\ & \ddots & \\ 0 & & g^{Nu} \end{bmatrix} \quad (17)$$

The gain-scaled user symbols are then spread by a spreading matrix W (block 1120). The spreading matrix W is a N×Nu matrix that applies a Walsh code of N chips to each gain-scaled user symbol. The spreading matrix W may be given as follows:

$$W = [\underline{W}_1 \cdots \underline{W}_{Nu}] \quad (18)$$

where $\underline{W}_1$ is an N×1 column vector representing the Walsh code for the first user and $\underline{W}_{Nu}$ is an N×1 column vector of the Walsh code for the $Nu^{th}$ user. Each Walsh code $\underline{W}_1$ to $\underline{W}_{Nu}$ may comprise N chips. The spread user symbols are then scrambled by a scrambling matrix P(m) (block 1130). The scrambling matrix P(m) is a N×N diagonal matrix that applies a scrambling code of N chips to the spread user symbols. The scrambling matrix P(m) may be given as follows:

$$P(m) = \begin{bmatrix} P((m-1)N) & & 0 \\ & \ddots & \\ 0 & & P(mN-1) \end{bmatrix} \quad (19)$$

where (m−1)N to (mN−1) represent a chip index for the N chips of the scrambling code corresponding to symbol period m. After spreading and scrambling, the resulting chips are transmitted over channel h (block 1132). The transmitted chips for symbol period m may be represented as a N×1 column vector t(m) as shown in FIG. 11. The transmitted chips for symbol period m may be given as follows:

$$\underline{t}(m) = P(m)WG\underline{b}(m) \quad (20)$$

The transmitted chips for the previous and next symbol periods m−1 and m+1, respectively, may be given as follows:

$$\underline{t}(m-1) = P(m-1)WG\underline{b}(m-1) \quad (21)$$

$$\underline{t}(m+1) = P(m+1)WG\underline{b}(m+1) \quad (22)$$

where it is assumed that the Walsh codes and gains are the same for the symbol periods m−1, m and m+1. In this aspect, the Walsh codes may repeat every symbol period.

The transmitted chips are transmitted over channel h (block 1132) to a receiver and filtered at the receiver by front-end filter f (block 1135). The output of the filter f for symbol period m may be represented as a N×1 column vector y(m), which may be expressed as:

$$\underline{y}(m) = C \begin{bmatrix} \underline{t}(m-1) \\ \underline{t}(m) \\ \underline{t}(m+1) \end{bmatrix} \quad (23)$$

where C is a matrix for a total filter (block 1140), which is given by the convolution of the channel h and the filter f. The transmitted chips for symbol periods m−1 and m+1 are included in the expression for y(m) to account for inter-symbol interference. The total filter matrix C may be expressed by a N×3N Toeplitz matrix given as follows:

$$C = \begin{bmatrix} c[N] & c[N-1] & \cdots & c[1] & c[0] & c[-1] & \cdots & c[-N+1] & c[-N] & & & & \\ & \ddots & \ddots & \vdots & c[1] & \ddots & \ddots & \vdots & c[-N+1] & \ddots & & & \\ & & \ddots & c[N-1] & \vdots & \ddots & \ddots & c[-1] & \vdots & \ddots & \ddots & & \\ & & & c[N] & c[N-1] & \cdots & c[1] & c[0] & c[-1] & \cdots & c[-N+1] & c[-N] \\ \hline & C_{-1} & & & & C_0 & & & & C_1 & & \end{bmatrix} \quad (24)$$

where the filter length spans 2N chips (−N to N), and $C_{-1}, C_0,$ and $C_1$ represent the portions of the total filter matrix C that are applied to the transmitted chips for the previous, current and next symbol periods, respectively. The total filter matrix C may be represented by $[C_{-1} \ C_0 \ C_1]$. Plugging the expressions for the transmitted chips in Eqs. (20)-(22) into the expression for the filter output y(m) in Eq. (23) results in:

$$\underline{y}(m) = \sum_{l=-1}^{1} C_l P(m+l) WG\underline{b}(m+l) \quad (25)$$

After filtering by the front-end filter f, the filter output y(m) is descrambled by descrambling matrix $P^H(m)$ (block 1150), which is the Hermitian of the scrambling matrix P(m). After descrambling, the descrambled filter output is despread by despreading matrix $W^T$ (block 1160), which is the transpose of the spreading matrix W. The descrambling and despreading result in received symbols z(m) for users 1 to Nu. The received symbols z(m) may be given as follows:

$$\underline{z}(m) = W^T P^H(m) \underline{y}(m) \quad (26)$$

Plugging the expression for y(m) into Eq. (26) results in:

$$\underline{z}(m) = W^T P^H(m) \sum_{l=-1}^{1} C_l P(m+l) WG\underline{b}(m+l) \quad (27)$$

Based on Eq. (27), the multi-user interference and shoulder matrices $A_{-1}, A_0, A_1$, respectively, for symbol period m may be represented as follows:

$$A_{-1}(m) = W^T P^H(m) C_{-1} P(m-1) W \quad (28)$$

$$A_0(m) = W^T P^H(m) C_0 P(m) W \quad (29)$$

$$A_1(m) = W^T P^H(m) C_1 P(m+1) W \quad (30)$$

Using Eqs. (28)-(30), the multi-user interference and shoulder matrices $A_{-1}, A_0, A_1$ can be computed. In one aspect, Fast Hadamard Transforms (FHTs) are used to efficiently compute the multi-user interference and shoulder matrices $A_{-1}, A_0, A_1$, as discussed below.

A FHT operation computes the product of a Hadamard matrix and a vector, in which a $2^n$ order Hadamard matrix may be recursively defined by:

$$H_{2^n} = \begin{bmatrix} H_{2^{n-1}} & H_{2^{n-1}} \\ H_{2^{n-1}} & -H_{2^{n-1}} \end{bmatrix} \quad (31)$$

where $H_2$ is given by:

$$H_2 = \begin{bmatrix} 1 & 1 \\ 1 & -1 \end{bmatrix} \quad (32)$$

A FHT operation may also be used to compute the product of a Hadamard matrix and a matrix since a matrix may be represented by multiple vectors. Computationally efficient systems and methods have been developed to perform FHT operations. For example, a description of computationally efficient FHT operations can be found in U.S. Pat. No. 5,561,618, titled "Method and Apparatus for Performing a Fast Hadamard Transform," issued on Oct. 1, 1996, the specification of which is incorporated herein by reference.

A Walsh matrix may be transformed into a Hadamard matrix by re-ordering the rows or columns of the Walsh matrix. Alternatively, the Walsh codes in the Walsh matrix may already be ordered to form a Hadamard matrix, in which case the Walsh matrix does not need to be transformed. These properties of the Walsh matrix can be exploited to efficiently compute the multi-user interference and shoulder matrices in Eqs. (28)-(30) using FHT operations.

In one aspect, the spreading matrix W in Eqs. (28)-(30) is a Walsh matrix that can be transformed into a Hadamard matrix by reordering the rows or columns of the matrix W. The despreading matrix $W^T$ in Eqs. (28)-(30) is a transpose of the spreading matrix W that may be considered a Walsh matrix that can also be transformed into a Hadamard matrix by reordering the rows or columns of the matrix $W^T$. In this aspect, the product of the Walsh matrix W and another matrix in Eqs. (28)-(30) may be efficiently computed using FHT operations by reordering the rows or columns of the Walsh matrix W to transform the Walsh matrix W into a corresponding Hadamard matrix, and reordering the rows or columns of the other matrix in a similar manner. The other matrix may be one or a combination of matrices in Eqs. (28)-(30). FHT operations are then used to compute the product of the corresponding Hadamard matrix and the other matrix with its rows or columns reordered. After the FHT operations, the rows or columns of the resulting matrix may be reordered in a reverse manner as the Walsh matrix W to obtain the desired product. The reordering operations are not needed if the Walsh codes in the Walsh matrix W are already ordered to form a Hadamard matrix, in which case the FHT operations can be applied directly to the Walsh matrix W.

The product of the Walsh matrix $W^T$ and another matrix in Eqs. (28)-(30) may also be computed using FHT operations in a similar manner. The matrices in Eqs. (28)-(30) selected for the FHT operations may be based on, e.g., a selection resulting in an efficient hardware and/or software implementation. Two examples of using FHT operations to efficiently compute the multi-user interference and shoulder matrices are provided below.

In one example, FHT operations can be used to efficiently compute the product given by:

$$A_0(m) = W^T M \quad (33)$$

where $W^T$ is the despreading matrix, which in this example is a Walsh matrix comprising a plurality of Walsh codes, and M is a combined matrix given by:

$$M = P^H(m) C_0 P(m) W \quad (34)$$

The product of matrices $W^T$ and M is equivalent to Eq. (29) for computing the interference matrix $A_0$ where matrix $W^T$ corresponds to the despreading matrix. In order to apply FHT operations, the Walsh matrix $W^T$ is transformed into a Hadamard by reordering the rows (Walsh codes) in the matrix $W^T$. The rows of matrix M are also reordered in a similar manner as matrix $W^T$. After row reordering, the product may be given by:

$$A_0'(m) = HM' \quad (35)$$

where H is the Hadamard matrix corresponding to $W^T$ and M' is matrix M after the rows have been reordered. FHT operations may then be used to efficiently compute the product in Eq. (35). After the FHT operations, the rows of the resulting matrix $A_0'$ may be reordered in a reverse manner as matrix $W^T$ to obtain the interference matrix $A_0$. The shoulder matrices $A_{-1}$ and $A_1$ may be computed in a similar manner using FHT operations.

The matrix M in Eq. (33) may also be computed using FHT operations. In one aspect, the matrix M may be expressed by:

$$M = [[P^H(m) C_0 P(m) W]^T]^T \quad (36)$$

using the property:

$$M = [M^T]^T \quad (37)$$

where T is a transpose. Equation (36) may be rewritten as follows:

$$M = [W^T (P^H(m))^T C_0^T P^T(m)]^T \quad (38)$$

$$M = [W^T P^T(m) C_0^T (P^H(m))^T]^T \quad (39)$$

$$M = [W^T P^T(m) C_0^T P^*(m)]^T \quad (40)$$

In one aspect, matrix M in Eq. (40) is efficiently computed using FHT operations. To do this, the matrix $W^T$ is transformed into a corresponding Hadamard matrix by re-ordering the rows of the matrix $W^T$, and the rows of the combined matrix $P^T(m) C_0^T P^*(m)$ are reordered in a similar manner. After row reordering, the product may be efficiently computed using FHT operations. After the FHT operations, the rows of the resulting matrix are reordered in a reverse manner as the rows of $W^T$. Finally, after row reordering, the transpose of the resulting matrix is taken to obtain the matrix M. The matrix M for the shoulder matrices $A_{-1}$ and $A_1$ may be computed in a similar manner using FHT operations.

Figure 12A:
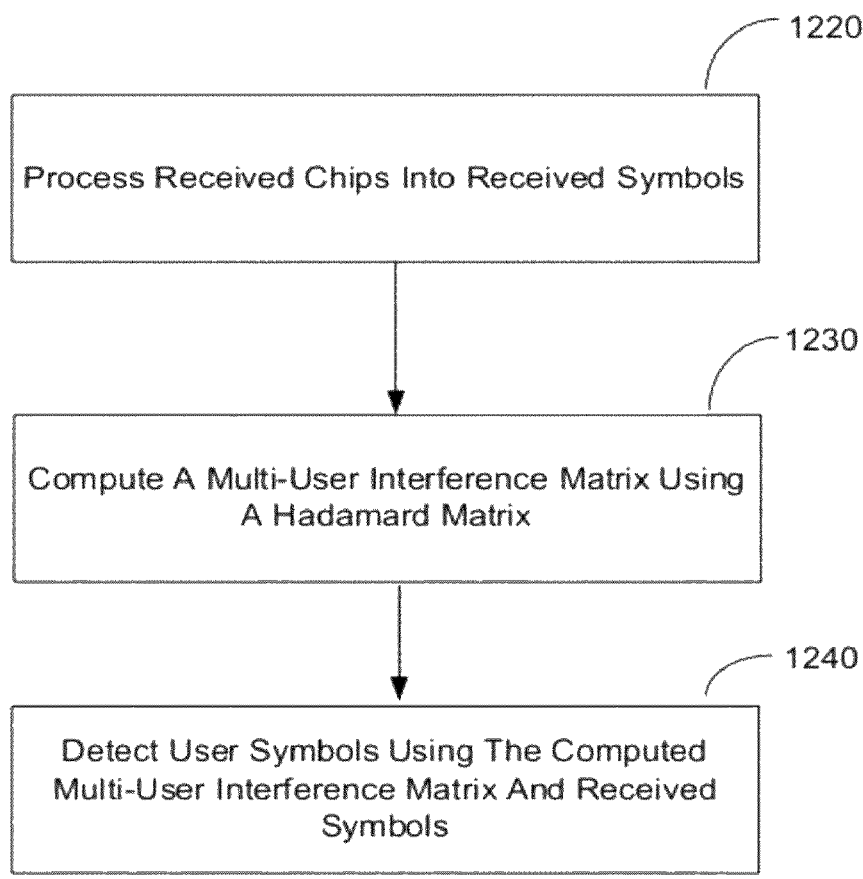
FIG. 12a is a flow diagram illustrating a method of multi-user detection, according to certain aspects of the present disclosure.

FIG. 12a is a flow diagram illustrating a process of multi-user detection using a Hadamard matrix in a wireless communication system, according to certain aspects of the present disclosure. Chips are received at a receiver 200 as part of a mobile station 106. At operation 1220 the received chips are processed into one or more received symbols for a plurality of users.

From operation 1220, the process continues to operation 1230 where a multi-user interference matrix is computed using a Hadamard matrix. For example, the multi-user interference matrix may be computed by transforming a Walsh matrix in Eq. (29) into the Hadamard matrix and multiplying the Hadamard matrix with one or a combination of the other matrices in Eq. (29) using FHT operations. If the Walsh matrix is already in Hadamard form, then the Wlash matrix may be directly multiplied with the other matrix using FHT operations.

From operation 1230, the process continues to operation 1240 where the computed multi-user interference matrix and received symbols are used to detect the desired user symbols.

Figure 12B:
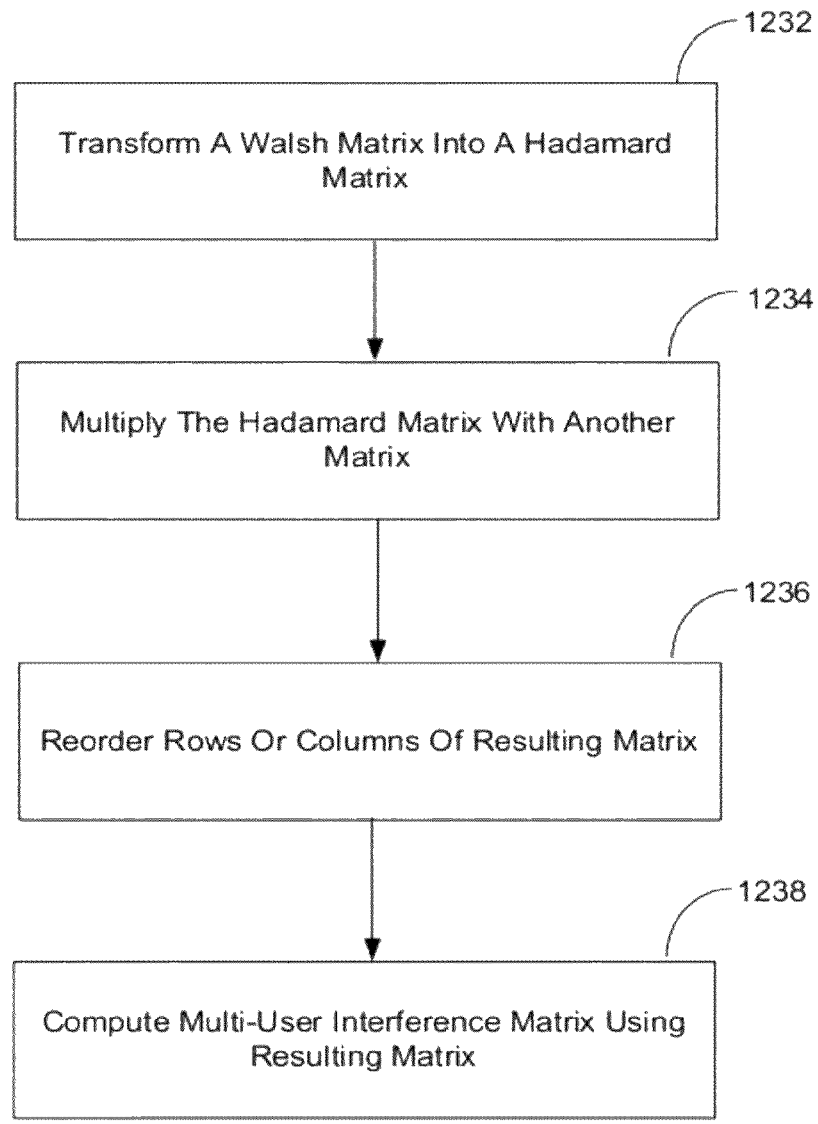
FIG. 12b is a flow diagram illustrating a method of computing a multi-user interference matrix, according to certain aspects of the present disclosure.

FIG. 12b is a flow diagram illustrating a process of computing the multi-user interference matrix using a Hadamard matrix, according to certain aspects of the present disclosure. At operations 1232, a Walsh matrix is transformed into a Hadamard matrix, for example, by reordering rows or columns of the Walsh matrix. The Walsh matrix may be a spreading matrix or a despreading matrix comprising a plurality of Walsh codes. The Hadamrd matrix corresponding to the Walsh matrix may be stored in memory and retrieved from memory when computing the multi-user interference matrix.

From operation 1232, the process continues to continues to operation 1234 where the Hadamard matrix is multiplied by another matrix. For example, the other matrix may be a scrambling matrix, a descrambling matrix, a total filter matrix or a combination thereof. The rows or columns of the other matrix may be reordered to match the reordering of rows or columns of the Walsh matrix in operations 1232. The multiplication in operation 1234 may be performed using FHT operations for efficient computation.

From operation 1234, the process continues to operation 1236 where the rows or columns of the matrix resulting from operation 1234 are reordered. For example, the rows or columns of the resulting matrix may be reordered in a reverse manner as the Walsh matrix. The reordering operations described above may be omitted if the Walsh codes of the Walsh matrix are already ordered in the form of a Hadamard matrix. In this case, FHT operations can be used directly to multiply the Walsh matrix by the other matrix to compute the matrices $A_{-1}$, $A_0$, $A_1$. In addition, FHT operations may be used to perform the despreading.

From operation 1236, the process continues to operation 1268 where the resulting matrix from operation 1234 is used to compute the multi-user interference matrix.

Figure 12C:
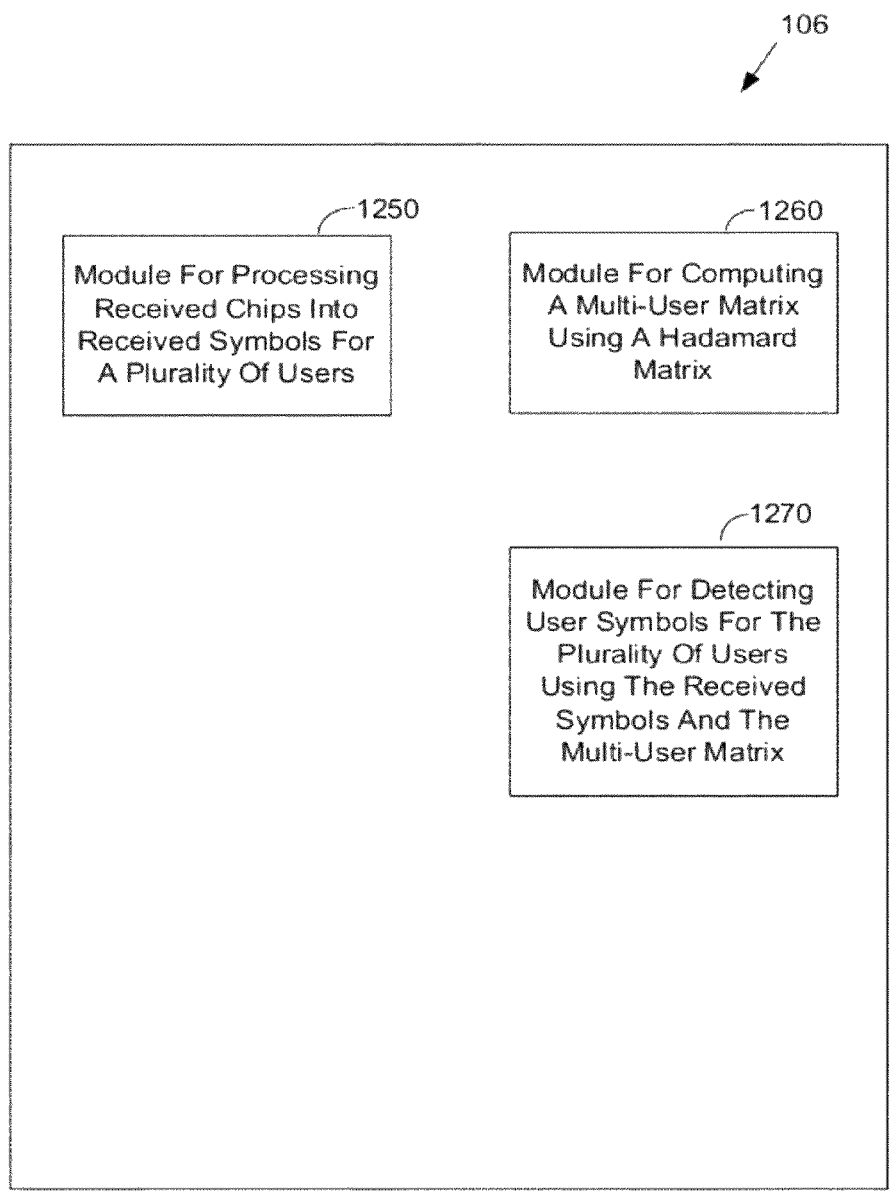
FIG. 12c is a block diagram of a mobile station used in a wireless communication system, according to certain aspects of the present disclosure.

FIG. 12c is a block diagram of a mobile station 106 used in a wireless communication system 100, according to certain aspects of the present disclosure. Mobile station 106 of FIG. 12c includes a module 1250 for processing chips into one or more received symbols for a plurality of users, where the chips are filtered through front-end processing unit and then descrambled and despreaded and output as symbols z(m).

The mobile station 106 further includes a module 1260 for computing a multi-user interference matrix using a Hadamard Matrix. As described above, the Hadamard Matrix allows efficient computation of the multi-user interference matrix using FHT operations. The mobile station 106 further includes a module 1270 for detecting the user symbols $\hat{b}(m)$ using the multi-user interference matrix (e.g., based on Eq. (16)) and the received symbols z(m).

Figure 13:
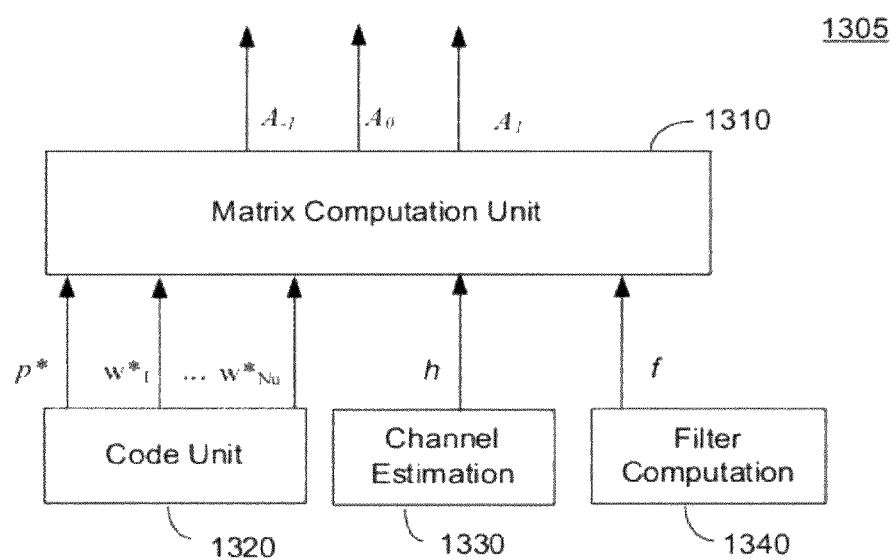
FIG. 13 is a schematic of a system for computing multi-user interference and shoulder matrices, according to certain aspects of the present disclosure.

FIG. 13 is a schematic of a system 1305 for computing the multi-user interference and shoulder matrices $A_{-1}$, $A_0$, $A_1$, according to certain aspects of the present disclosure. In this aspect, the system 1305 comprises a matrix computation unit 1310, a code unit 1320, a channel estimation unit 1330, and a filter computation unit 1340. The code unit 1320 provides descrambling code p*(n) and despreading codes $w^*_1(n)$ to $w^*_{Nu}(n)$ to the matrix computation unit 1310. The code unit 1320 may store descrambling and despreading codes for many cells in the memory 250 (shown in FIG. 2) and output the codes for the cell currently serving the mobile station 106. The code unit 1320 may also provide the scrambling code p(n) and spreading codes $w_1(n)$ to $w_{Nu}(n)$ to the matrix computation unit 1310 (not shown in FIG. 13). Alternatively, the code unit 1320 may provide either the scrambling codes or descrambling codes to the matrix computation unit 1310, in which case the matrix computation unit 1310 can derive the scrambling codes or descrambling codes from the received codes. The same applies to the spreading and despreading codes.

The channel estimation unit 1330 provides a channel estimate h to the matrix computation unit 1310. The channel estimation unit 1330 may estimate the channel using pilot-based channel estimation, data-aided channel estimation or any other channel estimation technique. Data-aided channel estimation is described in further detail below.

The filter computation unit 1340 provides the filter f parameter to the matrix computation unit 1310. In one aspect, the filter computation unit 1340 may compute the filter coefficients for the front-end filter and provide the filter f parameter to the matrix computation unit 1310 based on the computed filter coefficients. For an example of a channel-matched filter (CMF), the filter coefficients, and hence the filter f parameter, may be based on a time-inverse conjugate h*(−n) of the channel estimate h.

In one aspect, the matrix computation unit 1310 may use the received channel estimate h and filter f parameter to compute the total filter matrix C (e.g., based on Eq. (24)). The matrix computation unit 1310 may then compute the multi-user interference and shoulder matrices $A_{-1}$, $A_0$, $A_1$ using the total filter matrix C and the scrambling, descrambling, spreading and despreading matrices derived from the received codes (e.g., based on Eqs. (28)-(30)). The matrix computation unit 1310 may use FHT operations to efficiently compute the multi-user interference and shoulder matrices when Walsh codes are used for spreading, as discussed above. The matrix computation 1310 may then provide the computed multi-user interference and shoulder matrices $A_{-1}$, $A_0$, $A_1$ to the detection unit 260 or any other detection unit including any of the detection units discussed in the present disclosure.

Multi-User Interference Cancellation

In an aspect of the disclosure, multi-user detection systems and methods are provided with symbol-level multi-user interference cancellation. In this aspect, user symbols for the symbol periods m−1, m, and m+1 are initially detected, and the initially detected user symbols are used to compute multi-user interference for symbol period m. The computed multi-user interference is then removed (cancelled) from the received symbols for symbol period m. The user symbols for symbol period m are then redetected from the received symbols with the computed multi-user interference removed.

In this aspect, the initially detected user symbols for symbol periods m−1, m, and m+1 may be represented in vector form as $\hat{b}(m-1)$, $\hat{b}(m)$, and $\hat{b}(m+1)$, respectively. The initial user symbol detection may be performed using any detection technique including any of the detection techniques described in the present disclosure. For example, user symbols for a certain symbol period may be initially detected from the received symbols for the same symbol period using Eq. (16), in which inter-symbol interference is neglected to simplify the detection computation. In this example, once the interference matrix, gain matrix and received data symbols in Eq. (16) are known, various techniques may be applied to Eq. (16) to solve for the desired user symbols including MMSE, MLD, SD, MAPD, and slicing.

After the user symbols $\hat{b}(m-1)$ and $\hat{b}(m+1)$ for symbol periods m−1 and m+1 are initially detected, multi-user inter-symbol interference for symbol period m may be computed as follows:

$$\hat{I}_{inter-symbol}(m) = A_{-1}(m)G\hat{b}(m-1) + A_{+1}(m)G\hat{b}(m+1) \quad (41)$$

where $A_{-1}(m)$ and $A_{+1}(m)$ are shoulder matrices (which may be computed using Eqs. (15) and (14), respectively) and G is the gain matrix (which may be given by Eq. (17)). For each user, Eq. (41) accounts for inter-symbol interference from other users as well as inter-symbol interference from the previous and next user symbols for the same user.

After the user symbol $\hat{b}(m)$ for symbol period m is initially detected, the multi-user interference from user symbols at symbol period m may be computed as follows:

$$\hat{I}_{multi-user}(m) = A_0(m)G\hat{b}(m) - \text{diag}\{A_0(m)\}G\hat{b}(m) \quad (42)$$

where $A_0(m)$ is the multi-user interference matrix (which may be computed using Eq. (13)) and $\text{diag}\{A_0(m)\}$ is a diagonal matrix, in which only the diagonal coefficients in the multi-user interference matrix are retained (i.e., non-diagonal coefficients are zero). The multi-user interference matrix $A_0(m)$ not only relates the received symbols to multi-user interference, but also relates the received data symbols to their respective desired user symbols. Therefore, the diagonal matrix diag{$A_0(m)$} is used in Eq. (42) to subtract out the portion of $A_0(m)G\hat{b}(m)$ that is contributed by the respective desired user symbols so that only the multi-user interference remains in Eq. (42).

The interferences given in Eqs. (41) and (42) may be combined to express the multi-user interference $\hat{\underline{I}}(m)$ for symbol period m as follows:

$$\hat{\underline{I}}(m) = \begin{Bmatrix} A_{-1}(m)G\hat{\underline{b}}(m-1) + \\ A_{+1}(m)G\hat{\underline{b}}(m+1) \end{Bmatrix} + A_0(m)G\hat{\underline{b}}(m) - \text{diag}\{A_0(m)\}G\hat{\underline{b}}(m) \quad (43)$$

The computed multi-user interference $\hat{\underline{I}}(m)$ for symbol period m in Eq. (43) accounts for multi-user interference from user symbols at symbol period m as well as multi-user inter-symbol interference from user symbols at the previous symbol period m−1 and the next symbol period m+1. The inter-symbol interference in Eq. (43) may be omitted to simplify the multi-user interference computation.

After the multi-user interference $\hat{\underline{I}}(m)$ is computed using the initially detected user symbols $\hat{\underline{b}}(m-1)$, $\hat{\underline{b}}(m)$, and $\hat{\underline{b}}(m+1)$, the computed multi-user interference may be removed (cancelled) from the received symbols as follows:

$$\tilde{z}(m) = z(m) - \hat{\underline{I}}(m) \quad (44)$$

where z(m) is a vector of the received symbols for symbol period m, and $\tilde{z}$(m) is a vector of the received symbols for symbol period m with the computed interference removed. Plugging the expression for the multi-user interference from Eq. (43) into Eq. (44) results in:

$$\tilde{z}(m) = \quad (45)$$
$$z(m) - \begin{Bmatrix} A_{-1}(m)G\hat{\underline{b}}(m-1) + \\ A_{+1}(m)G\hat{\underline{b}}(m+1) \end{Bmatrix} - A_0[m]G\hat{\underline{b}}(m) + \text{diag}\{A_0(m)\}G\hat{\underline{b}}(m)$$

After the computed interference is removed from the received symbols to obtain $\tilde{z}$(m), the desired user symbols $\hat{b}$(m) may be redetected from $\tilde{z}$(m).

Thus, this aspect uses information about the user symbols for symbol periods m−1, m, m+1 obtained from the initial detection to compute multi-user interference at the symbol level. The computed multi-user interference is then removed (cancelled) from the received symbols for symbol period m, thereby canceling multi-user interference from the received symbols. The multi-user interference cancellation provides improved multi-user detection with cancellation gain. Further, the multi-user interference is computed and removed from the received symbols at the symbol level without having to perform complex chip-level multi-user interference cancellation.

In one aspect, the desired user symbols $\hat{b}$(m) are redetected from the received symbols $\tilde{z}$(m) with the computed interference removed using slicing as follows:

$$\hat{\underline{b}}(m) - \text{slice}(\tilde{z}(m)) \quad (46)$$

For an example of Binary Phase Shift Keying (BPSK) modulation, the slicing may be given as follows:

$$\text{slice}(\tilde{z}(m)) = \text{sign}\{\text{Re}(\tilde{z}(m))\} \quad (47)$$

In the example of BPSK modulation, the bit value of a user symbol may be decided based a sign of the received symbol $\tilde{z}$(m) with interference cancellation. For an example of Quadrature Phase Shift Keying (QPSK) modulation, in which each symbol represents two bits, the slicing may be given as follows:

$$\text{slice}(\tilde{z}(m)) = \frac{1}{\sqrt{2}}\text{sign}\{\text{Re}(\tilde{z}(m))\} + \frac{j}{\sqrt{2}}\text{sign}\{\text{Im}(\tilde{z}(m))\} \quad (48)$$

In the example of QPSK modulation, the two bit values of a user symbol may be decided based on the signs of the real and imaginary parts of the received symbol $\tilde{z}$(m) with interference cancellation. Other detection techniques may be used to redetect the user symbols $\hat{b}$(m) besides slicing. Also, other modulation schemes may be used for the user symbols, for example 16-Qaudrature Amplitude Modulation (QAM) where each user symbol carries four bits of information. Further, the above slicing may be used in the initial detection of the user symbols.

Figure 14:
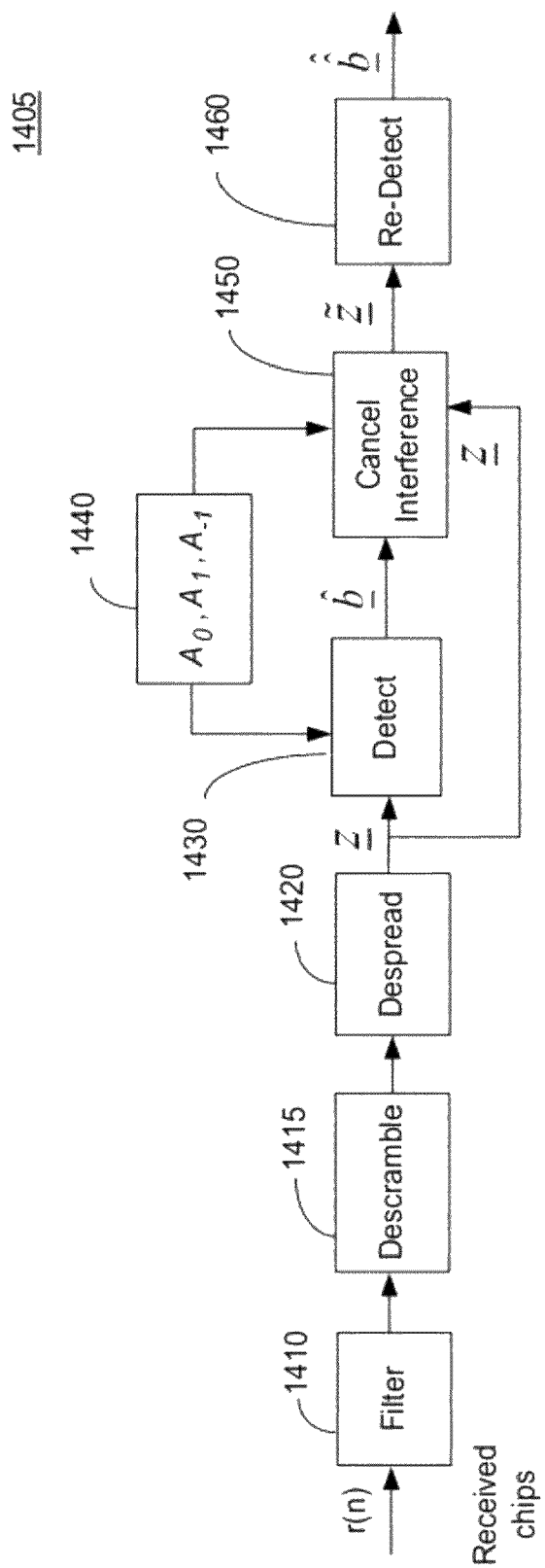
FIG. 14 is a schematic of a multi-user detection system with interference cancellation, according to certain aspects of the present disclosure.

FIG. 14 is a schematic of a multi-user detection system 1405 with interference cancellation, according to certain aspects of the present disclosure. The detection system 1405 may be at a mobile station in a wireless communication system. The detection system 1405 comprises a filter 1410 for filtering received chips r(n), a descramble unit 1415 for descrambling the filtered chips, and a despread unit 1420 for despreading the descrambled chips into received data symbols z(m). The filter 1410 may comprise an equalizer, and/or a channel-matched filter. After filtering, the descramble unit 1415 descrambles the filtered chips using a descrambling code. The despread unit 1420 then despreads the descrambled chips using a set of despreading codes. In one aspect, each despreading code may correspond to a different user and may be used to obtain a received symbol for the corresponding user. In this aspect, the despread unit 1420 outputs a set of received symbols z(m) during each symbol period using the set of despreading codes.

The detection system 1405 further comprises a detection unit 1430, a matrix computation unit 1440, an interference cancellation unit 1450, and a redetection unit 1460. The detection unit 1430 performs an initial detection of the desired user symbols from the received symbols z(m) during each symbol period. The detection unit 1430 may initially detect the user symbols $\hat{b}$(m) using any detection technique including any of the detection techniques discussed in the present disclosure.

The interference cancellation unit 1450 receives the initially detected user symbols $\hat{b}$(m) for each symbol period from the detection unit 1430. In one aspect, the interference cancellation unit 1450 computes multi-user interference $\hat{I}$(m) for the symbol period m using Eq. (43) and the initially detected user symbols $\hat{b}$(m−1), $\hat{b}$(m) and $\hat{b}$(m+1) for the symbol periods m−1, m, m+1, respectively, from the detection unit 1430. In this aspect, the cancellation unit 1450 may obtain the user symbols $\hat{b}$(m−1), $\hat{b}$(m) and $\hat{b}$(m+1) by storing initially detected user symbols from the detection unit 1430 over a period of at least three symbol periods into memory (e.g., a buffer). In this aspect, the interference cancellation unit 1450 waits until the initially detected user symbols $\hat{b}(m+1)$ for symbol period m+1 are received before going back and computing the multi-user interference $\hat{I}(m)$ for symbol period m.

After computing the multi-user interference, the interference cancellation unit 1450 removes the computed interference $\hat{I}(m)$ from the received symbols $z(m)$ to obtain the received symbols $\tilde{z}(m)$ with the computed interference removed.

The redetection unit 1460 receives the received symbols $\tilde{z}(m)$ with the computed interference removed, redetects the desired user symbols $\hat{\hat{b}}(m)$ from $\tilde{z}(m)$, and outputs the user symbols $\hat{\hat{b}}(m)$. For example, the redetection unit 1460 may redetect the desired user symbols $\hat{\hat{b}}(m)$ by slicing the received symbols $\tilde{z}(m)$ with the computed interference removed.

The matrix computation unit 1440 computes the interference and shoulder matrices $A_{-1}$, $A_0$, $A_{+1}$ for each symbol period, and supplies the matrices to the detection unit 1430 and the interference cancellation unit 1450. The matrix computation unit 1440 may compute the matrices $A_{-1}$, $A_0$, $A_{+1}$ using FHT operations and/or any technique.

Figure 15:
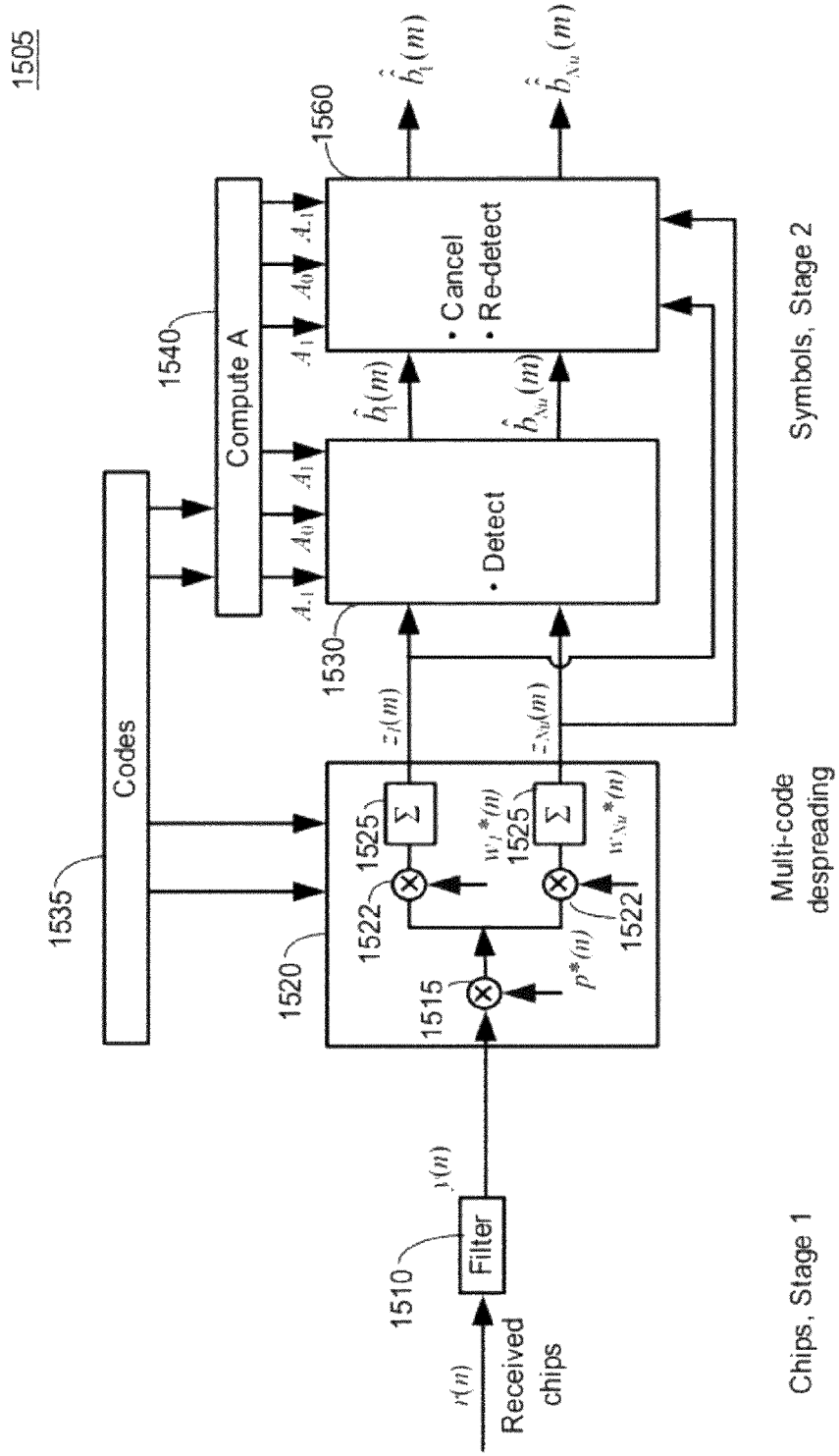
FIG. 15 is a schematic of a multi-user detection system with interference cancellation, according to certain aspects of the present disclosure.

FIG. 15 is a schematic of a multi-user detection system 1505 with interference cancellation, according to certain aspects of the present disclosure. The detection system 1505 may be at a receiver in a wireless communication system. The detection system 1505 comprises a filter 1510 for filtering received chips r(n), and a descramble and despread unit 1520. The filter 1510 may comprise an equalizer, and/or a channel-matched filter (CFM).

The descramble and despread unit 1520 comprises a descramble mixer 1515, a plurality of despread mixers 1522 and a plurality of corresponding summation blocks 1525. The descramble mixer 1515 mixes the filtered received chips y(n) with a descrambling code p*(n) to descramble the filtered received chips y(n). The descrambling code p*(n) may be a conjugate of the scrambling code used at the transmitter side (e.g., base station). The despread mixers 1522 then mix the descrambled signal with a set of despreading codes $w_1^*(n)$ to $w_{Nu}^*(n)$ corresponding to multiple users 1 to Nu, respectively. The despreading codes $w_1^*(n)$ to $w_{Nu}^*(n)$ may be conjugates of the spreading codes used at the transmitter side (e.g., base station 104). The despread signal from each despread mixer 1522 is inputted to the respective summation block 1525, which accumulates the despread signal over a period of one symbol to produce a received symbol for the corresponding user. The descramble and despread unit 1520 outputs a set of received symbols $z_1(m)$ to $z_{Nu}(m)$ for the multiple users during each symbol period. Thus, the descramble and despread unit 1520 converts the filtered received chips from the chip-level to the symbol-level. The set of received symbols $z_1(m)$ to $z_{Nu}(m)$ may also be expressed in vector form as $z(m)$.

The detection system 1505 also comprises a detection unit 1530, a cancellation and redetection unit 1560, a code unit 1535 and a matrix computation unit 1540. The detection unit 1530 performs an initial detection of the desired user symbols from the received symbols $z_1(m)$ to $z_{Nu}(m)$. The detection unit 1530 may initially detect the user symbols $\hat{b}_1(m)$ to $\hat{b}_{Nu}(m)$ using any detection technique including any of the techniques discussed in the present disclosure. For example, the detection unit 1530 may initially detect the user symbols $\hat{b}_1(m)$ to $\hat{b}_{Nu}(m)$ by solving for the desired user symbols in Eq. (16) using any one of a number of different techniques including MMSE, MLD, SD, MAPD, and slicing. The user symbols $\hat{b}_1(m)$ to $\hat{b}_{Nu}(m)$ may also be expressed in vector form as $\hat{b}(m)$.

The cancellation and redetection unit 1560 receives the initially detected user symbols $\hat{b}_1(m)$ to $\hat{b}_{Nu}(m)$ for each symbol period from the detection unit 1530, and computes the multi-user interference for the symbol period m (e.g., based on Eq. (43)) using the initially detected user symbols for the symbol periods m−1, m, m+1, respectively, from the detection unit 1530. In this aspect, the cancellation and redetection unit 1560 may comprise memory 250 (shown in FIG. 2) to store initially detected user symbols from the detection unit 1530 over a period of at least three symbol periods. The cancellation and redetection unit 1560 may then use the stored initially detected user symbols for the symbol periods m−1, m, m+1 to compute the multi-user interference for symbol period m. The cancellation and redetection unit 1560 removes the computed interference for symbol period m from the received symbols $z_1(m)$ to $z_{Nu}(m)$ for symbol period m. The cancellation and redetection unit 1560 then redetects the user symbols $\hat{\hat{b}}_1(m)$ to $\hat{\hat{b}}_{Nu}(m)$ from the received symbols with the computed interference removed, and outputs the redetected user symbols $\hat{\hat{b}}_1(m)$ to $\hat{\hat{b}}_{Nu}(m)$. The redetected user symbols $\hat{\hat{b}}_1(m)$ to $\hat{\hat{b}}_{Nu}(m)$ may be expressed in vector form as $\hat{\hat{b}}(m)$.

The code unit 1535 supplies the descrambling and despreading codes to the descramble and despread unit 1520 and the matrix computation unit 1565. The despreading codes may be stored in memory 250 (not shown in FIG. 15). The matrix computation unit 1540 computes the interference and shoulder matrices $A_{-1}$, $A_0$, $A_{+1}$ for each symbol period, and supplies the matrices to the detection unit 1530 and the cancellation and redetection unit 1560.

Figure 16A:
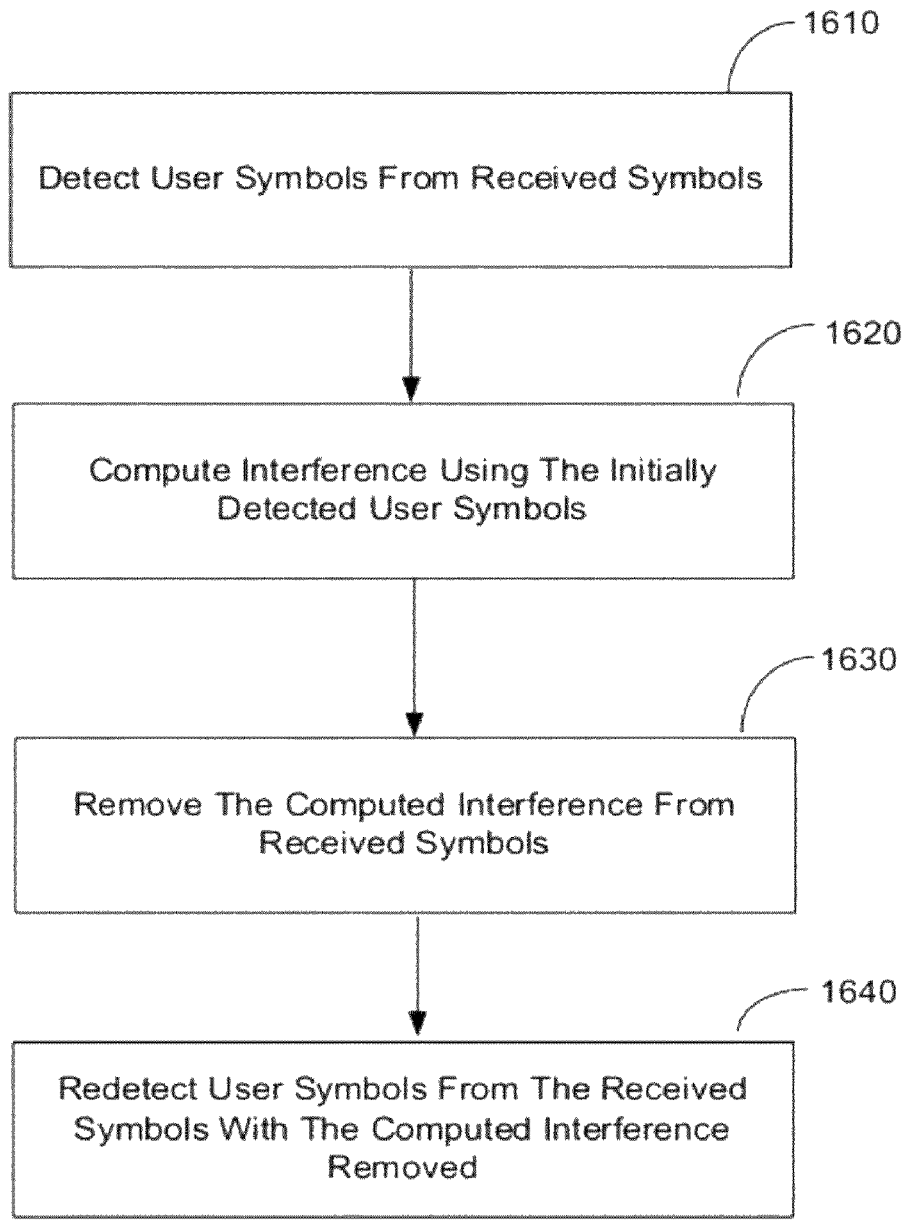
FIG. 16a is a flow diagram illustrating a method of multi-user detection with interference cancellation, according to certain aspects of the present disclosure.

FIG. 16a is a flow diagram illustrating a process of multi-user detection with interference cancellation, according to certain aspects of the present disclosure. This process may be performed, for example, at a mobile station 106 to detect user symbols from the transmitter side (e.g., base station 104), where the detected user symbols are estimated of the user symbols at the transmitter side.

At operation 1610, user symbols are initially detected from received symbols. For example, user symbols for a certain symbol period may be initially detected from the received symbols for the same symbol period by solving for the user symbols in Eq. (16) using any one of a variety of techniques including MMSE, MLD, SD, MAPD, and slicing.

From operation 1610, the process continues to operation 1620 where multi-user interference is computed using the initially detected user symbols. For example, the multi-user interference for symbol period m may be computed using Eq. (43) and the initially detected user symbols for symbol periods m−1, m, and m+1.

From operation 1620, the process continues to operation 1630 where the computed multi-user interference is removed from the received symbols.

From operation 1630, the process continues to operation 1640 where the user symbols are redetected from the received symbols with the computed interference removed. For example, the user symbols may be redetected by slicing the received symbols with the computed interference removed.

Figure 16B:
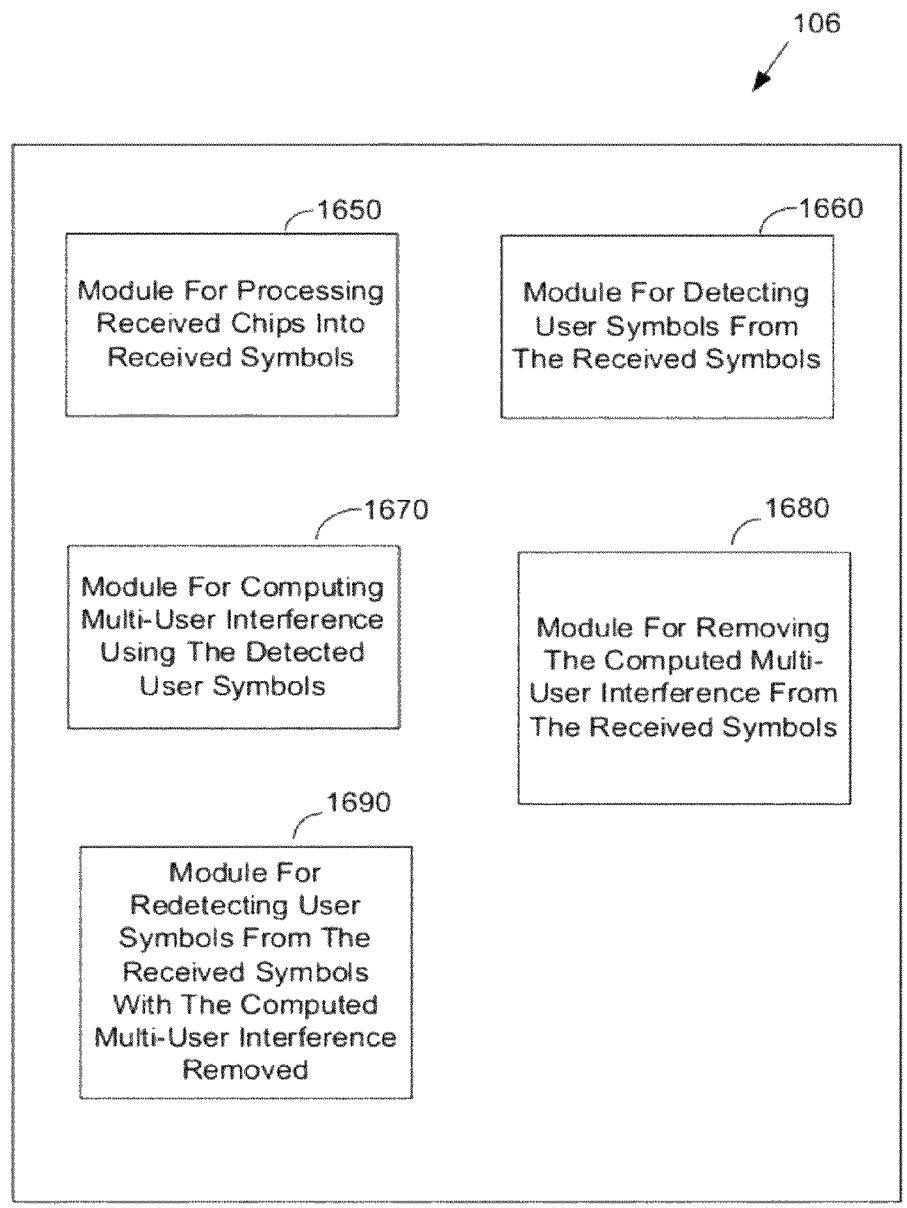
FIG. 16b is a block diagram of a mobile station used in a wireless communication system, according to certain aspects of the present disclosure.

FIG. 16b is a block diagram of a mobile station 106 used in a wireless communication system 100, according to certain aspects of the present disclosure. Mobile station 106 of FIG. 16b includes a module 1650 for processing chips into one or more received symbols for a plurality of users, where the chips are filtered through front-end processing unit and then descrambled and despreaded and output as symbols $z(m)$.

The mobile station 106 further includes a module 1660 for detecting user symbols from the received symbols. For example, the user symbols may be detected by slicing the received symbols. The mobile station 106 further comprises a module 1670 for computing multi-user interference using the detected user symbols (e.g., based on Eq. (43)). The mobile station 106 further includes a module 1680 for removing the computed multi-user interface from the received symbols and a module 1690 for redetecting the user symbols from the received symbols with the computed multi-user interference removed (cancelled out).

Figure 17:
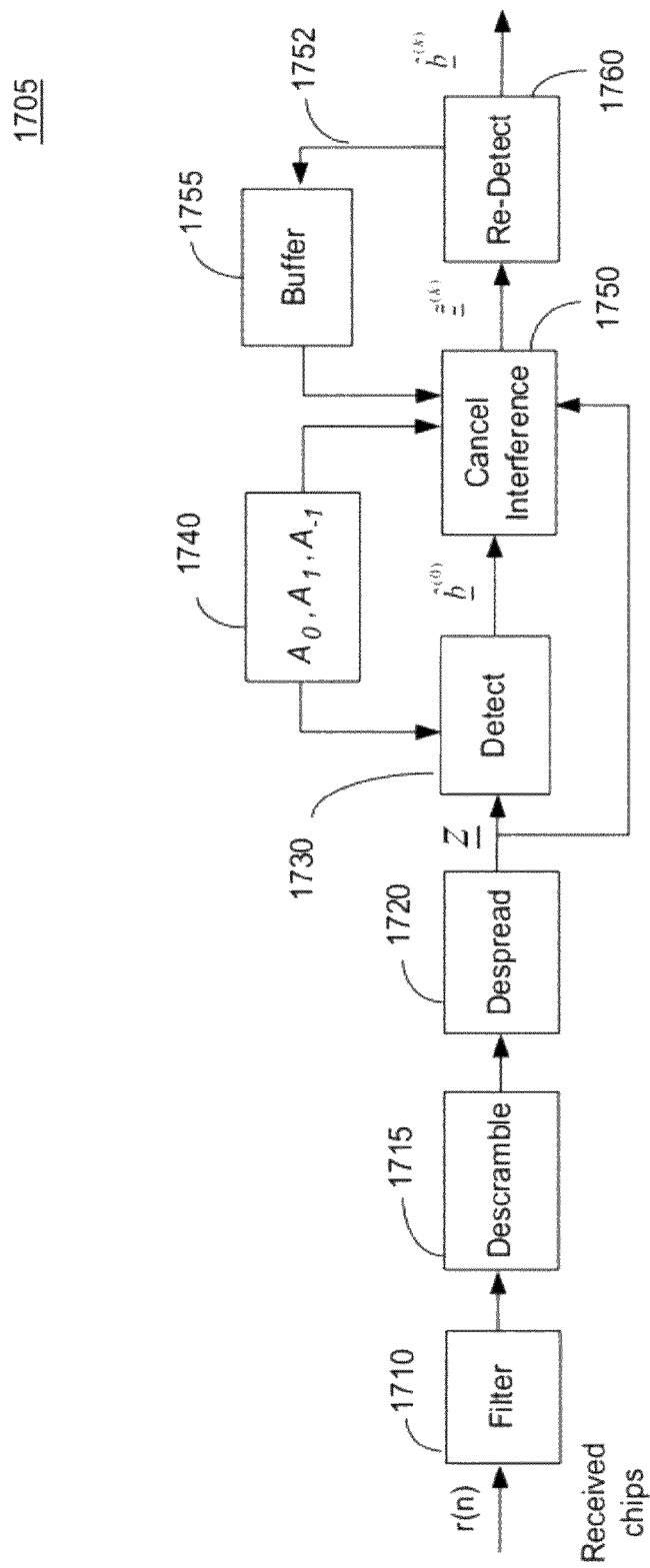
FIG. 17 is a schematic of a multi-user detection system with iterative interference cancellation, according to certain aspects of the present disclosure.

FIG. 17 is a schematic of a multi-user detection system 1705 with iterative interference cancellation, according to certain aspects of the present disclosure. The detection system 1705 may be at a receiver in a wireless communication system. The detection system 1705 according to this aspect is similar to the detection system 1405 in FIG. 14, in which an iterative process is used to refine the redetected user symbols.

In one aspect, multi-user cancellation and redetection are repeated in an iterative process to refine the redetected user symbols. In this aspect, the multi-user interference for each iteration may be given as follows:

$$\hat{I}^{(k)}(m) = \begin{Bmatrix} A_{-1}(m)G\hat{\underline{b}}^{(k-1)}(m-1) + \\ A_{+1}(m)G\hat{\underline{b}}^{(k-1)}(m+1) \end{Bmatrix} - \tag{49}$$
$$A_0(m)G\hat{\underline{b}}^{(k-1)}(m) + \text{diag}\{A_0(m)\}G\hat{\underline{b}}^{(k-1)}(m)$$

where k is an iteration index, $\hat{I}^{(k)}$ (m) is the multi-user interference for iteration k, and $\hat{b}^{(k-1)}$ (m−1), $\hat{b}^{(k-1)}$ (m), and $\hat{b}^{(k-1)}$ (m+1) are the redetected user symbols from the previous iteration k−1 for symbol periods m−1, m, and m+1, respectively.

For each iteration, the received user symbols with the multi-user interference removed may be given as:

$$\tilde{z}^{(k)}(m) = z(m) - \hat{I}^{(k)}(m) \tag{50}$$

where k is the iteration index, z(m) is a vector of the received symbols and $\tilde{z}^{(k)}$ (m) is a vector of the received symbols with the multi-user interference for iteration k removed (subtracted out). After $\tilde{z}^{(k)}$ (m) is computed for iteration k, the user symbols for iteration k may be redetected using any detection technique. For example, the user symbols $\hat{b}^{(k)}$ (m) for iteration k may be redetected by slicing $\tilde{z}^{(k)}$ (m) as follows:

$$\hat{\underline{b}}^{(k)}(m) = \text{slice}(\tilde{z}^{(k)}(m)) \tag{51}$$

After the user symbols $\hat{b}^{(k)}$ (m) are redetected for iteration k, the user symbols $\hat{b}^{(k)}$ (m) for iteration k may be used to compute the multi-user iteration for the next iteration k+1 or may be outputted by the detection system 1705 with no more iterations.

The user symbols for the previous and next symbol periods $\hat{b}^{(k)}$ (m−1) and $\hat{b}^{(k)}$ (m+1) may also be redetected for iteration k in a manner similar to $\hat{b}^{(k)}$ (m). For example, the interference $\hat{I}^{(k)}$ (m−1) for the previous symbol period $\hat{b}^{(k)}$ (m−1) may be computed using the redetected user symbols $\hat{b}^{(k-1)}$ (m−2), $\hat{b}^{(k-1)}$ (m−1), and $\hat{b}^{(k-1)}$ (m) from the previous iteration k−1 for symbol periods m−2, m−1, and m, respectively. The computed interference $\hat{I}^{(k)}$ (m−1) may then be removed from the received symbol z(m−1) for symbol period m−1 for redetection. The user symbols for the next symbol period $\hat{b}^{(k)}$ (m+1) may be redetected for iteration k in a similar manner.

In one aspect, received symbols may be processed block-by-block, in which received symbols are collected over a block of L symbol periods (e.g., 100 symbol periods), stored in memory, and processed together. During each iteration in a block, the user symbols for all of the symbol periods in the block may be redetected for the current iteration before advancing to the next iteration. This way, the interference computations for each symbol period in the block has access to redetected user symbols for the previous and next symbol periods in the block from the previous iteration.

The received symbols may also be processed symbol-by-symbol. In this aspect, the interference computations for the current symbol period may use previously stored redetected user symbols for the previous symbol period, and use initially detected user symbols for the next symbol period for all iterations.

In another aspect, the interference computations for the current symbols may use initially detected user symbols for the previous and next symbols periods for all iterations. Thus, in this aspect, only the user symbols for the current symbol period are updated in each iteration.

In the example illustrated in FIG. 17, the detection unit 1730 initially detects user symbols $\hat{b}$(m), which may be similar to the initial detection in FIG. 14. The initially detected user symbols may be expressed in terms of the iteration index as $\hat{b}^{(0)}$ (m) where k=0, as shown in FIG. 17. The cancellation interference unit 1750 then computes the multi-user interference $\hat{I}^{(1)}$ (m) for the first iteration k=1 using the initially detected user symbols $\hat{b}^{(0)}$ (m), and removes the computed multi-user interference $\hat{I}^{(1)}$ (m) from the received symbols z(m). The redetection unit 1760 then redetects the user symbols $\hat{b}^{(1)}$ (m) for the first iteration from the received symbols $\tilde{z}^{(1)}$ (m) with the computed multi-user interference e,cirI$^{(1)}$ (m) removed. The redetected user symbols $\hat{b}^{(1)}$ (m) from the redetection unit 1760 may then be fed back to the interference cancellation unit 1750 using feedback path 1752 to perform another iteration (e.g., based on Eqs. (49)-(51)).

The detection system 1705 may perform any number of iterations (e.g., one or more) to refine the redetected user symbols. For example, the detection system 1705 may perform iterations until the redetected user symbols for consecutive iterations converge (e.g., differences between the user symbols for consecutive iterations are small) and/or other criteria are met. In another example, a predetermined number of iterations may be programmed into the detection system 1705. In this example, the detection system 1705 may increment a counter each time an iteration is performed and stop iterating when the counter reaches the programmed number of iterations.

In one aspect, the feedback 1752 path between the redetection unit 1760 and interference cancellation unit 1750 may include a buffer 1755 to temporarily store user symbols from the redetection unit 1760 for a next iteration. In this aspect, the buffer 1755 may be used to store redetected user symbols over a block of L symbols periods (e.g., 100 symbols periods) to implement block-by-block processing as described above.

Although the detection unit 1730 and redetection unit 1760 are shown separately in FIG. 17, their operations may be performed by a common detection unit. Further, the detection unit 1730 and the redetection unit 1760 may both use the same detection technique, e.g., slicing. In this example, the initial user symbol detection may be performed by applying the same detection technique to the received symbols z(m).

Figure 18:
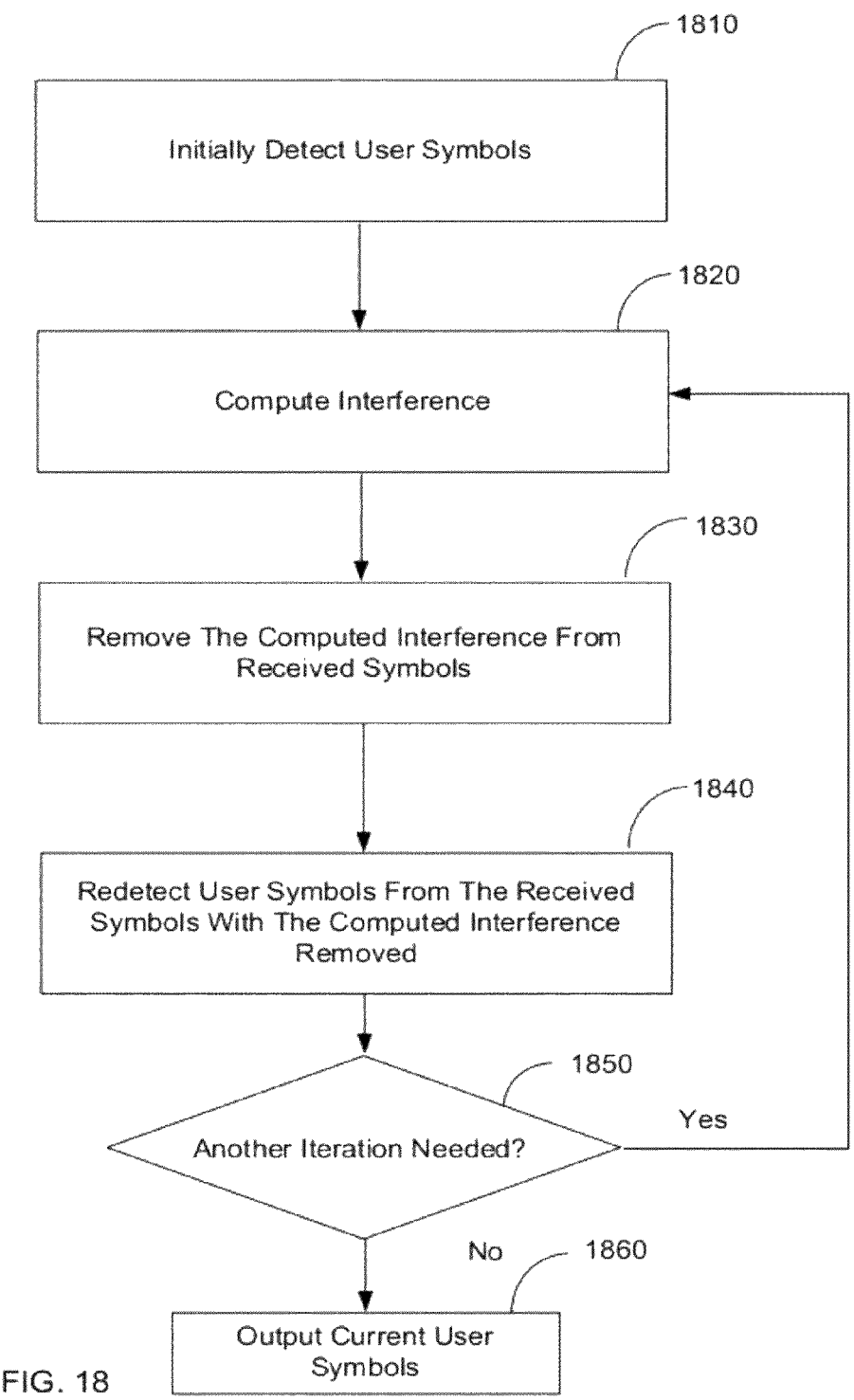
FIG. 18 is a flow diagram illustrating a method of multi-user detection with iterative interference cancellation, according to certain aspects of the present disclosure.

FIG. 18 is a flow diagram illustrating a process of multi-user detection with iterative interference cancellation, according to certain aspects of the present disclosure. At operation 1810, user symbols are initially detected from received symbols.

From operation 1810, the process continues to operation 1820 where multi-user interference is computed. For a first iteration, the multi-user interference may be computed using the initially detected user symbols in operation 1810. For subsequent iterations, the multi-user interference may be computed using redetected user symbols from operation 1840 in a previous iteration, which is discussed further below.

From operation 1820, the process continues to operation 1830 where the computed multi-user interference from operation 1820 is removed from the received symbols.

From operation 1830, the process continues to operation 1840 where the user symbols are redetected from the received symbols with the computed interference removed. For example, the user symbols may be redetected by slicing the received symbols with the computed interference removed.

From operation 1840, the process continues to operation 1850, which determines whether another iteration is needed. If another iteration is needed, then the process returns to operation 1820 to perform the next iteration. In this case, the multi-user interference is re-computed in operation 1820 using the redetected user symbols from operation 1840 in the previous iteration. The recomputed multi-user interference is then removed from the received symbols in operation 1830 and the user symbols are redetected from the received symbols with the recomputed interference removed in operation 1840. The process then continues to operation 1850 to determine whether yet another iteration is needed. Operations 1820 through 1850 can be repeated any number of times.

If another iteration is not needed in operation 1850, then the current redetected user symbols may be outputted in operation 1860. Operation 1850 may determine whether another iteration is needed using any of the techniques discussed above.

Figure 19:
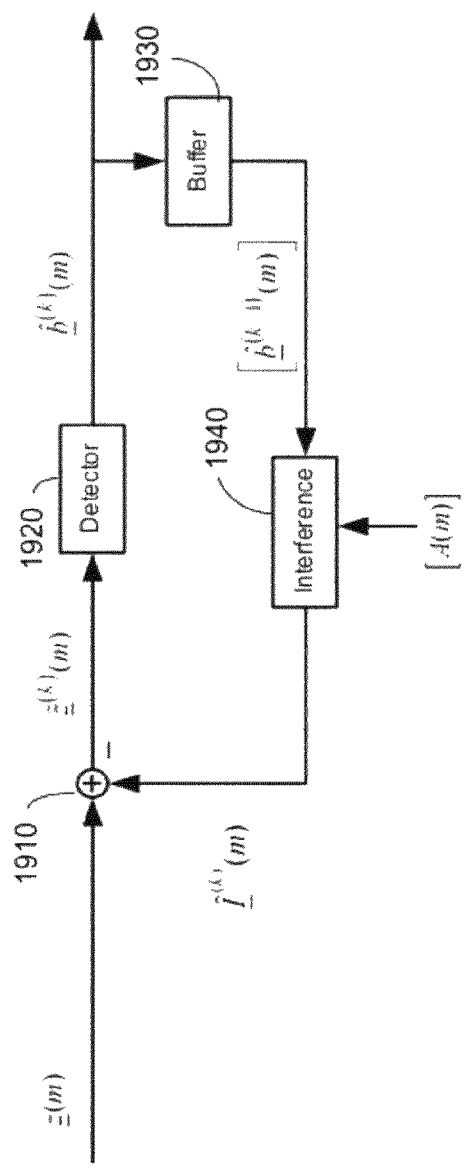
FIG. 19 is a schematic of a multi-user detection system with iterative interference cancellation, according to certain aspects of the present disclosure.

FIG. 19 is a schematic of a multi-user detection system 1905 with iterative interference cancellation, according to certain aspects of the present disclosure. The detection system 1905 may be at a mobile station in a wireless communication system.

The detection system 1905 comprises a subtraction unit 1910, a symbol detector 1920, a buffer 1930, and an interference computation unit 1940. The detection system 1905 receives the received symbols $z(m)$ and iteratively performs multi-user interference cancellation and user symbol detection for a number of iterations.

Operation of the detection system 1905 will now be discussed for the example of multi-user detection of user symbols $\hat{b}^{(k)}(m)$ for symbol period m. The multi-user interference is initialized to zero as follows $\hat{I}^{(0)}(m)=0$, where the iteration index k=0. As a result, the subtraction unit 1910 does not initially remove multi-user interference from the received symbols $z(m)$, and the received symbols $z(m)$ are initially inputted to the symbol detector 1920. The symbol detector 1920 initially detects user symbols $\hat{b}^{(0)}(m)$ from the received symbols $z(m)$. For example, the symbol detector 1920 may initially detect the user symbols $\hat{b}^{(0)}(m)$ by slicing the received symbols $z(m)$ or using other detection techniques including any of the detection techniques discussed in the disclosure.

The initially detected user symbols $\hat{b}^{(0)}(m)$ for symbol period m are temporarily stored in the buffer 1930. In addition, the symbol detector 1920 initially detects user symbols for symbol periods m−1 and m+1, which are also temporarily stored in the buffer 1930. The initially detected user symbols for symbols periods m−1, m and m+1 are then outputted from the buffer 1930 to the interference computation unit 1940. The interference computation unit 1940 computes the multi-user interference $\hat{I}^{(1)}$ for the first iteration k=1 using the initially detected user symbols $\hat{b}^{(0)}(m-1)$, $\hat{b}^{(0)}(m)$ and $\hat{b}^{(0)}(m+1)$ (e.g., based on Eq. (49)). To compute the multi-user interference $\hat{I}^{(1)}$ based on Eq. (49), the interference computation unit 1940 may receive the multi-user interference matrix $A_0(m)$ and the shoulder matrices $A_{-1}(m)$ and $A_1(m)$ from a matrix computation unit, for example, the matrix computation unit 1310 in FIG. 13. The matrices $A_{-1}(m)$, $A_0(m)$ and $A_1(m)$ are represented by $[A(m)]$ in FIG. 19.

The subtraction unit 1910 removes (i.e., cancel out) the multi-user interference $\hat{I}^{(1)}$ for the first iteration from the received symbols $z(m)$. The received symbols $\tilde{z}^{(1)}(m)$ with the computed multi-user interference $\hat{I}^{(1)}(m)$ removed are inputted to the symbol detector 1920. The symbol detector 1920 redetects the user symbols $\hat{b}^{(1)}(m)$ for the first iteration from the received symbols $\tilde{z}^{(1)}(m)$ with the computed multi-user interference $\hat{I}^{(1)}(m)$ removed. The redetected user symbols $\hat{b}^{(1)}(m)$ for the first iteration may then be feed back to the buffer 1930 for a second iteration k=2.

The interference computation unit 1940 recomputes the multi-user interference $\hat{I}^{(2)}$ for the second iteration using the redetected user symbols from the first iteration. The subtraction unit 1910 removes the multi-user interference $\hat{I}^{(2)}$ for the second iteration from the received symbols $\tilde{z}(m)$. The received symbols $\tilde{z}^{(2)}(m)$ with the computed multi-user interference $\hat{I}^{(2)}(m)$ removed are then inputted to the symbol detector 1920. The symbol detector 1920 redetects the user symbols $\hat{b}^{(2)}(m)$ for the second iteration from the received symbols $\tilde{z}^{(2)}(m)$ with the computed multi-user interference $\hat{I}^{(2)}(m)$ removed. The redetected user symbols $\hat{b}^{(2)}(m)$ from the second iteration may then be feed back to the interference computation unit 1940 through the buffer 1930 to perform a third iteration. The detection system 1905 may perform any number of iterations, for example, until the user symbols for consecutive iterations converge.

In one aspect, the interference computation unit 1940 computes the multi-user interference for iteration k using the detected user symbols $\hat{b}^{(k-1)}(m-1)$, $\hat{b}^{(k-1)}(m)$, and $\hat{b}^{(k-1)}(m+1)$ from the previous iteration k−1. The detected user symbols $\hat{b}^{(k-1)}(m-1)$, $\hat{b}^{(k-1)}(m)$, and $\hat{b}^{(k-1)}(m+1)$ from the previous iteration k−1 are represented by $[\hat{b}^{(k-1)}(m)]$ in FIG. 19.

Inter-Cell Cancellation

The multi-user interference cancellation was discussed above in the context of intra-cell interference, in which multi-user interference is caused by multiple users in the same cell (e.g., multiple users serviced by the same base station 104). A mobile station 106 in a wireless communication system may also be subject to inter-cell interferences, in which interference is caused by users in other cells. For example, the mobile station 106 may be more susceptible to inter-cell interference when located near an edge of the serving cell where interference from neighboring cells is stronger. Referring to the example in FIG. 1, the mobile station 106D being served by cell 102D may be subject to inter-cell interference from cells 102F and 102G.

In one aspect, systems and methods are provided for canceling inter-cell interference. In this aspect, inter-cell interference from one or more interfering cells is computed and removed (cancelled) from the received chips in a mobile station 106. After the inter-cell interference is removed from the received chips, the received chips may be processed to detect user symbols for the serving cell, e.g., using any of the systems and methods described in the present disclosure. The serving cell is the cell corresponding to the desired user symbols and may be referred to as a target cell.

Figure 20:
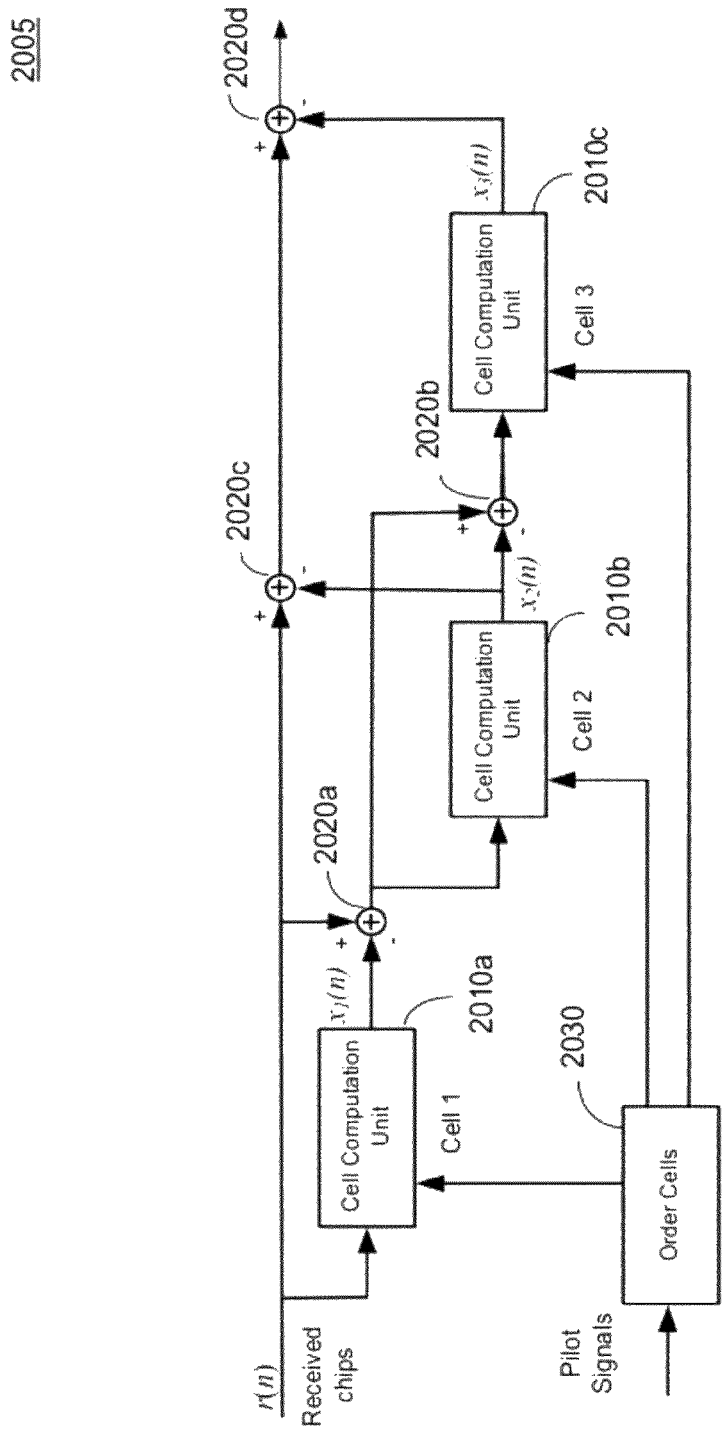
FIG. 20 is a schematic of a detection system with inter-cell interference cancellation, according to certain aspects of the present disclosure.

FIG. 20 is a schematic of an inter-cell interference cancellation system 2005, according to certain aspects of the present disclosure. In this aspect, the inter-cell interference cancellation system 2005 is capable of canceling inter-cell interference from received chips r(n). The received chips after inter-cell interference cancellation may then be processed, e.g., by any one of the detections systems in FIGS. 6, 14, 15 and 17 to detect user symbols for the target cell. For example, the received chips after inter-cell interference cancellation may first be processed into received symbols by a filter and a descramble and despread unit. User symbols for the target cell may then be detected from the received symbols, e.g., using the multi-user detection system in FIG. 19, which provides multi-user interference cancellation for the target cell.

The inter-cell interference cancellation system 2005 comprises first, second and third cell computation units 2010a-2010c, respectively, and first, second, third and fourth subtraction blocks 2020a-2020d, respectively. Each of the cell computation units 2010a-2010c is configured to compute receive chips for a selected cell. In one aspect, the first cell computation unit 2010a computes receive chips for the target cell and each of the second and third cell computation units computes receive chips for a first and second interfering cell, respectively. Each of the cell computation units 2010a-2010c may be implemented using the exemplary cell computation unit 2110 illustrated in FIG. 21, which is discussed in further detail below.

The inter-cell interference cancellation system 2005 also comprises a cell ordering unit 2030. In one aspect, the cell ordering unit 2030 may place the interfering cells in an order and assign an interfering cell to each of the cell computation units 2010b-2010c based on the order. The target cell (i.e., serving cell) is assigned to cell computation unit 2010a. For example, the cell ordering unit 2030 may receive pilot signals from multiple interfering cells (e.g., from antenna 220 and receiver 200), measure the signal strengths of the received pilot signals, and order the interfering cells based on their relative signal strengths at the receiver. For example, the interfering cells may be ordered in order of decreasing signal strength. Thus, the interfering cells are assigned to the second and third cell computation units 2010b and 2010c in order of decreasing signal strength.

In operation, the first cell computation unit 2010a receives the received chips r(n), and computes and outputs the receive chips $x_1(n)$ for the target cell. The first subtraction block 2020a removes the computed receive chips $x_1(n)$ for the target cell from the received chips r(n). The output of the first subtraction block 2020a is inputted to the second cell computation unit 2010b. Thus, the computed receive chips $x_1(n)$ for the target cell are removed from the received chips r(n) prior to the second cell computation unit 2010b. This removes the contribution of the target cell from the received chips r(n) resulting in more reliable computations of the receive chips for the interfering cells.

The second cell computation unit 2010b computes and outputs the receive chips $x_2(n)$ for a first interfering cell (e.g., interfering cell with highest power). The second subtraction unit 2020b removes the receive chips $x_2(n)$ for the first interfering cell from the output of the first subtraction unit 2020a. The output of the second subtraction block 2020b is inputted to the third cell computation unit 2010c. Thus, the receive chips $x_1(n)$ and $x_2(n)$ for the target cell and the first interfering cell, respectively, are removed from the received chips r(n) prior to the third cell computation unit 2010c. This removes the contribution of the target cell and the first interference cell from the received chip resulting in more reliable computation of the receive chips for the second interfering cell. The third cell computation unit 2010c computes and outputs the receive chips $x_3(n)$ for the second interfering cell.

The third and fourth subtraction units 2020c and 2020d remove the computed receive chips $x_2(n)$ and $x_3(n)$ for the first and second interfering cells, respectively, from the received chips r(n). As a result, inter-cell interference from the interfering cells is canceled from the received chips r(n). The received chips after the inter-cell cancellation (i.e., r(n)–$x_2(n)$–$x_3(n)$) may be processed into received symbols for the target cell to detect user symbols for the target cell. The inter-cell interference cancellation system in FIG. 20 may perform inter-cell cancellation for just one interfering cell by omitting the third cell computation unit 2010b. Further, the inter-cell interference cancellation system may be adapted to perform inter-cell cancellation for three or more interfering cells by adding additional cell computation units. Although the cell computation units 2010a-2010c are shown separately in FIG. 19 for ease of illustration, their operations may be performed by the same cell computation unit. For example, the same cell computation unit may be used to sequentially compute the receive chips for the different cells.

Figure 21:
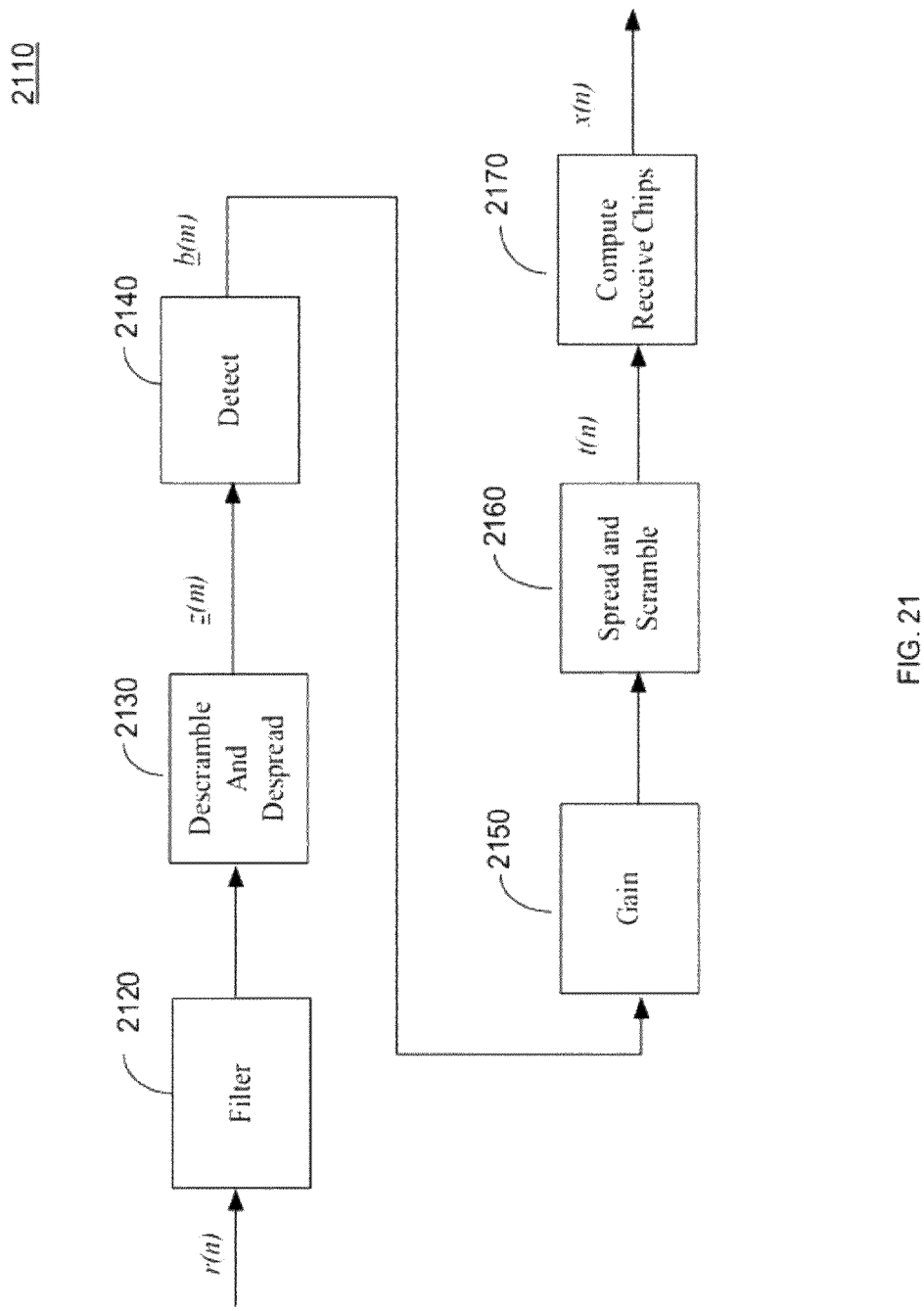
FIG. 21 is a schematic of a cell computation unit, according to certain aspects of the present disclosure.

FIG. 21 is a schematic of a cell computation unit 2110, according to certain aspects of the present disclosure. The cell computation unit 2110 receives the received chips r(n) and outputs the receive chips x(n) for a selected or working cell. The cell computation unit 2110 may also receive the received chips r(n) with previously computed receive chips for other cells removed. The cell computation unit 2110 comprises a filter 2120, a descramble and despread unit 2130, and a detection unit 2140. The filter 2120 filters the received chips and may comprise an equalizer, and/or a channel-matched filter. For the example in which the filter 2120 comprises an equalizer, the equalizer may be implemented using a Frequency Domain Equalizer (FDE). The filter 2120 may filter the received chips based on a channel estimate for the selected cell, e.g., using a pilot signal from the selected cell.

After filtering, the descramble and despread unit 2130 descrambles the received chips using a descrambling code for the selected cell. The descramble and despread unit 2130 then despreads the descrambled signal using a set of despreading codes for the selected cell, where each despreading code may correspond to a different user of the selected cell. The descramble and despread unit 2130 may store a plurality of descrambling codes for different cells in memory and retrieve the descrambling code corresponding to the selected cell. The descramble and despread unit 2130 outputs a set of received symbols z(m) for the selected cell. The detection unit 2140 then detects user symbols b(m) from the received symbols z(m) for the selected cell. The detection unit 2140 may use slicing or other detection techniques to detect the user symbols b(m) for the selected cell. The detected user symbols b(m) provide an estimate of the user symbols at the transmitter side (e.g., base station) of the selected cell.

The cell computation unit 2110 further comprises a gain unit 2150, a spread and scramble unit 2160 and a chip computation unit 2170. The gain unit 2150 and spread and scramble unit 2060 process the user symbols b(m) in a manner similar to the transmitter side (e.g., base station) of the selected cell to estimate the chips transmitted from the transmitter side of the selected cell. The gain unit 2150 applies a set of gains to the user symbols b(m). For example, the gain unit 2150 may apply a different gain to each of the user symbols b(m). Examples of methods for estimating the gains are discussed below.

The spread and scramble unit 2160 then spreads the user symbols using a set of spreading codes, combines the resulting spread signals, and scrambles the combined spread signal to generate transmit chips t(n). The spread and scramble unit 2160 may use the same spreading and scrambling codes used at the transmitter side of the selected cell. The scramble and spread unit 2160 may store a plurality of scrambling codes for different cells in memory and retrieve the scrambling code corresponding to the selected cell. Thus, the cell computation unit 2110 may duplicate processes performed at the transmitter side of the selected cell to compute the transmit chips t(n).

The cell computation unit 2170 then processes the transmit chips t(n) for the selected cell to compute the receive chips x(n) for the selected cell. In one aspect, the cell computation unit 2170 computes the receive chips x(n) for the selected cell by convolving the transmit chips t(n) with a channel estimate h(n) for the selected cell. The channel estimate h(n) for the selected cell may be estimated, e.g., from a pilot signal received from a base station of the selected cell using pilot-based channel estimation.

Figure 22A:
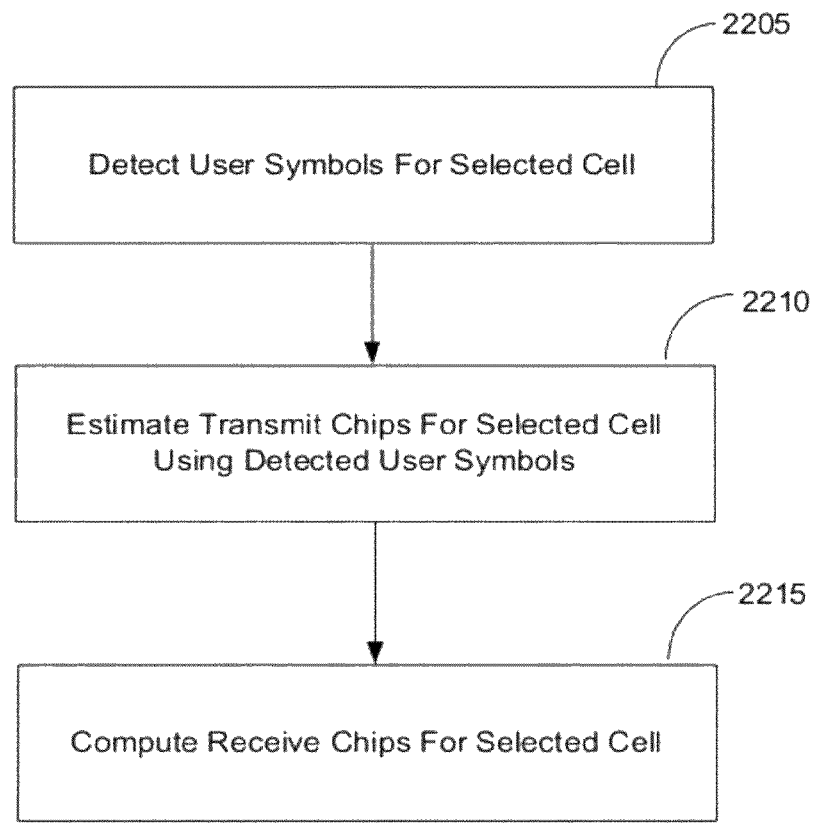
FIG. 22a is a flow diagram illustrating a method of computing receive chips for a cell, according to certain aspects of the present disclosure.

FIG. 22a is a flow diagram illustrating a process of computing receive chips for a selected cell according to certain aspects of the present disclosure. At operation 2205, user symbols for a selected cell are detected. For example, the user symbols for the selected cell may be detected from the received chips by performing the operations of the filter 2120, descramble and despread unit 2130 and detection unit 2140 in FIG. 21.

From operation 2205, the process continues to operation 2210 where transmit chips for the selected cell are estimated using the detected user symbols. For example, the transmit chips may be estimated by processing the detected user symbols in a similar manner to the transmitter side of the selected cell.

From operation 2210, the process continues to operation 2215 where the receive chips for the selected cell are computed. For example, the receive chips for the selected cell may be computed by convolving the estimated transmit chips with a channel estimate for the selected cell.

Figure 22B:
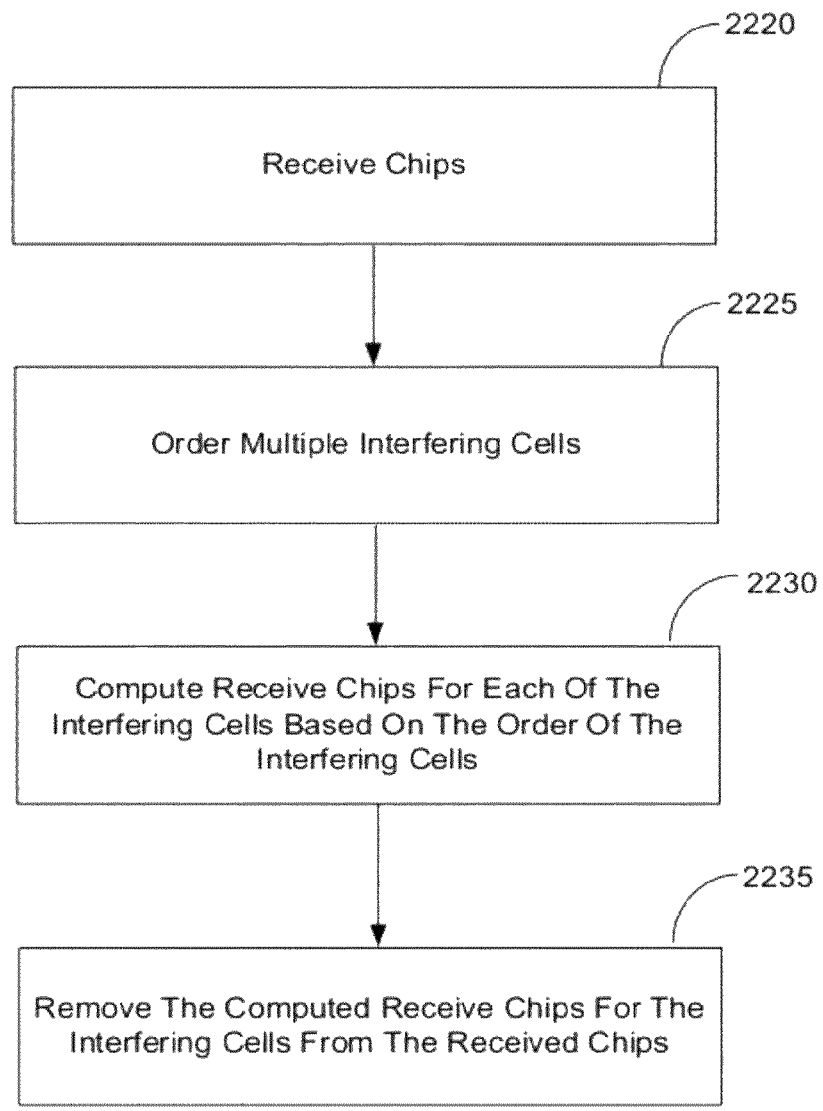
FIG. 22b is a flow diagram illustrating a method of inter-cell interference cancellation, according to certain aspects of the present disclosure.

FIG. 22b is a flow diagram illustrating a process of inter-cell interference cancellation, according to certain aspects of the present disclosure. At operation 2220, chips are received at a receiver. The received chips may be denoted r(n) and include contributions from the target cell and one or more interfering cells. The received chips r(n) may be the chips received by the receiver 200 of a mobile station 106.

From operation 2220, the process continues to operation 2225 where multiple interfering cells are ordered. For example, the multiple interfering cells may be ordered based on their relative signal strengths at the receiver.

From operation 2225, the process continues to operation 2230 where receive chips for each of the interfering cells are successively computed based on the order of the interfering cells. For example, the receive chip for a first inferring cell may be computed first from the received chips r(n) with the receive chips for the target cell removed. The receive chips for a second interfering cell may then be computed from the received chips r(n) with the receive chips for the target cell and first interfering cell removed (cancelled out). The receive chips for each of the subsequent interfering cells may be computed from the received chips r(n) with the receive chips for the target cell and the previously computed interfering cells removed. This removes the contribution of the target cell and the previously computed interfering cells from the received chip resulting in more reliable computations of the receive chips for the subsequent interfering cells. The receive chips for interfering cells with the higher signal strengths are computed first since they are more reliable than interfering cells with weaker signal strengths.

From operation 2230, the process continues to operation 2235 where the computed receive chips for the interfering cells are removed from the received chips r(n). After the inter-cell interference is cancelled from the received chips in operation 2235, the received chips may be processed into received symbols to detect user symbols for the target cell using any detection techniques including any of the detections techniques discussed in the present disclosure.

Figure 22C:
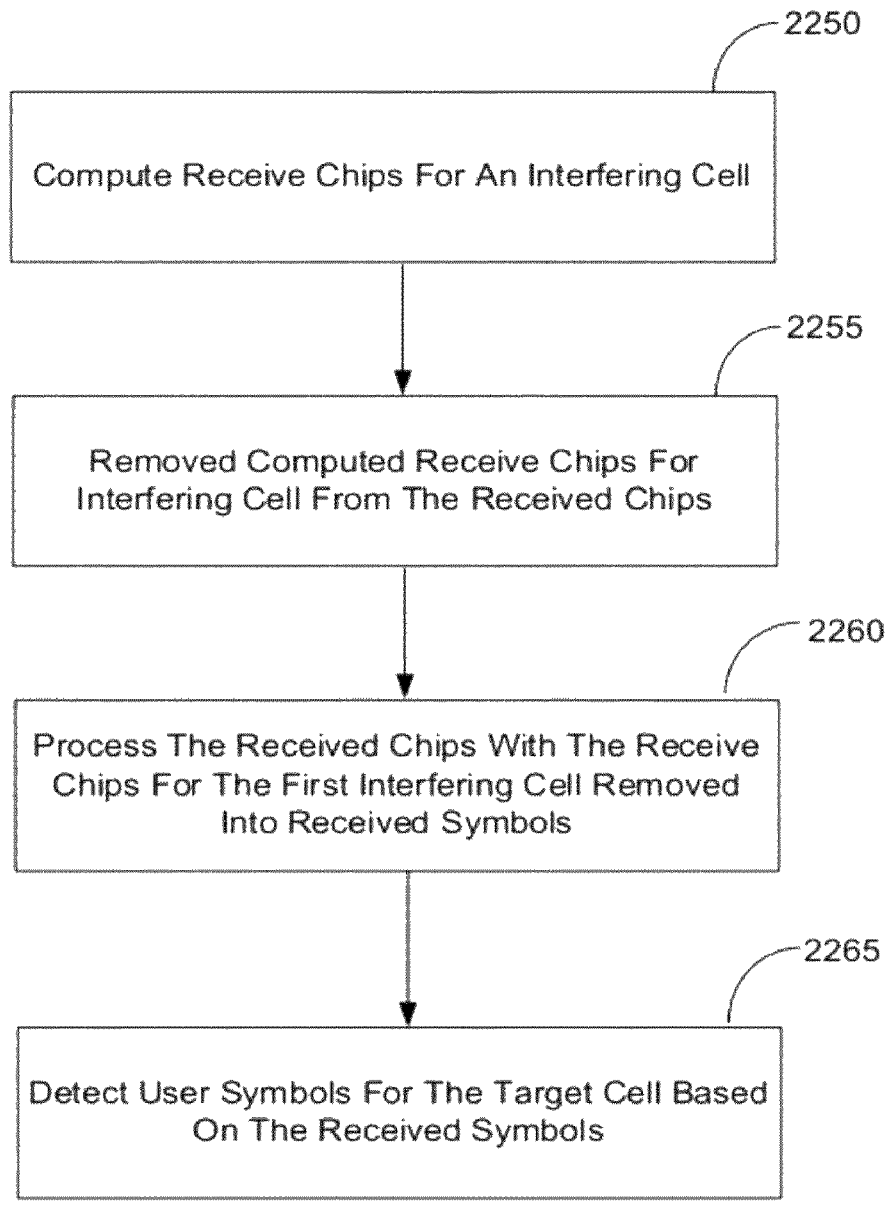
FIG. 22c is a flow diagram illustrating a method of inter-cell cancellation and multi-user detection, according to certain aspects of the present disclosure.

FIG. 22c is a flow diagram illustrating a process of inter-cell interference cancellation and multi-user detection, according to certain aspects of the present disclosure. At operation 2250, receive chips for an interfering cell are computed, for example, using the process illustrated in FIG. 22a. At operation 2255, the computed received chips for the interfering cell are removed (cancelled) from received chips. At operation 2260, the received chips with the receive chips for the interfering cell removed are processed into received symbols. This may be done, for example, by filtering, descrambling and despreading the received chips with the receive chips for the interfering cell removed. At operation 2265, user symbols for the target cell are detected based on the received symbols. This may be done, for example, by slicing the received symbols.

Figure 22D:
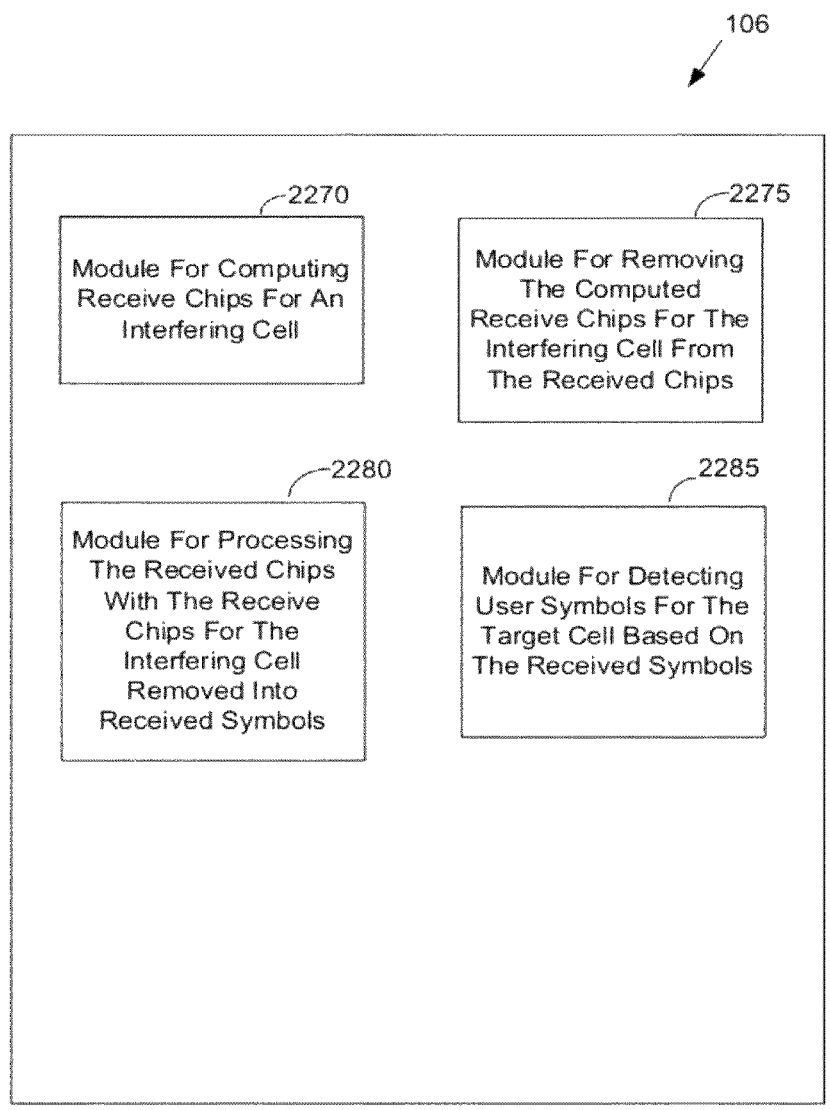
FIG. 22d is a block diagram of a mobile station used in a wireless communication system, according to certain aspects of the present disclosure.

FIG. 22d is a block diagram of a mobile station 106 used in a wireless communication system 100, according to certain aspects of the present disclosure. Mobile station 106 of FIG. 22d includes a module 2270 for computing receive chips for an interfering cell and a module 2275 for removing the computed receive chips for the interfering cell from the received chips. The mobile station 106 further includes a module 1280 for processing the received chips with the receive chips for the interfering cell removed (cancelled out) into received symbols and a module 1285 for detecting user symbols for the target cell based on the received symbols.

Data-Aided Channel Estimation

In one aspect, user symbols detected from received symbols are used to enhance channel estimation. This may be referred to as data-aided channel estimation. Before discussing data-aided channel estimation, it may be instructive to first discuss an example of pilot-based channel estimation.

In pilot-based channel estimation, a pilot signal is transmitted from the transmitter side (e.g., base station 104) to the receiver (e.g., mobile station 106). The pilot signal is a signal that is known a priori by the receiver, and used by the receiver to estimate the channel h between the transmission side and the receiver. For an example of CDMA, the pilot signal may comprise a known sequence of symbols.

For an example of a single-user communication system, the transmitted chips t(n) at the transmitter side may be expressed as:

$$t(n)=b_1(n)g_1w_1(n)p(n)+b_2(n)g_2w_2(n)p(n) \quad (52)$$

where $b_1(n)$ is the symbol of a pilot signal and $b_2(n)$ is a user symbol for a user. The pilot symbol may also be denoted by the subscript zero. In Eq. (52), the pilot symbol $b_1(m)$ is expressed in terms of the chip index n as $b_1(n)$, in which $b_1(n)$ over a span of N chips corresponds to one symbol (where N is the spreading factor). Similarly, the user symbol $b_2(m)$ is expressed in terms of the chip index n as $b_2(n)$. Eq. (52) can be applied to multi-user communication systems by adding additional user symbols in Eq. (52) for multiple users including their corresponding gains and spreading codes.

The received chips r(n) at the receiver can be expressed as the convolution of the channel h and transmitted chips t(n) in terms of discrete convolution and noise v(n) as:

$$r(n) = \sum_{d=0}^{D} h(d)t(n-d) + v(n) \quad (53)$$

where D is the bound of the discrete convolution.

Plugging the expression for t(n) in Eq. (52) into Eq. (53) results in:

$$r(n) = \sum_{d=0}^{D} h(d)b_1(n-d)g_1 w_1(n-d)p(n-d) + \sum_{d=0}^{D} h(d)b_2(n-d)g_2 w_2(n-d)p(n-d) + v(n) \quad (54)$$

In Eq. (54), the pilot symbol $b_1(n)$ is known a priori by the receiver, while the user $b_2(n)$ is not. Since the user symbol $b_2(n)$ is not known a priori by the receiver, the second summation term in Eq. (54) and the noise v(n) may be lumped together as an unknown v'(n). As a result, the received chips r(n) may be expressed as:

$$r(n) = \sum_{d=0}^{D} h(d)b_1(n-d)g_1 w_1(n-d)p(n-d) + v'(n) \quad (55)$$

where the unknown is given by:

$$v'(n) = \sum_{d=0}^{D} h(d)b_2(n-d)g_2 w_2(n-d)p(n-d) + v(n) \quad (56)$$

At the receiver, the received chips r(n), pilot symbol $b_1(n)$, spreading code $w_1(n)$, and scrambling code p(n) are known. Thus, Eq. (55) can be used in pilot-based channel estimation to estimate the channel h by solving for h(d) using known techniques. The pilot symbol $b_1(n)$ may be a constant, in which case the pilot symbol may be represented as simply $b_1$ in Eq. (55). Eq. (55) may be extended to a multi-user communication system, in which the user symbols for the multi-users may be lumped into the unknown v'(n) since they are not known a priori by the receiver.

In the example of pilot-based channel estimation discussed above, the receiver uses the pilot signal as a reference signal that is known a priori by the receiver to estimate the channel h from the received chips r(n). A drawback of this approach is that the power of the unknown signal v'(n) may be high, which reduces the accuracy of the estimated channel h.

In one aspect, user symbols detected from received symbols are used to create virtual pilot signals, which are used to enhance channel estimation. In this aspect, the virtual pilot signals are created from the detected user symbols by treating the detected user symbols as known symbols for purposes of channel estimation. The virtual pilots signals are not actual pilot signals transmitted between the transmitter side (e.g., base station 104) and receiver side (e.g., mobile station 106).

The user symbols may be detected using any detection technique including any of the detection techniques discussed in the disclosure. In the example in Eq. (54), user symbol $b_2(n)$ may be replaced by the detected user symbol $\hat{b}_2(m)$ (expressed in terms of chip index n as $\hat{b}_2(n)$) to rewrite Eq. (55) as:

$$r(n) = \sum_{d} h(d)\left(b_1(n-d)g_1 w_1(n-d) + \hat{b}_2(n-d)g_2 w_2(n-d)\right)p(n-d) + v'(n) \quad (57)$$

where the unknown is given by:

$$v'(n) = \sum_{d=0}^{D} h(d)(\hat{b}_2(n-d) - b_2(n-d))g_2 w_2(n-d)p(n-d) + v(n) \quad (58)$$

Thus, the detected user symbol $\hat{b}_2(n)$ may be used to create a virtual pilot signal in Eq. (57) to provide enhanced estimation of the channel h. As discussed above, a virtual pilot signal is created by treating the detected user symbol $\hat{b}_2(n)$ as a known symbol for purposes of channel estimation in Eq. (57). If the detected user symbol $\hat{b}_2(n)$ is close to the actual user symbol $b_2(n)$, then the power of the unknown signal v'(n) may be greatly reduced in Eq. (57), which enhances the channel estimation. Eq. (57) may be extended to multiple users by using the detected user symbols for the multiple users to generate multiple virtual pilot signals.

Figure 23:
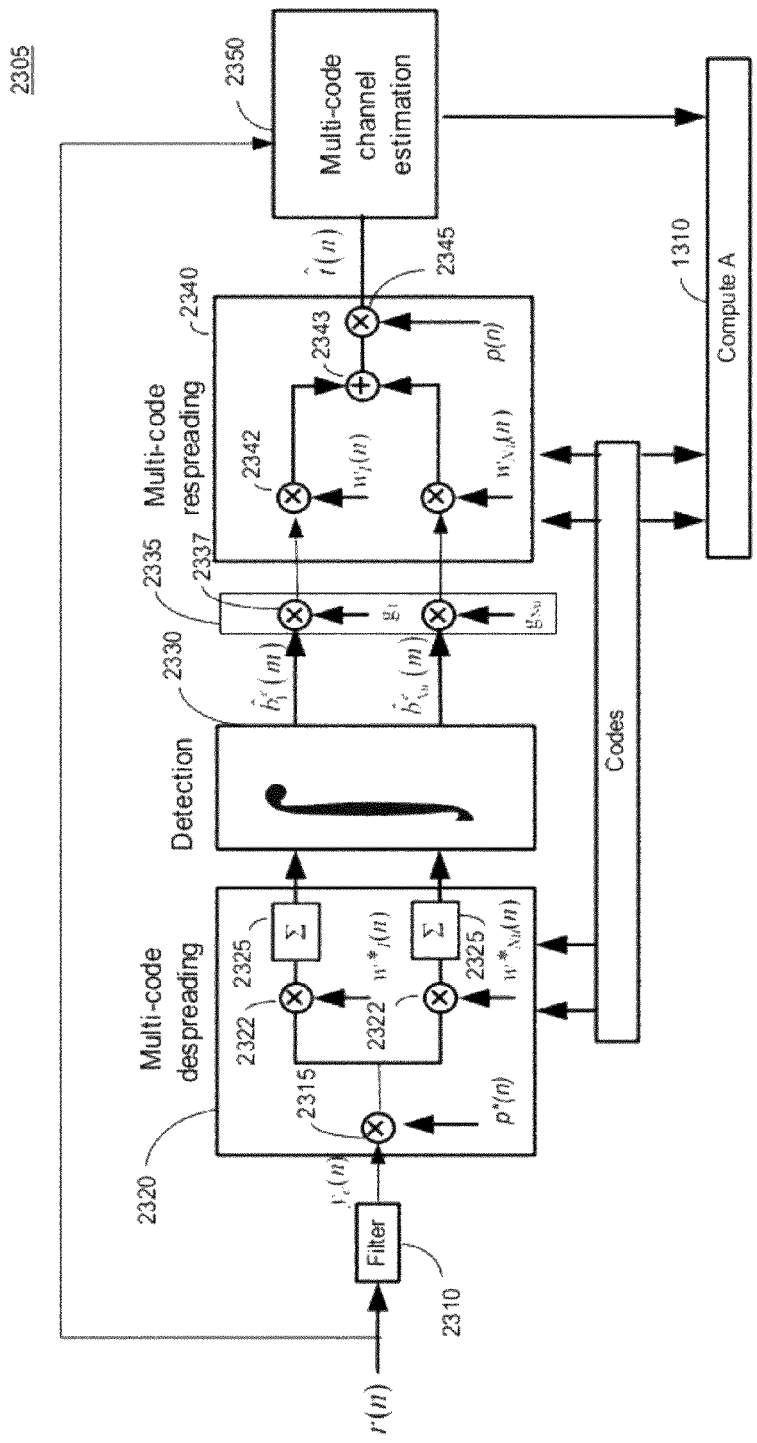
FIG. 23 is a schematic of a channel estimation system, according to certain aspects of the present disclosure.

FIG. 23 is a schematic of a channel estimation system 2305, according to certain aspects of the present disclosure. The channel estimation system 2305 may be at a receiver in a wireless communication system. The channel estimation system 2305 comprises a filter unit 2310 for filtering received chips r(n), a descramble and despread unit 2320, and a detection unit 2330. The filter unit 2310 may comprise an equalizer, and/or a channel-matched filter (CFM).

The descramble and despread unit 2320 comprises a descramble mixer 2315, a plurality of despread mixers 2322 and a plurality of corresponding summation blocks 2325. The descramble mixer 2315 mixes the filtered received chips $y^e(n)$ with a descrambling code $p^*(n)$ to descramble the filtered received chips y(n). The superscript "e" indicates that the filtered chips are used to estimate the channel h.

The despread mixers 2322 then mix the descrambled signal with a set of despreading codes $w_1^*(n)$ to $w_{Nu}^*(n)$. The despread signal from each despread mixer 2322 is inputted to the respective summation block 2325, which accumulates the despread signal over a period of one symbol to produce a received symbol for the corresponding user. The received symbols are inputted to the detection unit 2330, which detects the user symbols $\hat{b}_1^e(m)$ to $\hat{b}_{Nu}^e(m)$ from the received symbols. The detection unit 2330 may use any detection technique including slicing or any other detection technique discussed in the disclosure. If one of the user symbols corresponds to a known pilot symbol, then the known pilot symbol may be outputted (e.g., from memory) as one of the user symbols $\hat{b}_1^e(m)$ to $\hat{b}_{Nu}^e(m)$.

The channel estimation system 2305 further comprises a gain unit 2335, a spread and scramble unit 2340, and a channel computation unit 2350. The gain unit 2335 comprises a plurality of gain mixers 2337 that apply a set of gains $g_1$ to $g_{Nu}$ to the detected user symbols $\hat{b}_1^e(m)$ to $\hat{b}_{Nu}^e(m)$, respectively. The spread and scramble unit 2340 comprises a plurality of spread mixers 2342, a combiner 2343, and a scramble mixer 2345. The spread mixers 2322 mix the gain scaled user symbols with a set of spreading codes $w_1(n)$ to $w_{Nu}(n)$, the combiner 2343 combines the spread signals, and the scramble mixer 2345 mixes the combined signal with scrambling code p(n). The spreading codes and scrambling code may be the same as those used in the transmitter side so that the output $\hat{t}(n)$ of the spread and scramble unit 2340 provides an estimate of the transmitted chips at the transmitter side.

The output of the spread and scramble unit 2340 may be given as:

$$\hat{t}(n) = (\hat{b}_1^e(n)g_1 w_1(n) + \ldots + \hat{b}_{Nu}^e(n)g_2 w_2(n))p(n) \quad (59)$$

where the detected user symbols are expressed in terms of the chip index n. In one aspect, one of the symbols $\hat{b}^e$ in Eq. (59) may be a known pilot symbol while the other symbols are detected user symbols. Thus, the estimated transmitted chips $\hat{t}(n)$ may be computed based on the detected user symbols and a known pilot symbol by spreading and scrambling the detected user symbols and pilot symbol to obtain $\hat{t}(n)$. Because $\hat{t}(n)$ provides an estimate of the transmitted chips, the received chips r(n) may be represented by the convolution of $\hat{t}(n)$ with the channel h as:

$$r(n) = \sum_{d=0}^{D} h(d)\hat{t}(n-d) + v'(n) \quad (60)$$

Plugging in the expression for $\hat{t}(n)$ in Eq. (59) into Eq. (60) results in:

$$r(n) = \sum_{d=0}^{D} h(d)(\hat{b}_1^e(n-d)g_1 w_1(n-d) + \ldots + \hat{b}_{Nu}^e(n-d)g_2 w_2(n-d)) \quad (61)$$
$$p(n-d) + v'(n)$$

The channel estimation unit 2050 may then use the input $\hat{t}(n)$ from the spread and scramble unit 2040, the received chips r(n) and Eq. (60) to estimate the channel h. In this aspect, the detected user symbols $\hat{b}_1^e(m)$ to $\hat{b}_{Nu}^e(m)$ are treated as known symbols in Eq. (61) for purposes of channel estimation. This reduces the power of the unknown signal v'(n), which enhances channel estimation.

In one aspect, a scaled estimate of the channel $\hat{h}(l)$ can be obtained by computing the cross-correlation of the received chips r(n) and the estimated transmitted chips $\hat{t}(n)$ over a chip length of A as follows:

$$\hat{h}(l) = \frac{\sum_{n=1}^{A} r(n)\hat{t}*(n-l)}{A} \quad (62)$$

where $\hat{h}(l)$ is the scaled estimate of the channel at chip l.

The channel computation unit 2350 may provide the channel estimate to the matrix computation unit 1310 in FIG. 13 to compute the matrices $A_{-1}$, $A_0$, $A_{+1}$ or other systems. The data-aided channel estimation provides a more accurate channel estimation h resulting in more accurate computed matrices $A_{-1}$, $A_0$, $A_{+1}$. Further, the channel computation unit 2350 may provide the channel estimate to a filter to compute the filter coefficients for the filter. For example, the data-aided channel estimate may be provided to the front-end filters 210, 1410, 1510 or any other filter. The filter 2310 in the channel estimation system 2305 may use a channel estimate derived from pilot-based channel estimation since data-aided channel estimation is performed after the filter 2310.

In one aspect, the gain unit 2335 may apply the same or different gains to the detected user symbols $\hat{b}_1^e(m)$ to $\hat{b}_{Nu}^e(m)$ at mixers 2337 based on estimates of the corresponding gains at the transmission side. In one aspect, the channel computation unit 2350 may compare the gains to a gain threshold to eliminate user symbols with low gains, which may be less reliable in estimating the channel. In this aspect, gains above the gain threshold are applied to their respective user symbols $\hat{b}_1^e(m)$ to $\hat{b}_{Nu}^e(m)$ and used to estimate the channel. Gains below the gain threshold and their respective user symbols $\hat{b}_1^e(m)$ to $\hat{b}_{Nu}^e(m)$ are not used to estimate the channel. The gain unit may also apply uniform gains to the user symbols.

A process for estimating the gains for the different user symbols will now be discussed, according to one aspect of the disclosure. In this aspect, the gain for each user symbol or code channel is estimated by differentiating received pilot symbols for consecutive symbol periods m and m+1, which may be given as follows:

$$\Delta z_0(m) = z_0(m) - z_0(m+1) \quad (63)$$

where the zero subscript refers to a pilot symbol. Assuming that transmitted pilot symbols are the same for each symbol period, differences between the received pilot symbols are due to noise. Thus, the pilot differentiation provides an estimate of noise at the receiver. Noise power $\hat{\sigma}^2(m)$ may be estimated based on the differentiation of the received pilot symbols as follows:

$$\hat{\sigma}^2(m) = \alpha \frac{|\Delta z_0(m)|^2}{2} + (1-\alpha)\hat{\sigma}^2(m-1) \quad (64)$$

Equation (64) may be implemented using an Infinite Impulse Response (DR) filter with one tap, where $\alpha$ is a filter coefficient and $\hat{\sigma}^2(m-1)$ is the estimate of the noise power from the previous symbol period m−1. The noise power $\hat{\sigma}^2(m)$ estimate may be applied to each user or code channel of the cell for which $\hat{\sigma}^2(m)$ is estimated. The power $\hat{P}_i(m)$ of code channel i may be given as follows:

$$\hat{P}_i(m) = \alpha \frac{|\Delta z_i(m)|^2}{2} + (1-\alpha)\hat{P}_i(m-1) \quad (65)$$

where $z_i(m)$ is the received symbol for code channel i, which corresponds to one of the users. Equation (65) may be implemented using an DR filter with one tap, where $\alpha$ is a filter coefficient and $\hat{P}_i(\hat{m}-\hat{1})$ is the estimate of the power from the previous symbol period m−1. The gain $\hat{g}_i(\hat{m})$ for a particular code channel or user may then be estimated as follows:

$$\hat{g}_i(m) = \sqrt{\hat{P}_i(m) - \hat{\sigma}^2(m)} \quad (66)$$

The initial value for the noise power may be zero. The gain unit 2335 may compute the set of gains $g_i$ to $g_{Nu}$ applied to the respective detected user symbols $\hat{b}_i^e(m)$ to $\hat{b}_{Nu}^e(m)$ based on Eq. (66). The above gain estimation technique may also be used to estimate gains for the gain matrix G.

In one aspect, the filter 2310 may use a channel estimate h provided by pilot-based channel estimation before the data-aided channel estimation is performed. In this aspect, the channel computation unit 2350 may use the output of the filter 2310 $y_e(n)$ to estimate the total filter c(n) as follows:

$$y_e(n) = \sum_{d=0}^{D} c(d)\hat{t}(n-d) + v'(n) \quad (67)$$

The above equation is similar to Eq. (60), in which the filter output $y_e(n)$ is given by the convolution of $\hat{t}(n)$ with the total filter $c(n)$. The channel computation unit 2350 may use the output $\hat{t}(n)$ from the spread and scramble unit 2340, the filter output $y_e(n)$ and Eq. (67) to estimate the total filter $c(n)$. The total filter $c(n)$ may also be estimated by computing the cross-correlation of the filter output $y_e(n)$ and the estimated transmitted chips $\hat{t}(n)$ similar to equation (62), in which the received chips $r(n)$ in the cross-correlation are replaced with the filtered chips $y_e(n)$.

The filter 2310 may filter the received $r(n)$ based on an initial channel estimate h using pilot-based channel estimation or the data-aided channel estimate delayed by one symbol period. Further, the channel computation unit 2350 may provide the estimated total filter $c(n)$ to a matrix computation unit (e.g., matrix computation unit 1310), in which case the matrix computation unit does not have to separately compute the total filter $c(n)$ using a channel estimate h and filter f parameters. In this aspect, the channel computation unit 2350 may receive the filtered output $y_e(n)$ from the filter 2310 to estimate the total filter $c(n)$.

Figure 24A:
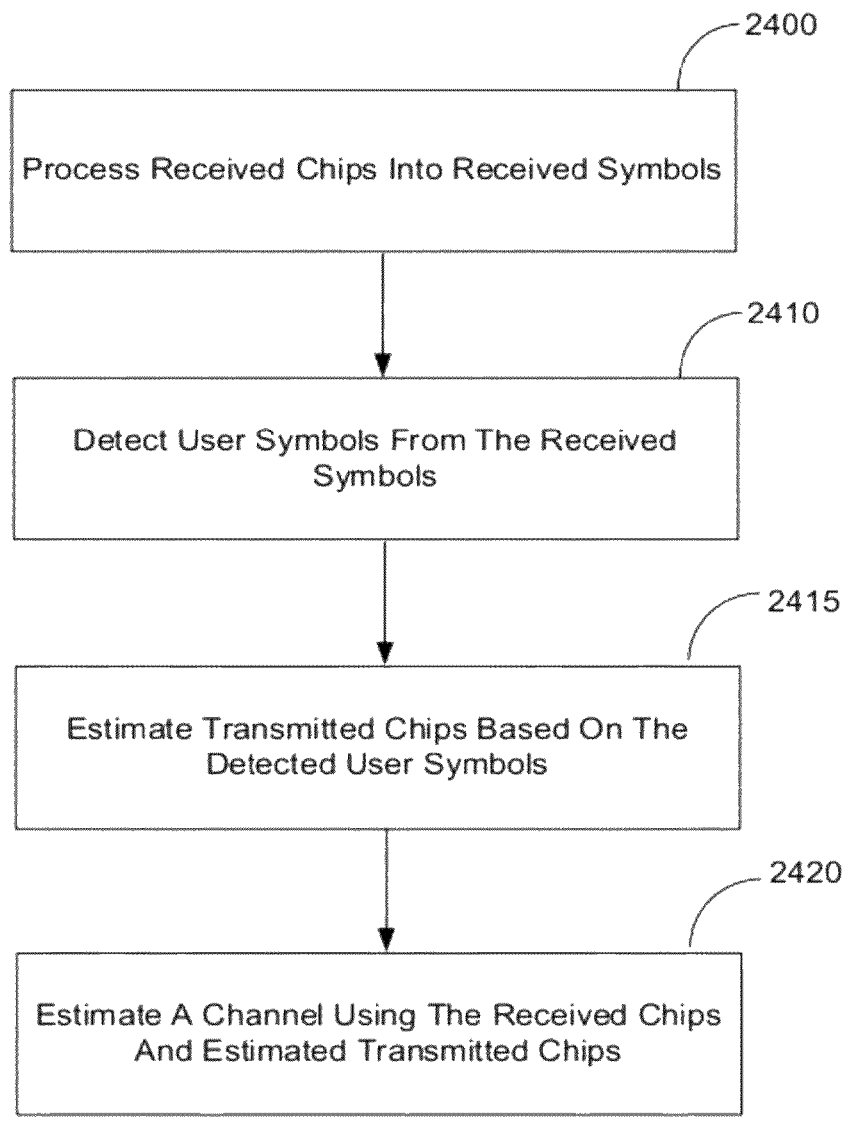
FIG. 24a is a flow diagram illustrating a method of channel estimation, according to certain aspects of the present disclosure.

FIG. 24a is a flow diagram illustrating a process of channel estimation at a receiver, according to certain aspects of the present disclosure. At operation 2400, received chips are processed into received symbols. For example, the received chips may be filtered and then descrambled and despreaded into received symbols.

From operation 2400, the process continues to operation 2410 where user symbols are detected from the received symbols. For example, the user symbols may be detected by slicing the received symbols. Other detection techniques may also be used.

From operation 2410, the process continues to operation 2415 where the transmitted chips are estimated based on the detected user symbols. This may be done, for example, by spreading and scrambling the detected user symbols to estimate the chips transmitted from the transmitter side. From operation 2415, the process continues to operation 2220 where a channel is estimated using the received chips and the estimated transmitted chips (e.g., based on Eq. (60)).

Figure 24B:
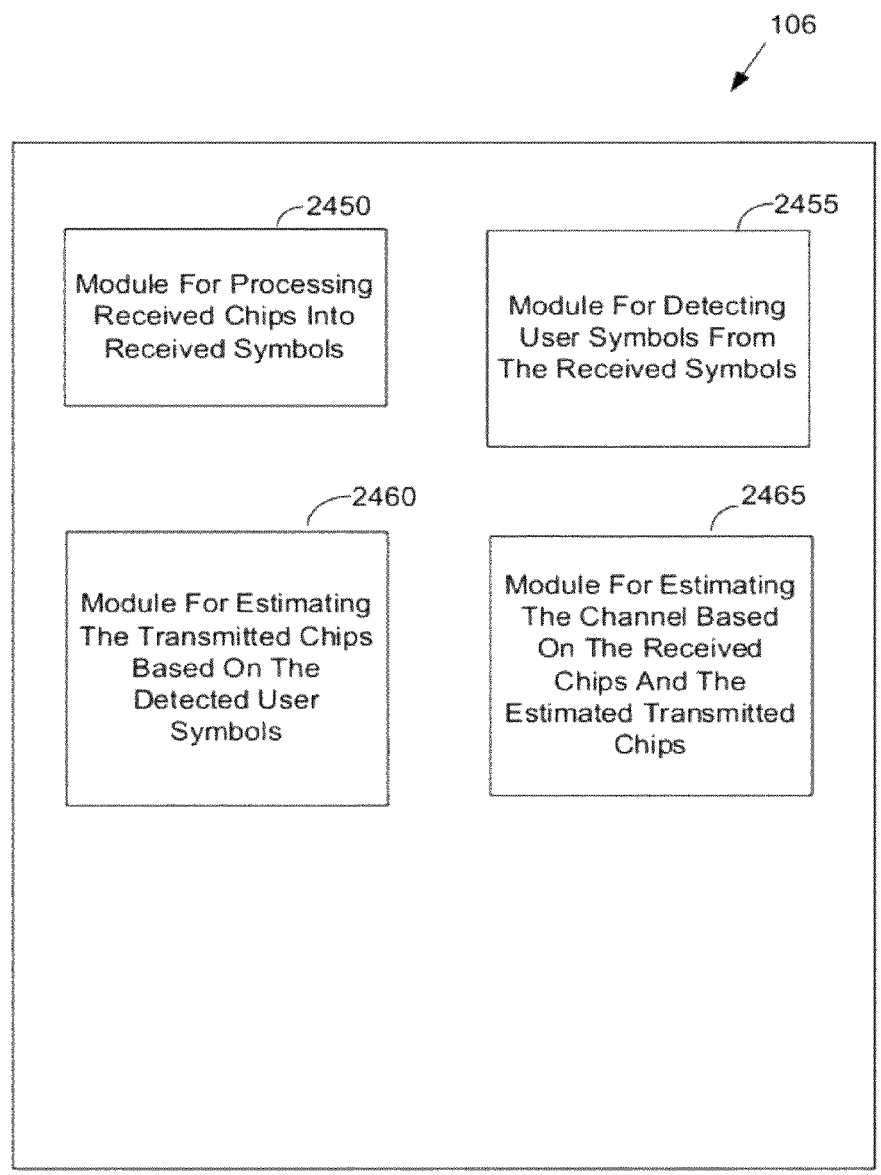
FIG. 24b is a flow diagram illustrating a method of total filter estimation, according to certain aspects of the present disclosure.

FIG. 24b is a block diagram of a mobile station 106 used in a wireless communication system 100, according to certain aspects of the present disclosure. Mobile station 106 of FIG. 24b includes a module 2450 for processing received chips into received symbols and a module 2455 for detecting user symbols from the received symbols. The mobile station 106 further includes a module 2460 for estimating transmitted chips based on the detected user symbols and a module 2465 for estimating a channel based on the received chips and the estimated transmitted chips.

Figure 24C:
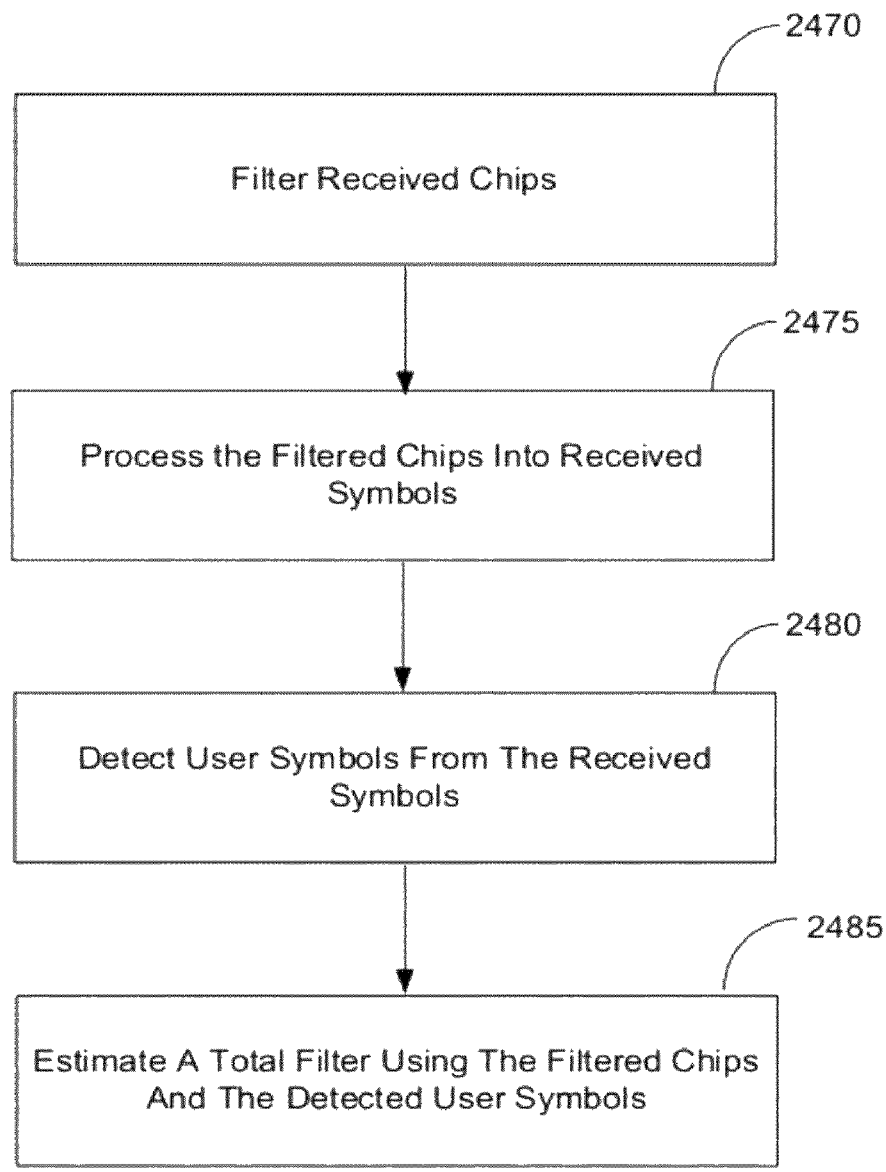
FIG. 24c is a block diagram of a mobile station used in a wireless communication system, according to certain aspects of the present disclosure.

FIG. 24c is a flow diagram illustrating a process for estimating a total filter $c(n)$ representing a convolution of a channel h and a filter f, according to certain aspects of the present disclosure. At operation 2470, received chips are filtered by the filter at a receiver.

From operation 2470, the process continues to operation 2475 where the filtered chips are processed into received symbols. For example, the filtered chips may be descrambled and despreaded into received symbols.

From operation 2475, the process continues to operation 2480 where user symbols are detected from the received symbols. For example, the user symbols may be detected by slicing the received symbols. Other detection techniques may also be used.

From operation 2480, the process continues to operation 2485 where the total filter $c(n)$ is estimated using the filtered chips and the detected user symbols (e.g., based on Eq. (67)). For example, the detected user symbols may be spread and scrambled to estimate the transmitted chips at the transmitter side. Also, the detected user symbols may be used together with one or more known pilot symbols to estimate the transmitted chips. The estimated transmitted chips and the filtered chips may then be used to estimate the total filter $c(n)$ (e.g., based on Eq. (67)).

Efficient Detection of Quadrature Amplitude Modulated (QAM) Symbols

Efficient systems and methods for detection of QAM symbols are provided, according to certain aspects of the present disclosure. In one aspect, a QAM symbol is detected by decomposing the corresponding QAM constellation into multiple sub-constellations (e.g., QPSK constellations), detecting components of the QAM symbol corresponding to the sub-constellations, and combining the detected components to detect the QAM symbol. The QAM may be 16 QAM, 64 QAM or any other M-ary QAM. Before discussing the detection of QAM symbols using constellation decomposition, it may be instructive to discuss examples of QAM.

Figure 25A:
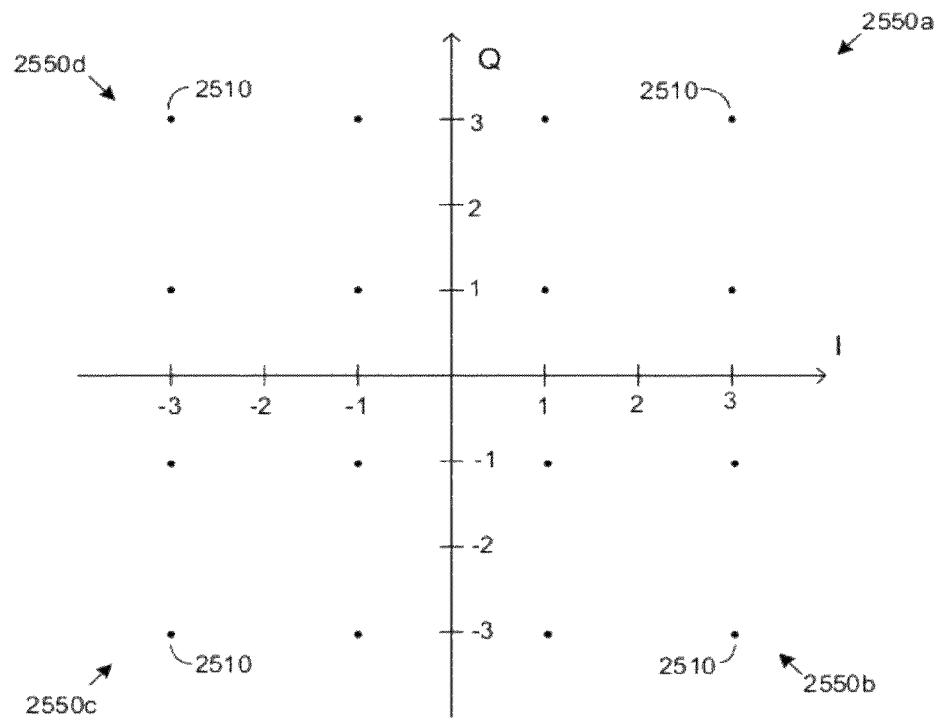
FIG. 25a is a diagram of an exemplary 16 QAM constellation, according to certain aspects of the present disclosure.

FIG. 25a is a diagram of an exemplary 16 QAM constellation. The 16 QAM constellation comprises 16 constellation points 2510 representing 16 different complex values for a 16 QAM symbol. The 16 QAM constellation is divided into four quadrants 2550a-2550d, each quadrant having four of the 16 constellation points 2510. Each constellation point 2510 has In-phase (I) and Quadrature (Q) components, which may correspond to real and imaginary parts of a corresponding symbol, respectively. A 16 QAM symbol carries four bits of information.

Figure 25B:
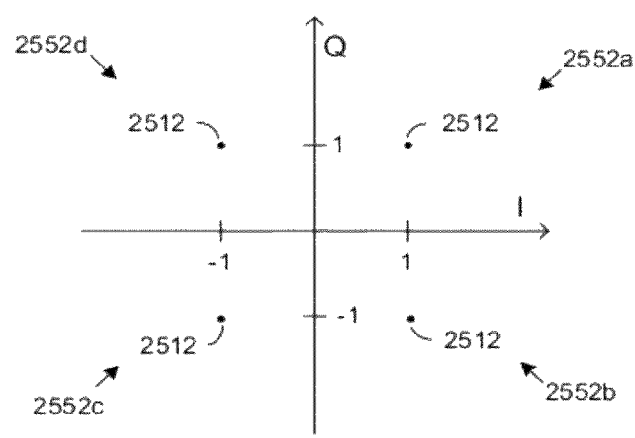
FIG. 25b is a diagram of an exemplary QPSK constellation, according to certain aspects of the present disclosure.

FIG. 25b is a diagram of an exemplary Quadrature Phase Shift Keying (QPSK) constellation. The QPSK constellation comprises four constellation points 2512 representing four different values for a QPSK symbol. The QPSK constellation is divided into four quadrants 2552a-2552d, each quadrant having one of the constellation points 2512. A QPSK symbol carries two bits of information.

Figure 26:
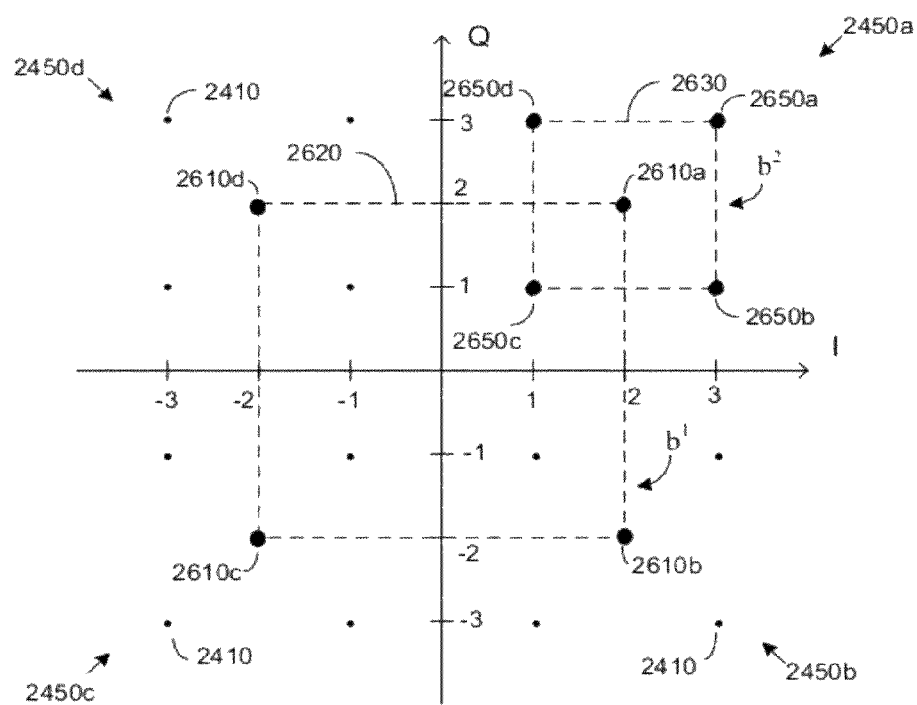
FIG. 26 is a diagram of an exemplary 16 QAM constellation decomposed into sub-constellations, according to certain aspects of the present disclosure.

FIG. 26 is a diagram of a 16 QAM constellation decomposed into two sub-constellations according to one aspect of the disclosure. A first sub-constellation 2620 comprises four constellation points 2610a-2610d centered at the origin of the 16 QAM constellation. The first sub-constellation 2620 has one constellation point 2610a-2610d in each quadrant 2450a-2450d, respectively, of the 16 QAM constellation. A second sub-constellation 2630 comprises four constellation points 2650a-2650d centered at one of the constellation points 2610a-2610d of the first sub-constellation 2620. The constellation point 2610a-2610d at which the second sub-constellation 2630 is centered depends on the quadrant 2450a-2450d of the 16 QAM constellation corresponding to a desired QAM symbol. In the example shown in FIG. 26, the desired QAM symbol corresponds to quadrant 2450a of the 16 QAM constellation. In this aspect, the first sub-constellation 2620 may be represented by a QPSK constellation, in which the amplitudes of the QPSK constellation points are scaled by a factor of 2, and the second sub-constellation 2630 may be represented by a QPSK constellation.

In one aspect, a 16 QAM symbol can be represented as a sum of components $b^1$ and $b^2$ corresponding the first and second sub-constellations, respectively, as follows:

$$b=b^1+b^2 \quad \text{Eq. (68)}$$

In this aspect, a 16 QAM symbol may be detected by detecting the components $b^1$ and $b^2$ corresponding to the first and second sub-constellations, respectively, and combining the components $b^1$ and $b^2$ to detect the 16 QAM symbol.

QAM constellation decomposition may be applied to other QAM constellations besides a 16-QAM constellation. For example, a 64 QAM constellation may be decomposed into three sub-constellations (e.g., QPSK constellations) by extending the methods used to decompose the 16 QAM constellation to the 64 QAM constellation. In this example, a 64-QAM symbol may be detected by combining three components of the 64-QAM symbol corresponding to the three sub-constellations.

Figure 27:
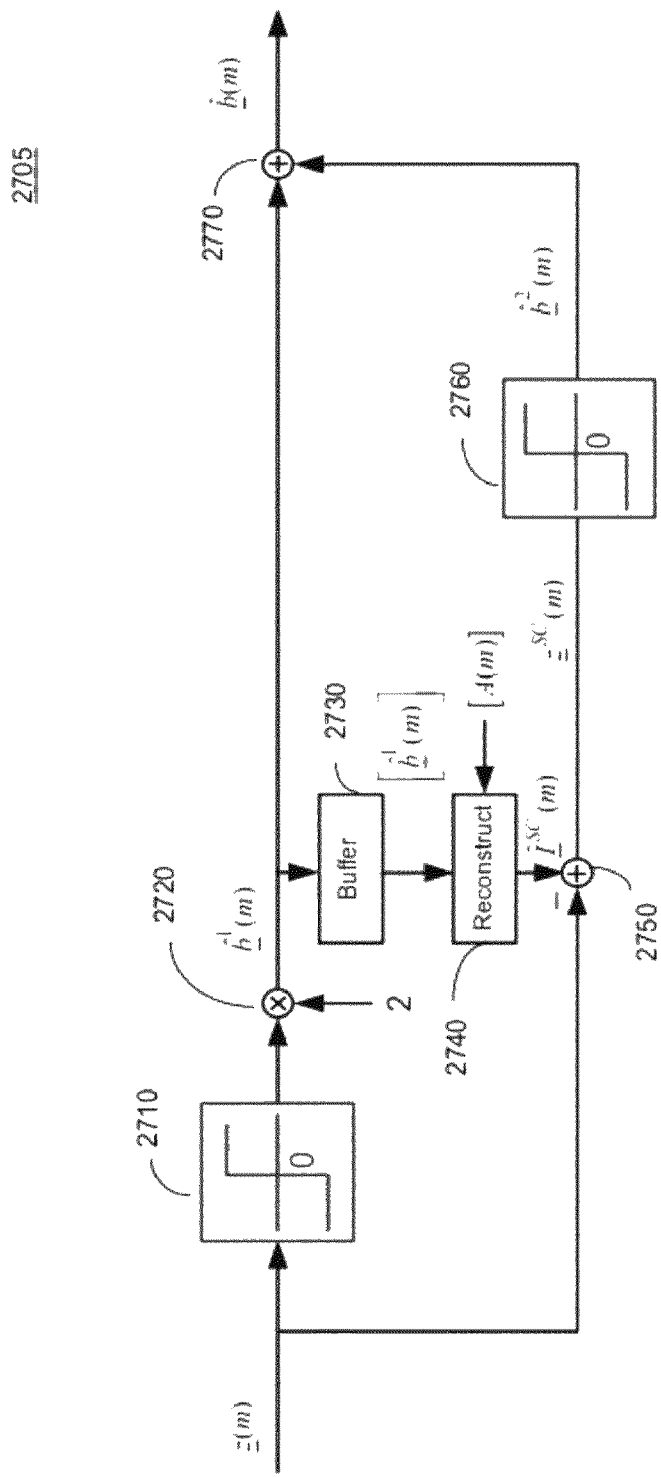
FIG. 27 is a schematic of a multi-user QAM sub-constellation detection system, according to certain aspects of the present disclosure.

FIG. 27 is a schematic of a multi-user 16 QAM detection system 2705, according to certain aspects of the present disclosure. The detection system may be at a receiver in a wireless communication system. The detection system 2705 comprises a first detection unit 2710, a scaler 2720, a buffer 2730, a reconstruction unit 2740, a subtraction unit 2750, and a second detection unit 2760.

In one aspect, the first detection unit 2710 may comprise a QPSK slicer configured to receive symbols z(m) and detect a QPSK symbol for each received symbol. The first detection unit 2710 may detect a QPSK symbol for a received symbol based on the signs of the real and imaginary parts of the received symbol. For example, if the signs of the real and imaginary parts of a received symbol are both positive, then the first detection unit 2710 may detect a QPSK symbol corresponding to constellation point 2510 in quadrant 2552a of the QPSK constellation for the received symbol. The first detection unit 2710 may also use minimum distance detection which determines the constellation point having the minimum distance to the received symbol. The QPSK symbol for each received symbol is then scaled by the scaler 2720 to obtain the first detected component $\hat{b}^1(m)$ of the 16-QAM user symbol for the received symbol. The scaler 2720 does this by scaling a QPSK symbol to correspond to one of the constellation points 2610a-2610d in the first sub-constellation 2620.

The buffer 2730 stores the first detected components $\hat{b}^1(m)$ for the received symbols z(m) over multiple symbols periods. In one aspect, the buffer stores the first detected components $\hat{b}^1(m-1), \hat{b}^1(m), \hat{b}^1(m+1)$ for the symbol periods m−1, m, and m+1, respectively. The first detected components $\hat{b}^1(m-1), \hat{b}^1(m), \hat{b}^1(m+1)$ are represented by $[\hat{b}^1(m)]$ in FIG. 27. The reconstruction unit 2740 then reconstructs the portion $\hat{I}^{SC}(m)$ of the received symbols z(m) contributed by the first detected components $\hat{b}^1(m)$ of the respective user symbols $\hat{b}(m)$ and by multi-user interference due to the first components $\hat{b}^1(m-1), \hat{b}^1(m), \hat{b}^1(m+1)$ for the symbol periods m−1, m, and m+1, respectively. The reconstruction unit 2470 may compute $\hat{I}^{SC}(m)$ as follows:

$$\hat{I}^{SC}(m) = \sum_{l=-1,0,1} A_l(m) G \hat{b}^1(m+l) \quad (69)$$

where G is the diagonal gain matrix, and $A_l$ represents the matrices $A_{-1}, A_0, A_{+1}$ for l=−1, 0 and 1, respectively. The matrices $A_{-1}, A_0, A_{+1}$ are represented by $[A(m)]$ in FIG. 27.

The subtraction unit 2750 removes $\hat{I}^{SC}(m)$ from the received symbols z(m) as follows:

$$z^{SC}(m) = z(m) - \hat{I}^{SC}(m) \quad (70)$$

where $z^{SC}(m)$ are the received symbols z(m) with $\hat{I}^{SC}(m)$ removed. The operation in Eq. (70) removes the portion of the received symbols z(m) contributed by the first detected components $\hat{b}^1(m)$ of the respective user symbols $\hat{b}(m)$. This enables the second components $\hat{b}^2(m)$ of the user symbols $\hat{b}(m)$ to be detected by QPSK slicing $z^{SC}(m)$. The operation in Eq. (70) also removes multi-user interference due to the first components $\hat{b}^1(m-1), \hat{b}^1(m), \hat{b}^1(m+1)$ for the symbols periods m−1, m, and m+1, respectively. This provides multi-user interference cancellation resulting in more accurate detection of the second components $\hat{b}^2(m)$.

The second detection unit 2760 then detects the second components $\hat{b}^2(m)$ of the desired user symbols $\hat{b}^2(m)$ from $z^{SC}(m)$. The second detection unit 2760 may do this by QPSK slicing $z^{SC}(m)$. The combiner 2770 then combines the first components $\hat{b}^1(m)$ with the respective second components $\hat{b}^2(m)$ to obtain the detected user symbols $\hat{b}(m)$ for the received symbols z(m).

Thus, the multi-user 16 QAM detection system 2705 in FIG. 27 decomposes a received 16 QAM symbol into two components where each component is detected using a sub-constellation (e.g., QPSK constellation) and multi-user interference from the first components is removed prior to detection of the second component for enhanced detection.

Figure 28A:
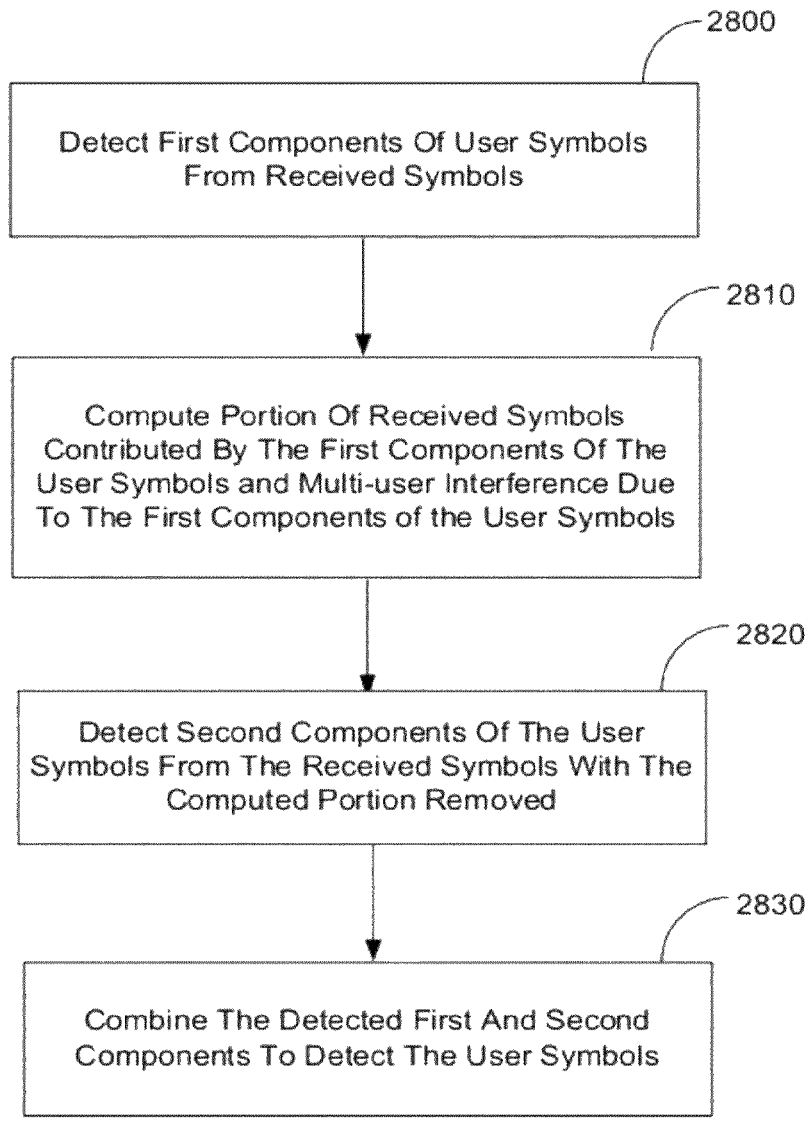
FIG. 28a is a flow diagram illustrating a method of multi-user sub-constellation detection, according to certain aspects of the present disclosure.

FIG. 28a is a flow diagram illustrating a process of multi-user sub-constellation detection, according to certain aspects of the present disclosure. At operation 2800, first components of user symbols are detected from received symbols. The first components of the user symbols may correspond to the first sub-constellation 2620 of a 16-QAM constellation for an example of 16-QAM detection.

From operation 2800, the process continues to operation 2810 where a portion of the received symbols contributed by the first components of the user symbols and multi-user interference due to the first components of the user symbols is computed. This portion of the received symbols may be computed, for example, based on Eq. (69).

From operation 2810, the process continues to operation 2820 where second components of the user symbols are detected from the received symbols with the computed portion removed.

From operation 2820, the process continues to operation 2830 where the detected first components of the user symbols are combined with the respective second components of the user symbols to detect the user symbols.

Figure 28B:
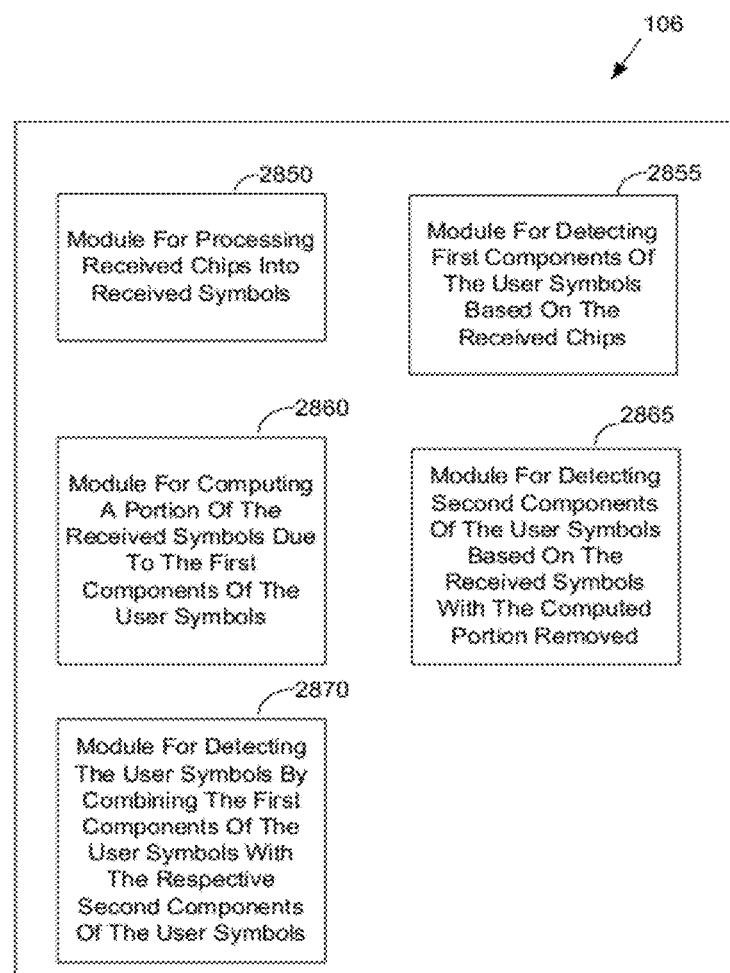
FIG. 28b is a block diagram of a mobile station used in a wireless communication system, according to certain aspects of the present disclosure.

FIG. 28b is a block diagram of a mobile station 106 used in a wireless communication system 100, according to certain aspects of the present disclosure. Mobile station 106 of FIG. 28b includes a module 2850 for processing received chips into received symbols and a module 2855 for detecting first components of the user symbols from the received symbols. The mobile station 106 further includes a module 2860 computing a portion of the received symbols due to the first components of the user symbols and a module 2865 for detecting second components of the user symbols based on the received symbols with the computed portion removed. The mobile station 106 further includes a module 2870 for detecting the user symbols by combining the first components of the user symbols with the respective second components of the user symbols.

Figure 29:
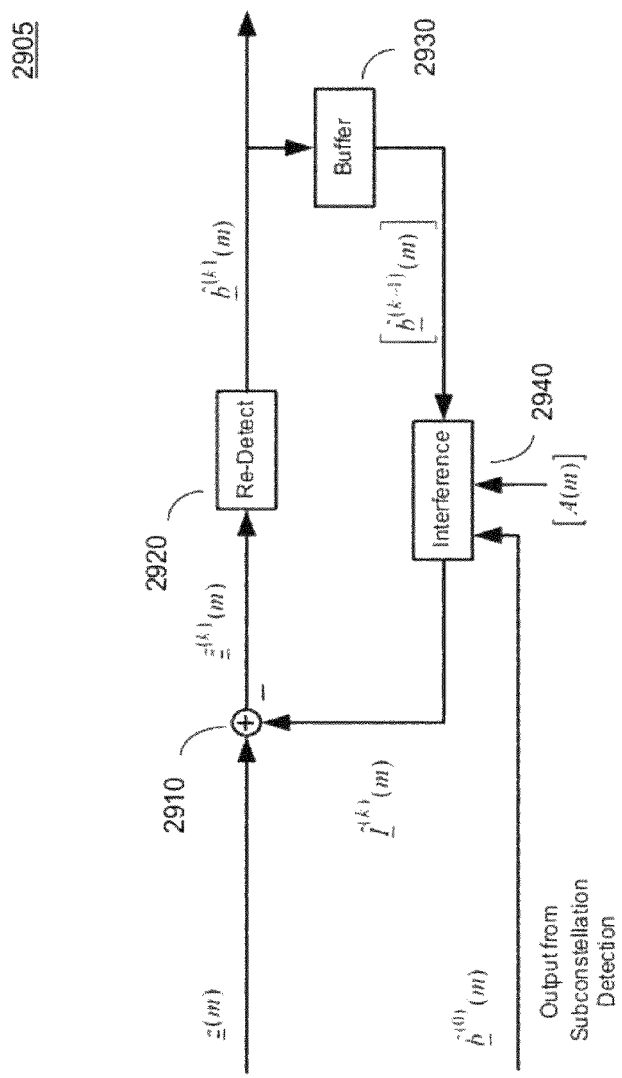
FIG. 29 is a schematic of a multi-user QAM detection system with iterative interference cancellation, according to certain aspects of the present disclosure.

FIG. 29 is a schematic of a multi-user QAM detection system 2905 with iterative interference cancellation, according to certain aspects of the present disclosure. The detection system 2905 may be at a receiver in a wireless communication system. The detection system 2905 comprises a subtraction unit 2910, a redetection unit 2920, a buffer 2930, and an interference computation unit 2940.

In one aspect, the interference computation unit 2940 uses user symbols $\hat{b}(m)$ detected from a sub-constellation detection system (e.g., the sub-constellation detection system 2705 in FIG. 27) as initially detected user symbols to compute multi-user interference for a first iteration. For example, the interference computation unit 2940 may compute the multi-user interference for symbol period m based on Eq. (49) using the detected user symbols $\hat{b}(m-1)$, $\hat{b}(m)$, $\hat{b}(m+1)$ for symbol periods m−1, m, and m+1, respectively, from the sub-constellation detection system. In FIG. 29, the iteration index k of the detected user symbols $\hat{b}^{(0)}(m)$ from the sub-constellation detection system is zero since they are used for the initially detected user symbols.

The subtraction unit 2910 removes (subtracts) the computed multi-user interference $\hat{I}^{(1)}(m)$ for the first iteration (k=1) from the received symbols z(m). The redetection unit 2920 then redetects the user symbols from the received symbols $\tilde{z}^{(1)}(m)$ with the computed interference removed.

In one aspect, the redetection unit 2920 performs single-user maximum likelihood detection (MLD) on the received symbols $\tilde{z}^{(1)}(m)$ with the computed interference removed as follows:

$$\hat{b}_i^{(k)}(m) = \underset{b}{\operatorname{argmin}} \left\| \tilde{Z}_i^{(k)}(m) - [A_0(m)]_{i,i} g_i b \right\|^2 \quad (71)$$

where k=1 for the first iteration, i is a user index, $[A_0(m)]_{i,i}$ is the coefficient of matrix $A_0$ relating the received symbol for user i to the desired user symbol for user i, and b is a possible QAM constellation point. The MLD operation determines the constellation point b that minimizes the probability of error.

The redetected user symbols $\hat{b}^{(1)}(m)$ for the first iteration may then be fed back to the interference computation unit 2940 through the buffer 2930 to re-compute the multi-user interference $\hat{I}^{(2)}(m)$ for a second iteration using the redetected user symbols $\hat{b}^{(1)}(m-1)$, $\hat{b}^{(1)}(m)$, $\hat{b}^{(1)}(m+1)$ for the symbol periods m−1, m, and m+1, respectively, from the first iteration. The computed multi-user interference $\hat{I}^{(2)}(m)$ for the second iteration may then be removed from the received symbols z(m) to redetect the user symbols for the second iteration. The detection system 2905 may perform any number of iterations k to refine the redetected user symbols $\hat{b}^{(k)}(m)$. To simply computations, the interference computation unit 2940 may use the initially detected user symbols for symbol periods m−1 and m+1 for all iterations, in which case only the user symbols for symbol period m are updated.

User Symbol Detection and Interference Cancellation in the Presence of Multiple Spreading Factors Methods and systems for performing user symbol detection and interference cancellation in the presence of multiple spreading factors are provided, according to certain aspects of the present disclosure.

In one aspect, a communication system may spread user symbols using codes with different spreading factors. For example, a universal mobile telecommunication system (UTMS) based communication system may support communication protocols using different spreading factors. The communication protocols may include high speed downlink packet access (HSDPA), which may have a spreading factor of 16, and release 99 (R99), which may have spreading factors $2^k$ with k between 2 and 8.

Figure 30:
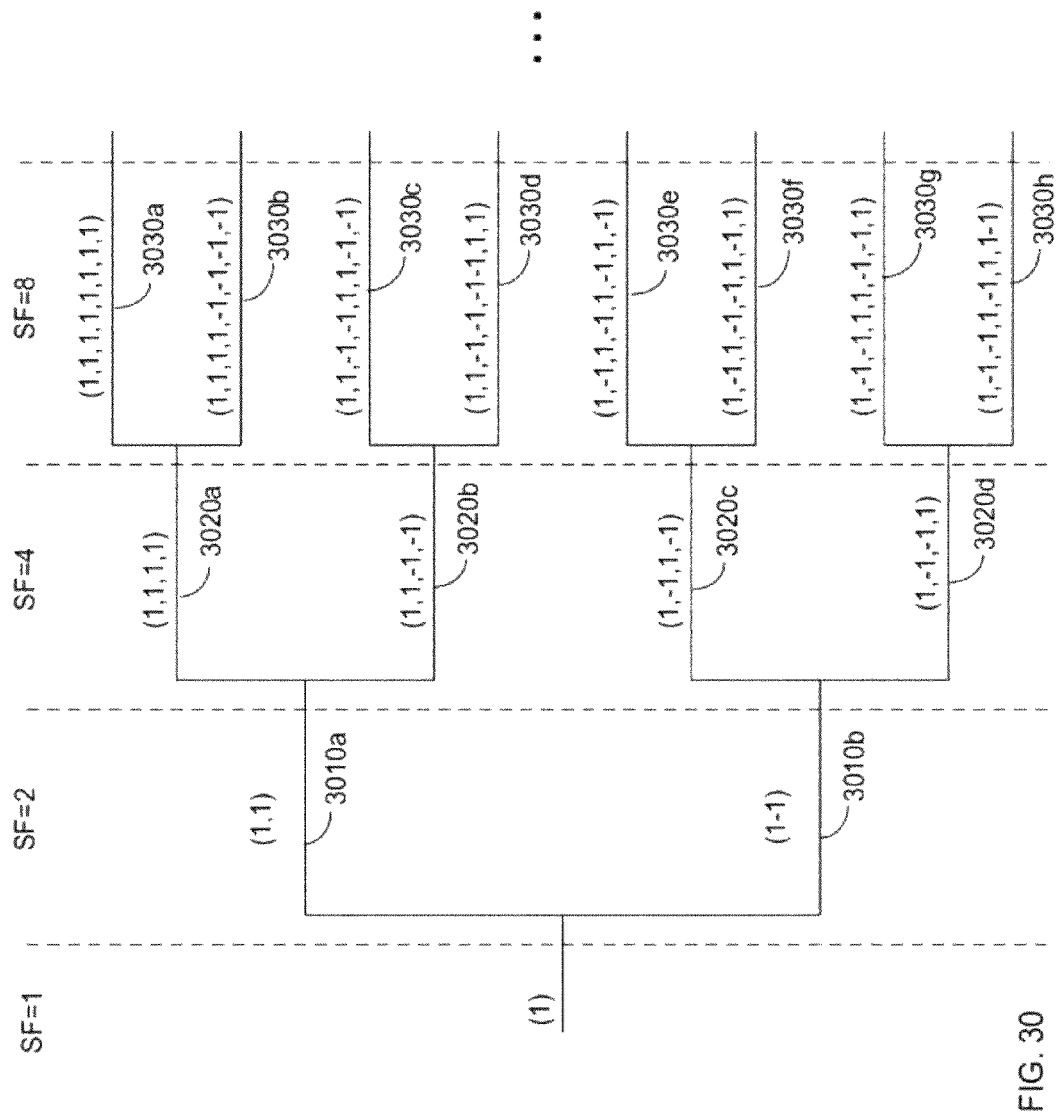
FIG. 30 is a diagram of an orthogonal variable spreading factor (OVSF) tree, according to certain aspects of the present disclosure.

Codes for the different spreading factors may be selected based on a orthogonal variable spreading factor (OVSF) tree or other means. FIG. 30 shows a diagram of an exemplary OVSF tree according to an aspect of the present disclosure. The OVSF tree comprises multiple levels where each level corresponds to a different spreading factor. FIG. 30 shows the first four levels of the OVSF tree corresponding to spreading factors (SF) 1, 2, 4 and 8, respectively. The tree level for each spreading factor comprises a set of mutually orthogonal codes. For example, the tree level for SF=4 comprises a set of four mutually orthogonal codes 3020a-3020d. A code at each spreading factor has multiple children codes at higher-order spreading factors. For example, code 3010a at SF=2 has two children codes 3020a-3020b at SF=4, four children codes 3030a-3030d at SF=8 and so on. A code may be considered a father code to its children codes. For example, code 3010a may be considered a father code to its children codes 3020a-3020b and 3030a-3030d.

Each father code has two immediate children codes in the next tree level. For example, code 3010a has two immediate children codes 3020a-3020b in the next tree level. For each father code, the first immediate child code is a sequence comprising the father code repeated twice, and the second immediate child code is a sequence comprising the father code followed by the inverse of the father code. For a father code, each of its children codes may be represented by a sequence comprising the father code repeated multiple times where each repetition of the father code is multiplied by a coefficient of either one or negative one. Also, for a father code, each of its children codes are orthogonal to the other codes at the same spreading factor as the father code and their children codes.

A method for performing symbol detection and interference cancellation in the presence of two or more different spreading factors will now be discussed, according to one aspect of the disclosure. In one example, there are $N_1$ spreading codes at a spreading factor of 16 and $N_2$ spreading codes at a spreading factor of 256. In this example, the spreading codes at spreading factor 16 may correspond to HSDPA signals and the spreading codes at spreading factor 256 may correspond to R99 signals in a UTMS-based system. The spreading factors of 16 and 256 are only examples of possible spreading factors and other spreading factors may also be used.

The user symbols and gains for the spreading factor of 16 may be represented by $b_1, \ldots, b_{N1}$ and $g_1, \ldots, g_{N1}$, respectively, and the user symbols and gains for the spreading factor of 256 may be represented by $b_1', \ldots, b_{N2}'$ and $g_1', \ldots, g_{N2}'$, respectively. The user symbols $b_1, \ldots, b_{N1}$ for spreading factor 16 may be represented in vector form as $\hat{b}(m)$ where m is the symbol index for spreading factor 16, and the user symbols $b_1', \ldots, b_{N2}'$ for spreading factor 256 may be represented in vector form as $\hat{b}'(m')$ where m' is the symbol index for spreading factor 256. In this example, one symbol period of the user symbols $b_1', \ldots, b_{N2}'$ at spreading factor 256 spans 16 symbol periods of the user symbols $b_1, \ldots, b_{N1}$ at spreading factor 16.

Figure 31:
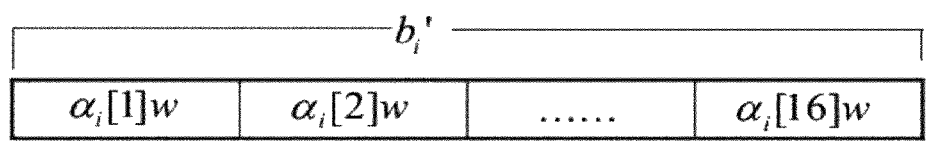
FIG. 31 is a diagram representing a spreading code in terms of a father code, according to certain aspects of the present disclosure.

A spreading code for a user symbol $b_i'$ at spreading factor 256 may be represented as a sequence comprising 16 repetitions of a father code w at spreading factor 16. FIG. 31 is a diagram illustrating the spreading code for user symbol $b_i'$ at spreading factor 256 comprising 16 repetitions of the father code w. Each repetition of the father code w is multiplied by a coefficient $\alpha_i[m]$ that is either one or negative one, where m is the symbol index for spreading factor 16 and i is a code index, which ranges from 1 to $N_2$ for spreading factor 256.

Figure 32:
FIG. 32 is a diagram of spreading codes at different spreading factors, according to certain aspects of the present disclosure.

In one aspect, the spreading codes $w_1'$ to $w_{N2}'$ at spreading factor 256 share a common father code w at spreading factor 16, in which the father code w is orthogonal to each of the spreading codes $w_1$ to $w_{N1}$ used at spreading factor 16 so that the spreading codes at both spreading factors are mutually orthogonal. An example of this is illustrated in FIG. 32 where $N_1$ of the codes available at spreading factor 16 are allocated for the spreading codes $w_1$ to $w_{N1}$ and one of the codes is allocated for the father code w of spreading codes $w_1'$ to $w_{N2}'$ at spreading factor 256.

In one aspect, the user symbols $\hat{b}(m)$ for spreading factor 16 may be initially detected as follows:

$$\hat{\underline{b}}(m) = \text{slice}(\underline{z}(m)) \tag{72}$$

where $\hat{b}(m)$ are the detected user symbols and $\underline{z}(m)$ are the received symbols for spreading factor 16. The received symbols $\underline{z}(m)$ may be obtained by descrambling and despreading received chips with the descrambling and despreading codes, respectively, for spreading factor 16. The user symbols for $\hat{b}'(m')$ for spreading factor 256 may also be initially detected as follows:

$$\hat{\underline{b}}'(m') = \text{slice}(\underline{z}'(m')) \tag{73}$$

where $\hat{b}'(m)$ are the detected user symbols and $\underline{z}'(m')$ are the received symbols for spreading factor 256. The received symbols $\underline{z}'(m')$ may be obtained by descrambling and despreading received chips with the descrambling and despreading codes, respectively, for spreading factor 256.

In one aspect, a combined interference estimate may be computed at the level of spreading factor 16 from the initially detected user symbols for both spreading factors as follows:

$$\underline{I}_c(m) = \sum_{l=-1,0,1} A_l(m) G \hat{\underline{b}}_c(m+l) \tag{74}$$

where $\hat{b}_c(m)$ are combined user symbols comprising the detected user symbols $\hat{b}(m)$ for spreading factor 16 and a projection of the detected user symbols for spreading factor 256 onto symbol period m. The combined user symbols $\hat{b}_c(m)$ may be expressed as:

$$\hat{\underline{b}}_c(m) = \begin{bmatrix} \hat{b}_1(m) \\ \vdots \\ \hat{b}_{N1}(m) \\ \sum_{i=1}^{N_2} g_i' \alpha_i[m] \hat{b}_i' \end{bmatrix} \tag{75}$$

where the bottom term represents a projection of the detected user symbols for spreading factor 256 onto the symbol period m. The contribution of each detected user symbol for spreading factor 256 to the projection is given by $g_i' \alpha_i[m] \hat{b}_i'$ where $g_i'$ is the respective gain, $\alpha_i[m]$ is the coefficient for the respective spreading code at symbol period m, $\hat{b}_i'$ is an initially detected user symbol at spreading factor 256 (e.g., based on Eq. (73)), and i is a code index for spreading factor 256, which ranges from 1 to $N_2$. In this example, each initially detected user symbol $\hat{b}_i'$ for spreading factor 256 is constant across 16 symbol periods m for spreading factor 16. The diagonal gain matrix G may be expressed as:

$$G = \begin{bmatrix} g_1 & & & 0 \\ & \ddots & & \\ & & g_{N1} & \\ 0 & & & 1 \end{bmatrix} \tag{76}$$

where $g_1$ to $g_{N1}$ are the respective gains for the user symbols at spreading factor 16, and the coefficient of one reflects that the gains for the user symbols at spreading factor 256 are taken into account in Eq. (68). The gain $g_i'$ in Eq. (76) may be normalized as follows:

$$\hat{\underline{b}}_c(m) = \begin{bmatrix} \hat{b}_1(m) \\ \vdots \\ \hat{b}_{N1}(m) \\ \sum_{i=1}^{N_2} \tilde{g}_i' \alpha_i[m] \hat{b}_i' \end{bmatrix} \tag{77}$$

where $\tilde{g}_i'$ is given by:

$$\tilde{g}_i' = g_i' \Big/ \sqrt{\sum_{i=1}^{N_2} (g_i')^2} \tag{78}$$

In this case, the gain matrix G is given by:

$$G = \begin{bmatrix} g_1 & & & 0 \\ & \ddots & & \\ & & g_{N1} & \\ 0 & & & \sqrt{\sum_{i=1}^{N_2} (g_i')^2} \end{bmatrix} \tag{79}$$

The matrices $A_{-1}, A_0, A_1$ may be computed based on Eqs. (28)-(30) in which the spreading matrix W may be expressed as:

$$W = [\underline{W}_1 \cdots \underline{W}_{N1} \underline{W}] \tag{80}$$

where $\underline{W}_1$ to $\underline{W}_{N1}$ are the spreading codes for the user symbols at spreading factor 16 and $\underline{W}$ is the father code at spreading factor 16 of the spreading codes for spreading factor 256. In this example, each of the spreading codes $\underline{W}_1$ to $\underline{W}_{N1}$ and the father code $\underline{W}$ is represented by a column vector comprising 16 chips. The spreading matrix W may be a N×N matrix, where N corresponds to the spreading factor 16. In this example, there may be up to 15 spreading codes for the spreading factor 16 (e.g., $N_1$=15) since one of the available spreading codes is used for the father code of the spreading codes for spreading factor 256.

The total filter matrix C and scrambling matrix P may be derived based on Eqs. (24) and (19) respectively, where the dimension N corresponds to the lower spreading factor (e.g., N=16 for the above example).

In this aspect, the combined interference $I_c(m)$ accounts for multi-user interference from user symbols for both spreading factors and is computed at the level of the lower spreading factor (e.g., 16), which simplifies the interference computations.

After the combined interference $I_c(m)$ is computed, the combined interference may be removed from received symbols $\underline{z}(m)$ at spreading factor 16 where the received symbols comprise the received symbols $z_1(m)$ to $z_{N1}(m)$ corresponding to the user symbols at spreading factor 16 and a received symbol derived by despreading the descrambled received chips based on father code w for the codes at spreading factor 256. The received symbols $\underline{z}(m)$ may be given by:

$$\underline{z}(m) = \begin{bmatrix} z_1(m) \\ \vdots \\ z_{N1}(m) \\ z'(m) \end{bmatrix} \quad (81)$$

where $z_1(m)$ to $z_{N1}(m)$ are the received symbols corresponding to the user symbols at spreading factor 16, and $z'(m)$ is a received symbol based on the father code. The received symbols with the combined interference removed may be expressed as:

$$\underline{\tilde{z}}(m) = \underline{z}(m) - \sum_{l=-1,0,1} A_l(m) G \underline{\hat{b}}_c(m+l) \quad (82)$$

where $\underline{\tilde{z}}(m)$ are the received symbols after the combined interference has been removed. The received symbols $\underline{\tilde{z}}(m)$ with the combined interference removed include $\tilde{z}_1(m)$ to $\tilde{z}_{N1}(m)$, which correspond to the user symbols for spreading factor 16, and $\tilde{z}'(m)$, which is based on father code w for spreading factor 256. The removal of the combined interference from the received symbols provides cancellation of multi-user interference from user symbols at both spreading factors. This results in more accurate redetection of user symbols at both spreading factors, which is discussed below.

In one aspect, the user symbols for spreading factor 16 are redetected using the received symbols $\underline{\tilde{z}}(m)$ with the combined interference removed. Each user symbol for spreading factor 16 may be redetected using slicing as follows:

$$\hat{\hat{b}}_i(m) = \text{Slice}\{\tilde{z}_i(m) + [a_0(m)]_{i,i} g_i \hat{b}_i(m)\} \quad (83)$$

where $\hat{\hat{b}}_i(m)$ is the re-detected user symbol and i is a code index for spreading factor 16, which ranges from 1 to $N_1$. The term $[a_0(m)]_{i,i} g_i \hat{b}_i(m)$ is used to add back the contribution of the initially detected user symbol $\hat{b}_i(m)$, which is removed by the computed combined interference in Eq. (82). The term $[a_0(m)]_{i,i}$ refers to the coefficient of the matrix $A_0$ in the $i^{th}$ row and column.

In one aspect, the user symbols at spreading factor 256 are redetected using the received symbols $\underline{\tilde{z}}(m)$ with the combined interference removed. To redetect a user symbol at spreading factor 256, 16 corresponding received symbols at spreading factor 16 are computed and then coherently combined to estimate a received symbol for the user symbol at spreading factor 256. Each of the 16 received symbols at spreading factor 16 contributing to the received symbol at spreading factor 256 may be expressed as:

$$\tilde{z}_i'(m) = \tilde{z}'(m) + [a_0(m)]_{N,N} \alpha_i[m] g_i \hat{b}_i' \quad (84)$$

where $\tilde{z}_i'(m)$ is a received symbol at spreading factor 16 with the combined interference removed, m is the symbol index for spreading factor 16, and i is a code index for spreading factor 256, which ranges from 1 to $N_2$. The term $[a_0(m)]_{N,N} \alpha_i[m] g_i \hat{b}_i'$ is used to add back the contribution of the initially detected user symbol $\hat{b}_i'$, which is removed by the computed combined interference in Eq. (82). The received symbol $\tilde{z}_i'(m)$ is computed over 16 symbol periods, multiplied by the respective coefficients $\alpha_i[m]$, and then coherently combined. The combined received symbols are then sliced to detect the user symbol for spreading factor 256 as follows:

$$\hat{\hat{b}}_i' = \text{Slice}\left\{\sum_{m=1}^{16} \alpha_i[m] \tilde{z}_i'(m)\right\} \quad (85)$$

where $\hat{\hat{b}}_i'$ is the redetected user symbol at spreading factor 256.

Figure 33:
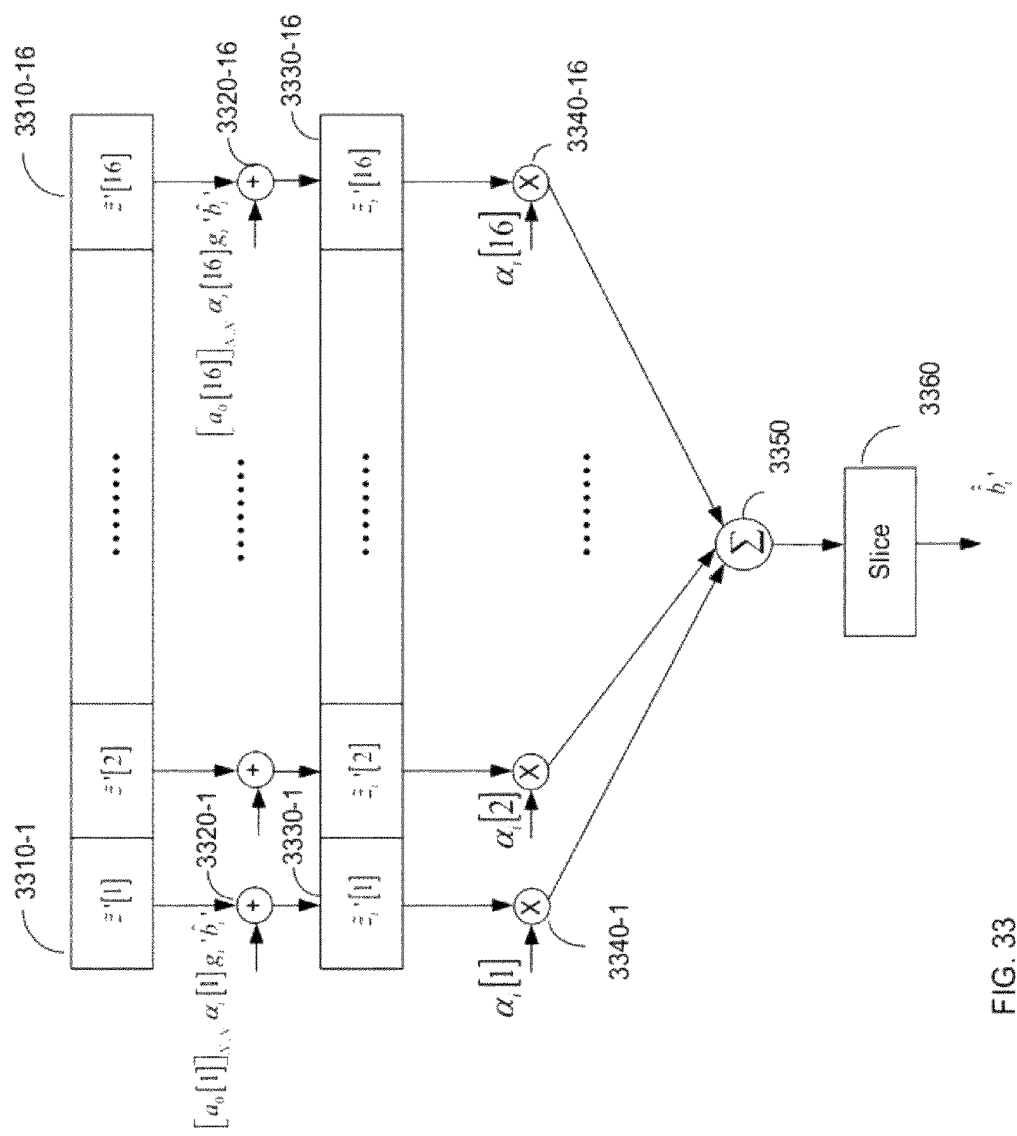
FIG. 33 is a flow diagram illustrating user symbol detection, according to certain aspects of the present disclosure.

FIG. 33 is a diagram illustrating redetection of user symbol $\hat{\hat{b}}_i'$ for spreading factor 256 based on Eqs. (84) and (85). In blocks 3310-1 to 3310-16, $\tilde{z}'(m)$ is computed for symbol periods m=1 to m=16, respectively, where $\tilde{z}'(m)$ is a received symbol based on the father code with the combined interference removed (e.g., based on Eq. (82)).

Adders 3320-1 to 3320-16 then add the term $[a_0(m)]_{N,N} \alpha_i[m] g_i \hat{b}_i'$ to $\tilde{z}'(m)$ for symbol periods m=1 to m=16, respectively. The initially detected user symbol $\hat{b}_i'$ corresponds to the user symbol to be redetected, and is constant for symbol periods m=1 to m=16.

The output of the adders 3320-1 to 3320 result in 16 received symbols $\tilde{z}_i'(m)$ at spreading factor 16 in blocks 3330-1 to 3330-16, respectively (e.g., based on Eq. (84)). Each received symbol $\tilde{z}_i'(m)$ contributes to a received symbol at spreading factor 256 corresponding to the user symbol to be redetected.

Multipliers 3340-1 to 3340-16 then multiply the 16 received symbols $\tilde{z}_i'(m)$ with respective coefficients $\alpha_i[m]$ and adder 3350 combines the received symbols. The output of the adder 3350 is then sliced by slicer 3360 to redetect the user symbol $\hat{\hat{b}}_i'$ at spreading factor 256 (e.g., based on Eq. (85)).

The redetected user symbols for both spreading factors may be used in an iterative process to further refine the redetected user symbols. In this aspect, the combined interference is recomputed for iteration k using the redetected user symbols from the previous iteration k−1, and removed from the received symbols $\underline{z}(m)$ according to the expression:

$$\underline{\tilde{z}}^{(k)}(m) = \underline{z}(m) - \sum_{l=-1,0,1} A_l(m) G \underline{\hat{b}}_c^{(k-1)}(m+l) \quad (86)$$

where k is an iteration index. The user symbols for spreading factor 16 may then be redetected for iteration k according to the expression:

$$\hat{b}_i^{(k)}(m) = \text{Slice}\{\tilde{z}_i(m) + [a_0(m)]_{i,i} g_i \hat{b}_i^{(k-1)}(m)\} \quad (87)$$

The user symbols for spreading factor 256 may also be redetected for iteration k according to the expressions:

$$\tilde{z}'_i(m) = \tilde{z}'^{(k)}(m) + [a_0(m)]_{N,N} \alpha_i[m] g'_i \hat{b}'^{(k-1)}_i \quad (88)$$

$$\hat{b}'^{(k)}_i = \text{Slice}\left\{\sum_{m=1}^{16} \alpha_i[m] \tilde{z}'_i(m)\right\} \quad (89)$$

Figure 34:
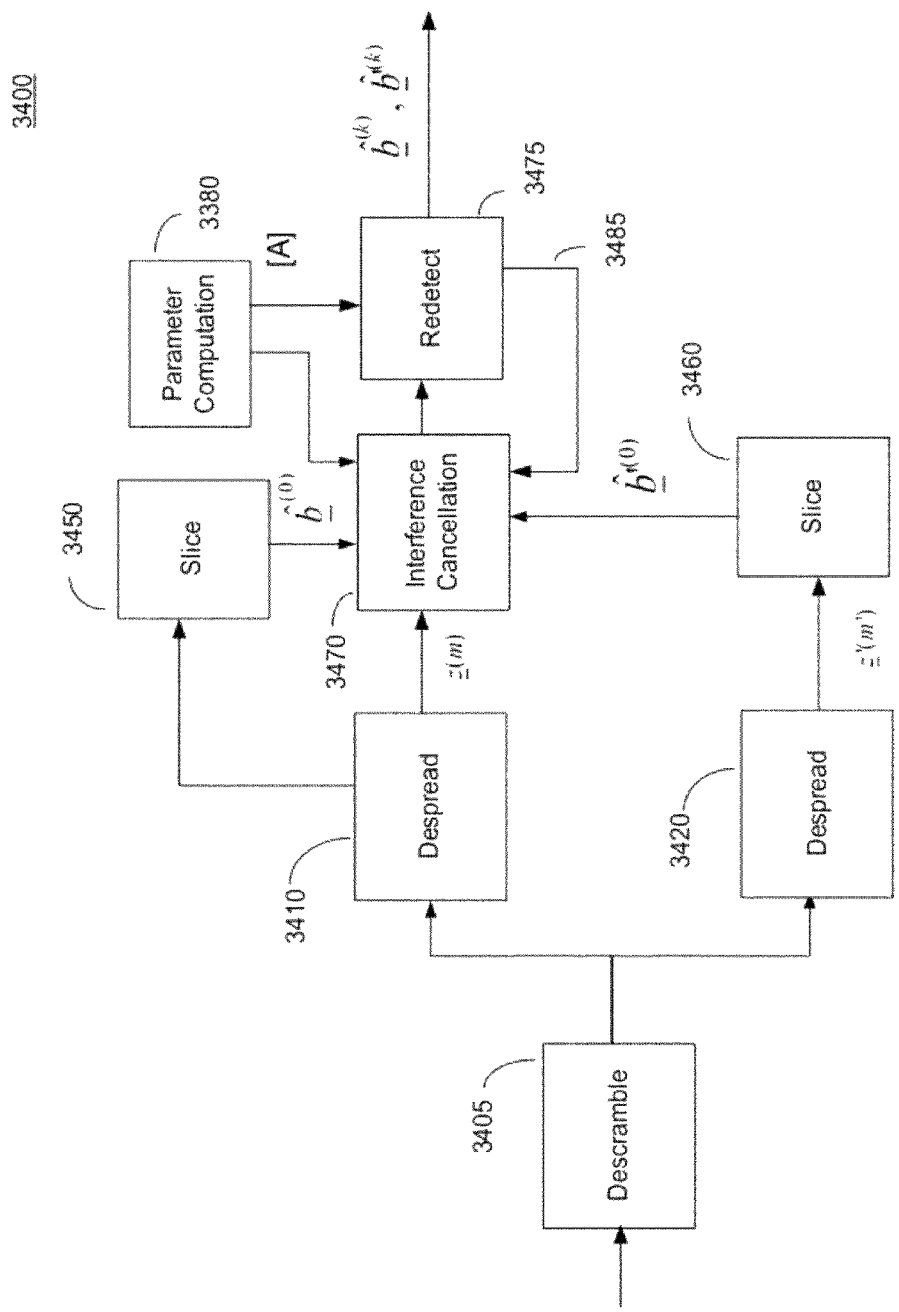
FIG. 34 is a schematic of a multi-user detection system capable of detecting symbols and performing interference cancellation for multiple spreading factors, according to certain aspects of the present disclosure.

FIG. 34 is a schematic of a multi-user detection system 3400 capable of detecting symbols and performing interference cancellation for multiple spreading factors, according to certain aspects of the disclosure.

The detection system 3400 comprises a descramble unit 3405, a first despread unit 3410, and a first slicer unit 3450. The descramble unit 3405 descrambles filtered received chips y(n) with a descrambling code and the first despread unit 3410 despreads the descrambled chips with despreading codes for spreading factor 16. The first despread unit 3410 outputs a set of received symbols z(m) for spreading factor 16, which may be given by Eq. (81). The received symbols z(m) may include received symbols $z_1(m)$ to $z_{N1}(m)$ obtained using the despreading codes for spreading factor 16. The received symbols z(m) may also include a received symbol z'(m) obtained using the father code of the despreading codes for spreading factor 256, as explained above. The received symbols $z_1(m)$ to $z_{N1}(m)$ are inputted to the first slicer 3450, which detects user symbols $\hat{b}(m)$ for spreading factor 16 from the received symbols $z_1(m)$ to $z_{N1}(m)$ (e.g., based on Eq. (72)).

The detection system 3400 also comprises a second despread unit 3420, and a second slicer unit 3460. The second despread unit 3410 despreads the descrambled chips with despreading codes for spreading factor 256. The despread unit 3420 outputs a set of received symbols z'(m') for spreading factor 256, where m' is a symbol period corresponding to 256 chips. The received symbols z'(m') are inputted to the second slicer 3460, which detects user symbols $\hat{b}'(m')$ for spreading factor 256 from the received symbols z'(m') (e.g., based on Eq. (73)).

The detection system 3400 further comprises an interference cancellation unit 3470, a redetection unit 3475 and a parameter computation unit 3480. The interference cancellation unit 3470 receives the detected user symbols $\hat{b}(m)$ for spreading factor 16 from the first slicer unit 3450 and the detected user symbols $\hat{b}'(m')$ for spreading factor 256 from the second slicer unit 3460. The interference cancellation unit 3475 uses the detected user symbols for both spreading factors to compute a combined interference and removes the combined interference from the received symbols z(m) at spreading factor 16 (e.g., based on Eq. (82)). The redetection unit 3475 then redetects user symbols for spreading factor 16 from the received symbols with the computed interference removed (e.g., based on Eq. (83)). The redetection unit 3475 also redetects user symbols for spreading factor 256 from the received symbols with the computed interference removed (e.g., based on Eqs. (84) and (85)).

The redetected user symbols for both spreading factors may be fed back to the interference cancellation unit 3475 through feedback path 3485. The interference cancellation unit 3475 may then re-compute the combined interference using the redetected user symbols, and remove the recomputed combined interference from the received symbols (e.g., based on Eqs. (86). The redetection unit 3475 then redetects the user symbols for spreading factor 16 from the received symbols with the recomputed interference removed (e.g., based on Eq. (87). The redetection unit 3475 also redetects the user symbols for spreading factor 16 from the received symbols with the recomputed interference removed (e.g., based on Eqs. (88) and (89)). The above iteration may be repeated any number of times to refine the redetected user symbols. In FIG. 34, the superscript k for the user symbols is an iteration index, where k=0 for the user symbols outputted from the first and second slicers 3450 and 3460.

The parameter computation unit 3480 computes the matrices $A_{-1}, A_0, A_1$ and provides the matrices to the interference cancellation unit 3470 and the redetection unit 3475.

Figure 35A:
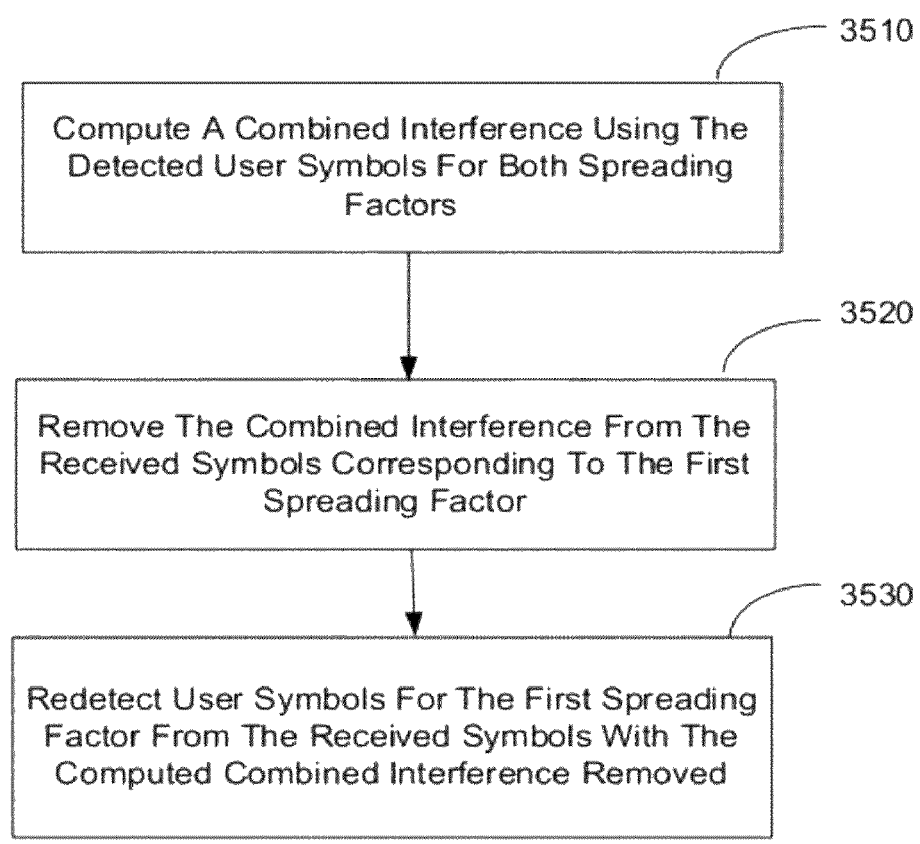
FIG. 35a is a flow diagram illustrating a method of multi-user detection in the presence of multiple spreading factors, according to certain aspects of the present disclosure.

FIG. 35a is a flow diagram illustrating a user-symbol detection process with multi-user interference cancellation in the presence of multiple spreading factors, according to certain aspects of the present disclosure. This process may be performed at a receiver (e.g., mobile station 106).

In operation 3510, a combined interference is computed using the detected user symbols for first and second spreading factors (e.g., based on Eq. (75)). The combined interference accounts for multi-user interference from user symbols for both spreading factors. The user symbols for the first spreading factor (e.g., 16) may be detected from received symbols corresponding to the first spreading factor. For example, the user symbols for the first spreading factor may be detected by slicing the received symbols corresponding to the first spreading factor (e.g., based on Eq. (72)). The received symbols corresponding to the first spreading factor may be obtained by despreading descrambled chips with despreading codes for the first spreading factor. The user symbols for the second spreading factor (e.g., 256) may be detected from received symbols corresponding to the second spreading factor. For example, the user symbols for the second spreading factor may be detected by slicing the received symbols corresponding to the second spreading factor (e.g., based on Eq. (73)).

In operation 3520, the computed combined interference is removed from the received symbols corresponding to the first spreading factor (e.g., based on Eq. (82)).

Finally, in operation 3530, user symbols for the first spreading factor are redetected from the received symbols with the combined interference removed (e.g., based on Eq. (83)).

Figure 35B:
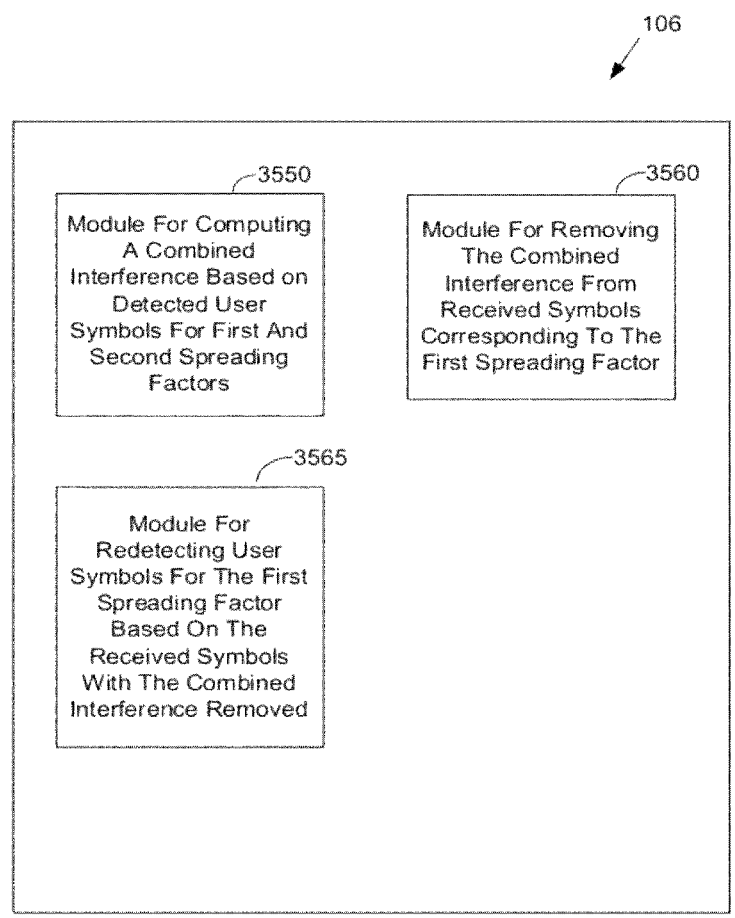
FIG. 35b is a block diagram of a mobile station used in a wireless communication system, according to certain aspects of the present disclosure.

FIG. 35b is a block diagram of a mobile station 106 used in a wireless communication system 100, according to certain aspects of the present disclosure. Mobile station 106 of FIG. 35b includes a module 3550 for computing a combined interference based on detected user symbols for first and second spreading factors. The combined interference accounts for multi-user interference from user symbols for both spreading factors. The mobile station 106 further includes a module 3560 for removing the combined interference from the received symbols corresponding to the first spreading factor 3560 and a module 3565 for redetecting the user symbols for the first spreading factor based on the received symbols with the combined interference removed.

Figure 36:
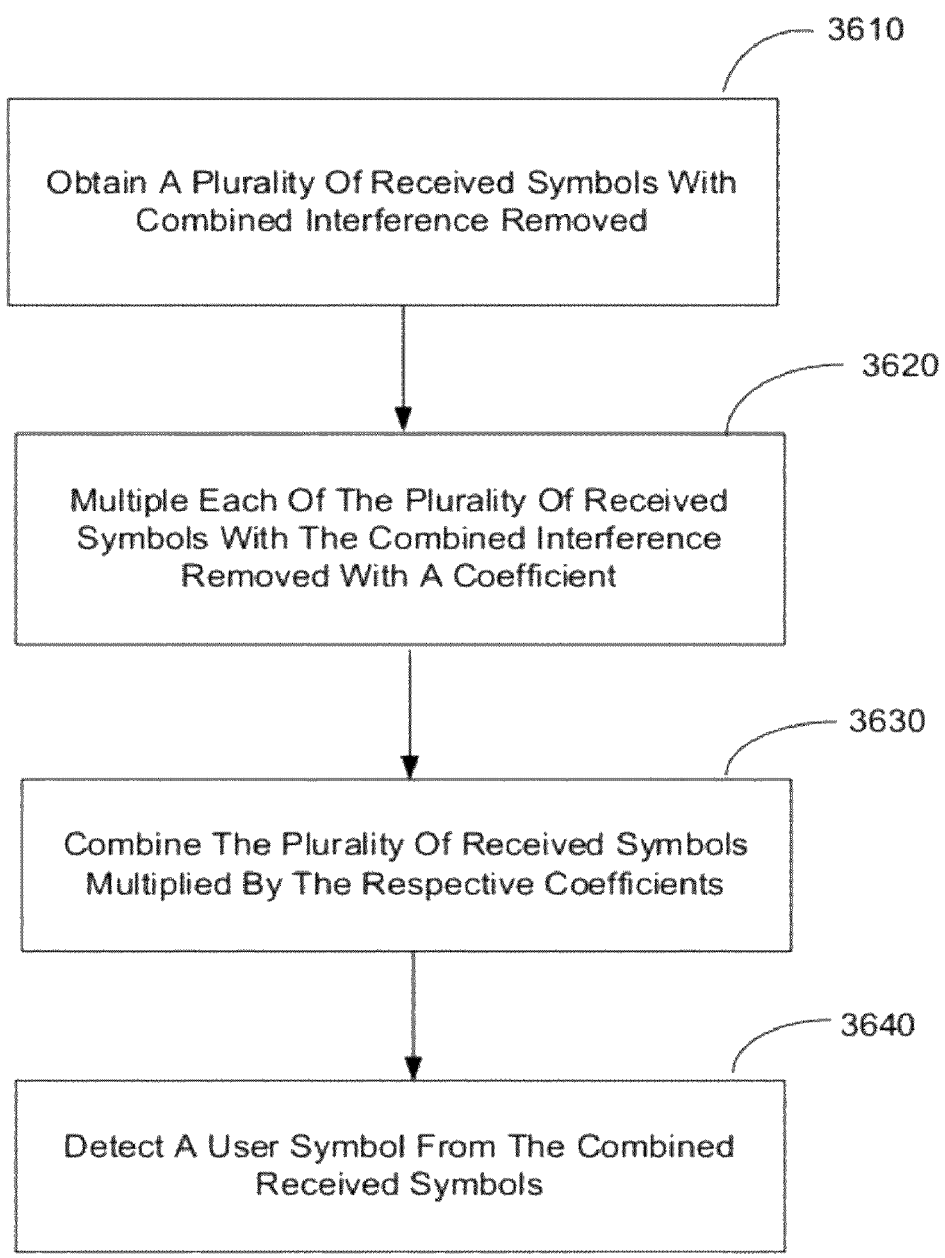
FIG. 36 is a flow diagram illustrating a method of multi-user detection in the presence of multiple spreading factors, according to certain aspects of the present disclosure.

FIG. 36 is a flow diagram illustrating another user-symbol detection process with multi-user interference cancellation in the presence of multiple spreading factors, according to certain aspects of the present disclosure. The process in FIG. 36 may be used to detect the user symbols for the second spreading factor (e.g., 256).

In operation 3610, a plurality of received symbols with combined interference removed are obtained (e.g., based on Eq. (84)). For example, the plurality of received symbols with the combined interference removed may be obtained by repeating operations 3510-3540 in FIG. 35 over multiple symbol periods for the first spreading factor (e.g., 16 symbol periods).

In operation 3620, each of the plurality of received symbols with the combined interference removed is multiplied by a respective coefficient.

In operation 3630, the plurality of received symbols multiplied by the respective coefficients are combined.

In operation 3640, a user symbol for the second spreading factor (e.g., 256) is redetected from the combined received symbols. For example, the user symbol may be redetected by slicing the combined received symbols (e.g., based on Eq. (85)).

The spreading factors of 16 and 256 are exemplary only, and the methods and systems discussed above may be applied to other spreading factors. Also, the methods and systems may be applied in cases where the spreading codes for a higher spreading factor correspond to more than one father code at a lower spreading factor.

For example, the spreading codes for the higher spreading factor (e.g., 256) may comprise two sets of spreading codes where each set of spreading codes has a different father code at the lower spreading factor (e.g., 16). In this example, the combined user symbols may be expressed as:

$$\hat{b}_c(m) = \begin{bmatrix} \hat{b}_1(m) \\ \vdots \\ \hat{b}_{N1}(m) \\ \sum_{i=1}^{N^{[1]}} g_i^{[1]} \alpha_i^{[1]}[m] \hat{b}_i^{[1]} \\ \sum_{i=1}^{N^{[2]}} g_i^{[2]} \alpha_i^{[2]}[m] \hat{b}_i^{[2]} \end{bmatrix} \quad (90)$$

where $$\sum_{i=1}^{N^{[1]}} g_i^{[1]} \alpha_i^{[1]}[m] \hat{b}_i^{[1]}$$

is the projection of the detected user symbols corresponding to the first set of spreading codes to the symbol period m and $$\sum_{i=1}^{N^{[2]}} g_i^{[2]} \alpha_i^{[2]}[m] \hat{b}_i^{[2]}$$

is the projection of the detected user symbols corresponding to the second set of spreading codes to the symbol period m. The gain matrix G in Eq. (76) may be expressed as:

$$G = \begin{bmatrix} g_1 & & & & \\ & \ddots & & & \\ & & g_{N1} & & \\ & & & 1 & \\ & & & & 1 \end{bmatrix} \quad (91)$$

The spreading matrix W in Eq. (80) may be given by:

$$W = [\underline{W}_1 \quad \cdots \quad \underline{W}_{N1} \quad \underline{W}^{[1]} \quad \underline{W}^{[2]}] \quad (92)$$

where $\underline{W}_1$ to $\underline{W}_{N1}$ are the spreading codes for the user symbols at the lower spreading factor, $W^{[1]}$ is the father code for the first set of spreading codes at the higher spreading factor and $W^{[2]}$ is the father code for the second set of spreading codes at the higher spreading factor. The received symbols may be given by:

$$z(m) = \begin{bmatrix} z_1(m) \\ \vdots \\ z_{N1}(m) \\ z^{[1]}(m) \\ z^{[2]}(m) \end{bmatrix} \quad (93)$$

where is $z^{[1]}$ is a received symbol obtained from a despreading code corresponding to father code of the first set of spreading codes at the higher spreading factor and $z^{[2]}$ is a received symbol obtained from a despreading code corresponding to father code of the second set of spreading codes at the higher spreading factor. In this example, the combined interference cancellation and user symbol detection for both spreading factors may be performed, for example, based on Eqs. (86) to (89).

Those of ordinary skill in the art would understand that the information and signal may be represented using any of a variety of different technologies and techniques. For example, data, instructions, commands information signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical modules, circuits and algorithms described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A process may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof If implemented in software, the functions may be stored on or transmitted over as one or more instructions or code on a machine-readable medium. Machine-readable media includes both computer storage media and communication media including any medium that facilitates transfer of a computer program from one place to another. A storage media may be any available media that can be accessed by a computer. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of machine-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the disclosure. Thus, the present disclosure is not intended to be limited to the aspects shown herein but is to be accorded the widest scope consistent with the principles and novel features disclosed herein.

What is claimed is:

1. A method of multi-user interference cancellation in a wireless communication system, comprising:
   processing received chips into received symbols for a plurality of users;
   detecting user symbols from the received symbols;
   computing multi-user interference using the detected user symbols;
   removing the computed multi-user interference from the received symbols; and
   redetecting user symbols from the received symbols with the computed multi-user interference removed,
   wherein computing the multi-user interference comprises:
   computing a multi-user interference matrix; and
   multiplying the multi-user interference matrix with the detected user symbols.

2. The method of claim 1, further comprising:
   recomputing multi-user interference using the redetected user symbols;
   removing the recomputed multi-user interference from the received symbols; and
   redetecting user symbols from the received symbols with the recomputed multi-user interference removed.

3. The method of claim 1, wherein detecting the user symbols comprises performing minimum mean square error estimation, maximum likelihood detection, sphere decoding, maximum a posteriori detection or slicing on the received symbols.

4. The method of claim 1, wherein the detected user symbols correspond to a current symbol period and at least one other symbol period.

5. The method of claim 4, wherein the at least one other symbol period comprises a previous symbol period.

6. The method of claim 4, wherein the at least one other symbol period comprises a next symbol period.

7. The method of claim 1, wherein, for each user, the multi-user interference matrix accounts for interference from detected users symbols for every one of the other plurality of users.

8. The method of claim 1, processing the received chips into the received symbols comprises:
   descrambling the received chips; and
   despreading the descrambled chips with one or more despreading codes to obtain the received symbols.

9. The method of claim 1, further comprising:
   performing interference cancellation and redetection in a plurality of iterations, wherein each of the plurality of iterations comprises:
   computing multi-user interference using redetected user symbols from a previous iteration, wherein the multi-user interference for a first iteration is computed using the detected user symbols;
   removing the computed multi-user interference from the received symbols; and
   redetecting the user symbols from the received symbols with the computed multi-user interference removed.

10. An apparatus, comprising:
    a processing unit configured to process received chips into received symbols for a plurality of users;
    a detection unit configured to detect user symbols from the received symbols;
    an interference cancellation unit configured to compute multi-user interference using the detected user symbols and to remove the computed multi-user interference from the received symbols; and
    a redetection unit configured to redetect user symbols from the received symbols with the computed multi-user interference removed,
    wherein the computation unit is configured to compute a multi-user interference matrix and to multiply the detected user symbols with the multi-user interference matrix.

11. The apparatus of claim 10, wherein the interference cancellation unit is configured to recompute the multi-user interference using the redetected user symbols and to remove the recomputed multi-user interference from the received symbols, and the redetection unit is configured to redetect user symbols from the received symbols with the recomputed multi-user interference removed.

12. The apparatus of claim 10, wherein the detection unit is configured to detect user symbols by performing minimum mean square error estimation, maximum likelihood detection, sphere decoding, maximum a posteriori detection or slicing on the received symbols.

13. The apparatus of claim 10, wherein the detected user symbols correspond to a current symbol period and at least one other symbol period.

14. The apparatus of claim 13, wherein the at least one other symbol period comprises a previous symbol period.

15. The apparatus of claim 13, wherein the at least one other symbol period comprises a next symbol period.

16. The apparatus of claim 10, wherein, for each user, the multi-user interference matrix accounts for interference from detected users symbols for every one of the other plurality of users.

17. The apparatus of claim 10, wherein the processing unit comprises:
a descramble unit configured to descramble the received chips; and
a despread unit configured to despread the descrambled chips with one or more despreading codes to obtain the received symbols.

18. The apparatus of claim 10, wherein the interference cancellation unit and the redetection unit are configured to perform interference cancellation and redetection in a plurality of iterations, wherein for each of the plurality of iterations, the interference cancellation unit is configured to compute multi-user interference using redetected user symbols from a previous iteration, wherein the multi-user interference for a first iteration is computed using the detected user symbols and to remove the computed multi-user interference from the received symbols and the redetection unit is configured to redetect the user symbols from the received symbols with the computed multi-user interference removed.

19. An apparatus, comprising:
means for processing received chips into received symbols for a plurality of users;
means for detecting user symbols from the received symbols;
means for computing multi-user interference using the detected user symbols;
means for removing the computed multi-user interference from the received symbols; and
means for redetecting user symbols from the received symbols with the computed multi-user interference removed,
wherein means for computing the multi-user interference comprises:
means for computing a multi-user interference matrix; and
means for multiplying the multi-user interference matrix with the detected user symbols.

20. The apparatus of claim 19, further comprising:
means for recomputing multi-user interference using the redetected user symbols;
means for removing the recomputed multi-user interference from the received symbols; and
means for redetecting user symbols from the received symbols with the recomputed multi-user interference removed.

21. The apparatus of claim 19, wherein means for detecting the user symbols comprises means for performing minimum mean square error estimation, maximum likelihood detection, sphere decoding, maximum a posteriori detection or slicing on the received symbols.

22. The apparatus of claim 19, wherein the detected user symbols correspond to a current symbol period and at least one other symbol period.

23. The apparatus of claim 19, wherein the at least one other symbol period comprises a previous symbol period.

24. The apparatus of claim 19, wherein the at least one other symbol period comprises a next symbol period.

25. The apparatus of claim 19, wherein, for each user, the multi-user interference matrix accounts for interference from detected users symbols for every one of the other plurality of users.

26. The apparatus of claim 19, wherein means for processing the received chips into the received symbols comprises:
means for descrambling the received chips; and
means for despreading the descrambled chips with one or more despreading codes to obtain the received symbols.

27. The apparatus of claim 19, wherein the means for computing the multi-user interference and the means for redetecting the user symbols comprise:
means for performing interference cancellation and redetection in a plurality of iterations, wherein for each of the plurality of iterations, the means for performing interference cancellation and redetection in the plurality of iterations comprises:
means for computing multi-user interference using redetected user symbols from a previous iteration, wherein the multi-user interference for a first iteration is computed using the detected user symbols;
means for removing the computed multi-user interference from the received symbols; and
means for redetecting the user symbols from the received symbols with the computed multi-user interference removed.

28. A machine-readable storage medium having instructions stored thereon, the instructions being executable by one or more processors and the instructions comprising code for:
processing received chips into received symbols for a plurality of users;
detecting user symbols from the received symbols;
computing multi-user interference using the detected user symbols;
removing the computed multi-user interference from the received symbols; and
redetecting user symbols from the received symbols with the computed multi-user interference removed,
wherein the code for computing the multi-user interference comprises code for:
computing a multi-user interference matrix; and
multiplying the multi-user interference matrix with the detected user symbols.

29. The machine-readable storage medium of claim 28, further comprising code for:
recomputing multi-user interference using the redetected user symbols;
removing the recomputed multi-user interference from the received symbols; and
redetecting user symbols from the received symbols with the recomputed multi-user interference removed.

30. The machine-readable storage medium of claim 28, wherein the code for detecting the user symbols comprises code for performing minimum mean square error estimation, maximum likelihood detection, sphere decoding, maximum a posteriori detection or slicing on the received symbols.

31. The machine-readable storage medium of claim 28, wherein the detected user symbols correspond to a current symbol period and at least one other symbol period.

32. The machine-readable storage medium of claim 31, wherein the at least one other symbol period comprises a previous symbol period.

33. The machine-readable storage medium of claim 31, wherein the at least one other symbol period comprises a next symbol period.

34. The machine-readable storage medium of claim 28, wherein, for each user, the multi-user interference matrix accounts for interference from detected users symbols for every one of the other plurality of users.

35. The machine-readable storage medium of claim 29, the code for processing the received chips into the received symbols comprises code for:
descrambling the received chips; and
despreading the descrambled chips with one or more despreading codes to obtain the received symbols.

36. The machine-readable storage medium of claim 35, wherein the code for computing the multi-user interference and redetecting the user symbols comprise code for:
- performing interference cancellation and redetection in a plurality of iterations, wherein each of the plurality of iterations comprises:
- computing multi-user interference using redetected user symbols from a previous iteration, wherein the multi-user interference for a first iteration is computed using the detected user symbols;
- removing the computed multi-user interference from the received symbols; and
- redetecting the user symbols from the received symbols with the computed multi-user interference removed.

37. An apparatus, comprising:
- at least one processor configured to process received chips into received symbols for a plurality of users, to detect user symbols from the received symbols, to compute multi-user interference using the detected user symbols, to remove the computed multi-user interference from the received symbols, and to redetect user symbols from the received symbols with the computed multi-user interference removed,
- wherein at least one processor is configured to compute the multi-user interference by computing a multi-user interference matrix and multiplying the multi-user interference matrix with the detected user symbols.

38. The apparatus of claim 37, wherein the at least one processor is configured to recompute multi-user interference using the redetected user symbols, to remove the recomputed multi-user interference from the received symbols, and to redetect user symbols from the received symbols with the recomputed multi-user interference removed.

39. The apparatus of claim 37, wherein the at least one processor is configured to detect the user symbols comprises by performing minimum mean square error estimation, maximum likelihood detection, sphere decoding, maximum a posteriori detection or slicing on the received symbols.

40. The apparatus of claim 37, wherein the detected user symbols correspond to a current symbol period and at least one other symbol period.

41. The apparatus of claim 40, wherein the at least one other symbol period comprises a previous symbol period.

42. The apparatus of claim 40, wherein the at least one other symbol period comprises a next symbol period.

43. The apparatus of claim 37, wherein, for each user, the multi-user interference matrix accounts for interference from detected users symbols for every one of the other plurality of users.

44. The apparatus of claim 43, wherein the at least one processor is configured to process the received chips into the received symbols comprises by descrambling the received chips and despreading the descrambled chips with one or more despreading codes to obtain the received symbols.

45. The apparatus of claim 37, wherein the at least one processor is configured to perform interference cancellation and redetection in a plurality of iterations, wherein for each of the plurality of iterations, the at least one processor is configured to compute multi-user interference using redetected user symbols from a previous iteration, wherein the multi-user interference for a first iteration is computed using the detected user symbols, to remove the computed multi-user interference from the received symbol, and to redetect the user symbols from the received symbols with the computed multi-user interference removed.

* * * * *